(12) United States Patent
Goodman et al.

(10) Patent No.: US 7,941,611 B2
(45) Date of Patent: *May 10, 2011

(54) FILTERING SNOOPED OPERATIONS

(75) Inventors: Benjiman L. Goodman, Cedar Park, TX (US); Guy L. Guthrie, Austin, TX (US); William J. Starke, Round Rock, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 456 days.

This patent is subject to a terminal disclaimer.

(21) Appl. No.: 12/106,102

(22) Filed: Apr. 18, 2008

(65) Prior Publication Data
US 2008/0215824 A1    Sep. 4, 2008

Related U.S. Application Data

(63) Continuation of application No. 11/055,418, filed on Feb. 10, 2005, now Pat. No. 7,404,046.

(51) Int. Cl.
*G06F 12/08* (2006.01)
(52) U.S. Cl. .................. 711/146; 711/E12.034
(58) Field of Classification Search .................. None
See application file for complete search history.

(56) References Cited

U.S. PATENT DOCUMENTS

| | | | |
|---|---|---|---|
| 5,909,697 A * | 6/1999 | Hayes et al. ............... | 711/144 |
| 6,275,907 B1 * | 8/2001 | Baumgartner et al. ...... | 711/122 |
| 6,598,123 B1 * | 7/2003 | Anderson et al. ............ | 711/146 |
| 6,842,827 B2 * | 1/2005 | Blankenship et al. ........ | 711/141 |
| 6,857,048 B2 * | 2/2005 | Rankin et al. ................. | 711/133 |
| 7,103,726 B2 * | 9/2006 | Glasco .......................... | 711/146 |
| 7,404,046 B2 * | 7/2008 | Goodman et al. ............. | 711/146 |
| 2002/0073281 A1 * | 6/2002 | Gaither ......................... | 711/122 |
| 2003/0163649 A1 * | 8/2003 | Kapur et al. .................. | 711/141 |
| 2006/0053258 A1 * | 3/2006 | Liu et al. ....................... | 711/145 |

OTHER PUBLICATIONS

Jim Handy. The Cache Memory Book. 1998. Academic Press. 2nd ed. pp. 123-139 and 165-169.*
Alan Charlesworth. "The Sun Fireplane System Interconnect." Nov. 2001. ACM. SC 2001.*
Craig Saldanha and Mikko Lipasti. "Power Efficient Cache Coherence." Jun. 2001. WMPI 2001.*

* cited by examiner

*Primary Examiner* — Reginald G Bragdon
*Assistant Examiner* — Nathan Sadler
(74) *Attorney, Agent, or Firm* — Dillon & Yudell LLP

(57) ABSTRACT

A cache coherent data processing system includes at least a first cache memory supporting a first processing unit and a second cache memory supporting a second processing unit. The first cache memory includes a cache array and a cache directory of contents of the cache array. In response to the first cache memory detecting on an interconnect a broadcast operation that specifies a request address, the first cache memory determines from the operation a type of the operation and a coherency state associated with the request address. In response to determining the type and the coherency state, the first cache memory filters out the broadcast operation without accessing the cache directory.

13 Claims, 32 Drawing Sheets

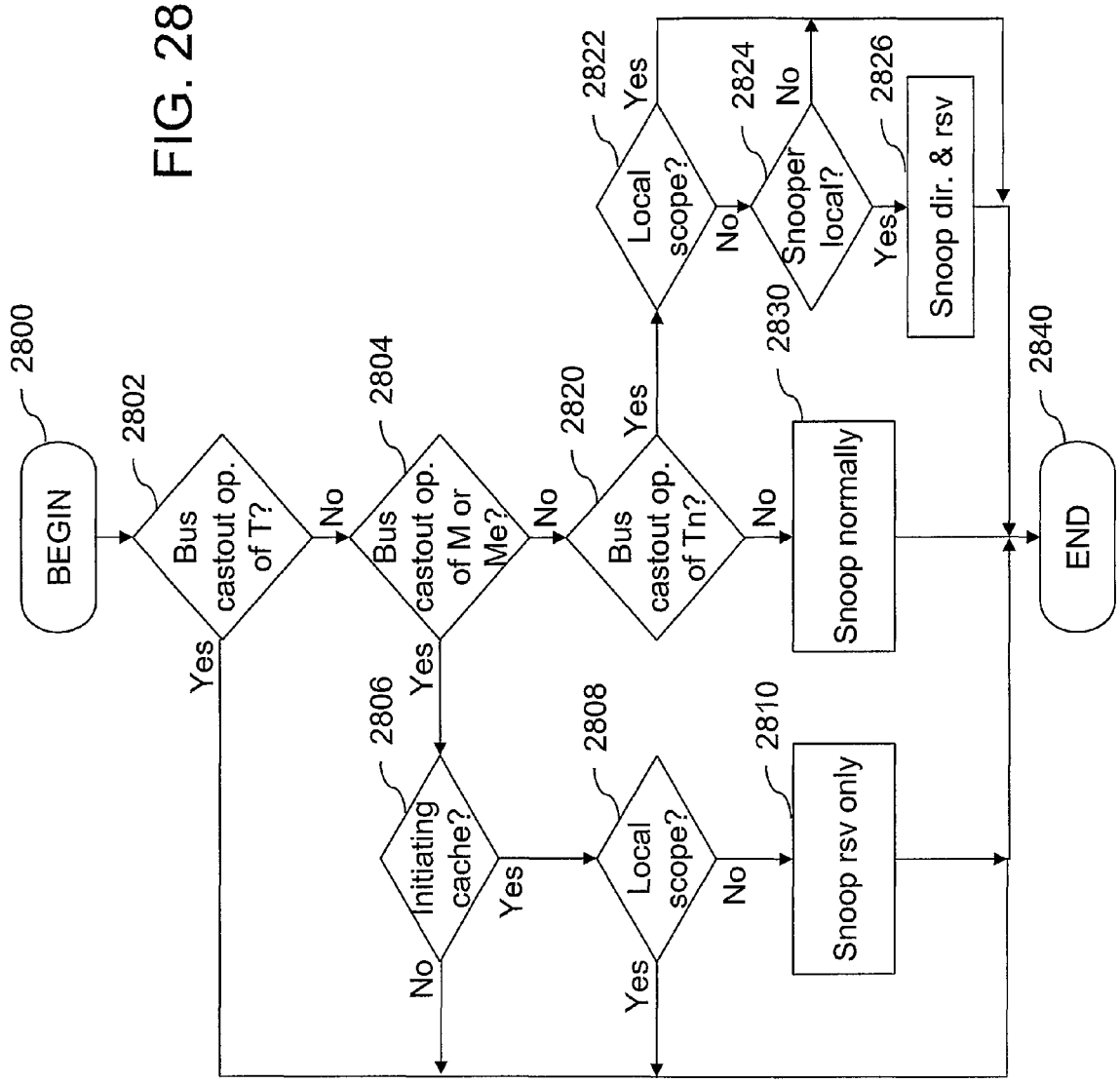

FILTERING SNOOPED OPERATIONS

The present application is a continuation of U.S. patent application Ser. No. 11/055,418, now U.S. Pat. No. 7,404, 046, filed on Feb. 10, 2005, entitled "Cache Memory, Processing Unit, Data Processing System and Method for Filtering Snooped Operations". Applicants claim benefit of priority under 35 U.S.C. §120 to U.S. patent application Ser. No. 11/055,418, which is incorporated by reference herein in its entirety and for all purposes.

BACKGROUND OF THE INVENTION

1. Technical Field

The present invention relates in general to data processing and, in particular, to improved data processing system and cache memories for data processing systems. Still more particularly, the present invention relates to snoop filtering in a cache memory of a data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of cache coherency states stored in a cache directory in association with the cache lines of each cache hierarchy, as well as a set of coherency messages utilized to communicate the cache state information between cache hierarchies. In a typical implementation, the cache state information takes the form of the well-known MESI (Modified, Exclusive, Shared, Invalid) protocol or a variant thereof, and the coherency messages indicate a protocol-defined coherency state transition in the cache directory of the cache at the requestor and/or the recipients of a memory access request.

The cache directory, which identifies the cache lines contained in the cache and their respective coherency states, is a scarce resource that is accessed by a cache in the servicing of memory access requests by the associated processor core(s) and remote processor cores. Because the cache directory does not scale well with system size and operating frequency, in multiprocessor systems it is sometimes the case that a cache directory is not available to snoop a memory access by a remote processor core, for example, due to one or more competing accesses by a local processor core. In such cases, the cache memory may have to force the operation by the remote processor core to be retried, for example, by providing an appropriate coherency response message. As this scenario is repeated over time in many cache hierarchies throughout the data processing system, memory access requests are subject to higher average latencies, and overall system performance degrades.

SUMMARY OF THE INVENTION

In view of the foregoing, the present invention provides an improved cache memory, processing unit, data processing system, and method of data processing in which contention for a cache directory is reduced by filtering out selected snooped operation to eliminate accesses to the cache directory.

In one embodiment, a cache coherent data processing system includes at least a first cache memory supporting a first processing unit and a second cache memory supporting a second processing unit. The first cache memory includes a cache array and a cache directory of contents of the cache array. In response to the first cache memory detecting on an interconnect a broadcast operation that specifies a request address, the first cache memory determines from the operation a type of the operation and a coherency state associated with the request address. In response to determining the type and the coherency state, the first cache memory filters out the broadcast operation without accessing the cache directory.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

FIG. 28 is a high level logical flowchart of an exemplary method of snoop filtering in accordance with the present invention.

DETAILED DESCRIPTION OF ILLUSTRATIVE EMBODIMENT

I. Exemplary Data Processing System

Figure 1:
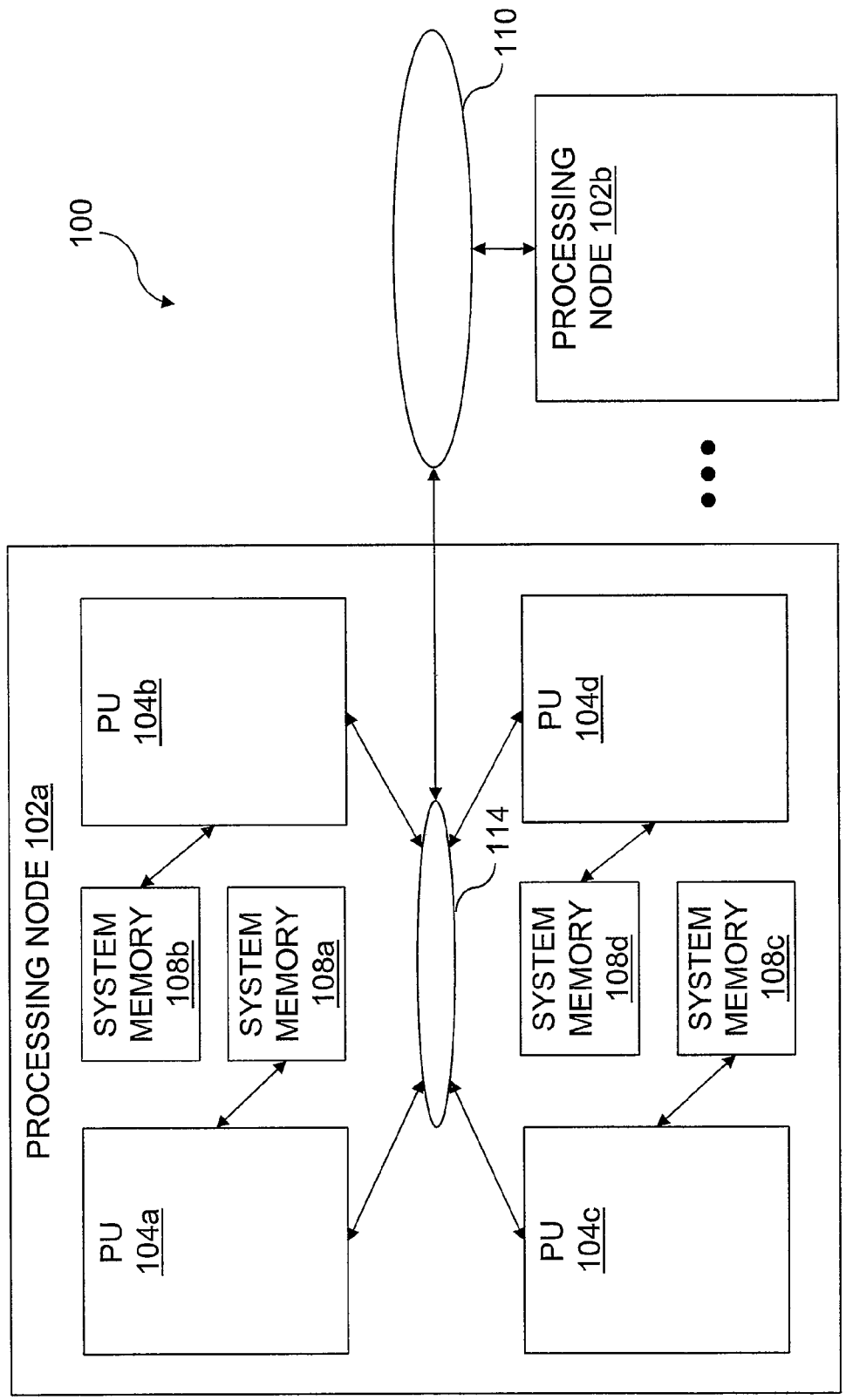
FIG. 1 is a high level block diagram of an exemplary data processing system in accordance with the present invention.

With reference now to the figures and, in particular, with reference to FIG. 1, there is illustrated a high level block diagram of an exemplary embodiment of a cache coherent symmetric multiprocessor (SMP) data processing system in accordance with the present invention. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches.

The devices coupled to each local interconnect 114 include not only processing units 104, but also one or more system memories 108a-108d. Data and instructions residing in system memories 108 can generally be accessed and modified by a processor core in any processing unit 104 in any processing node 102 of data processing system 100. In alternative embodiments of the invention, one or more system memories 108 can be coupled to system interconnect 110 rather than a local interconnect 114.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
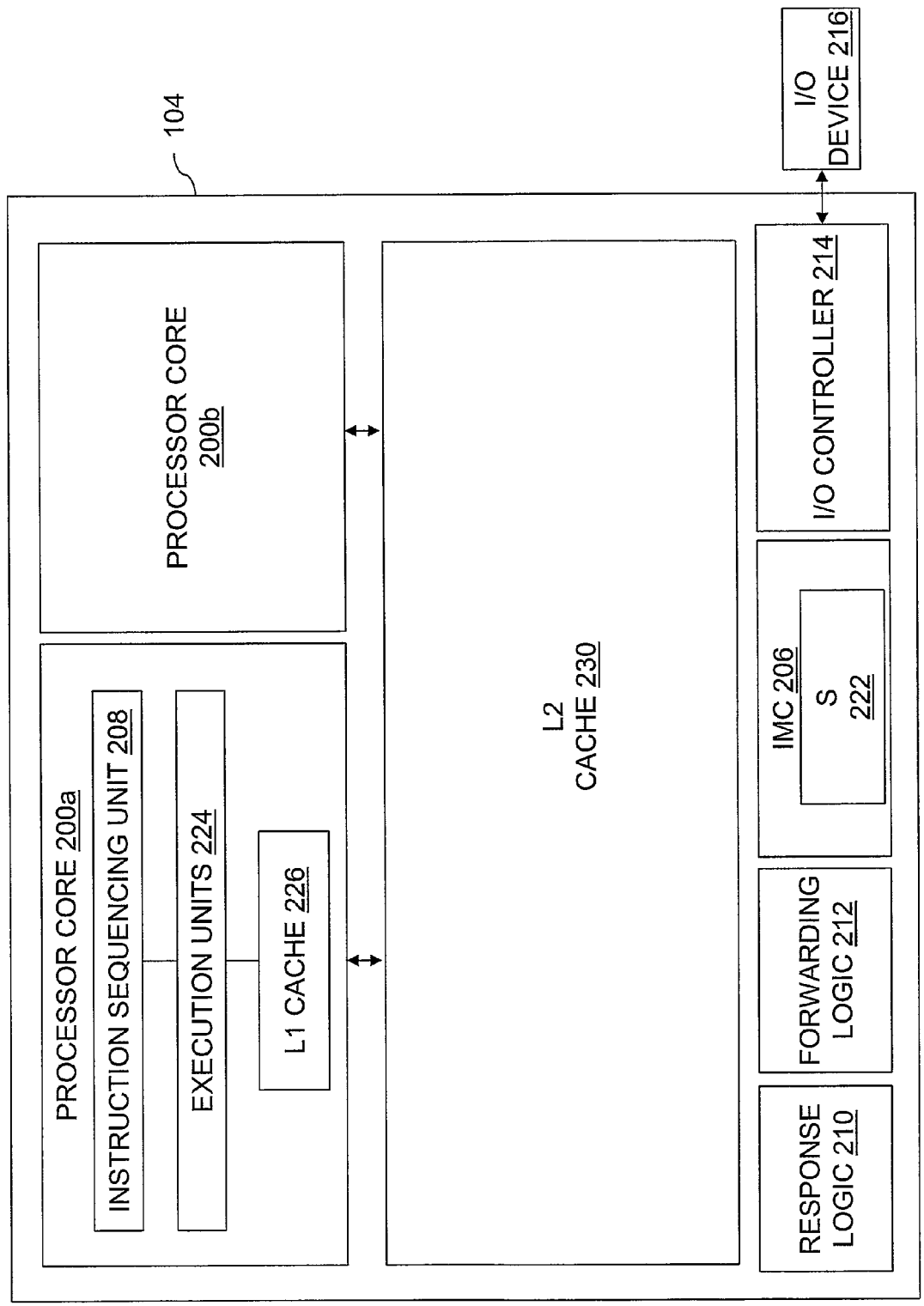
FIG. 2 is a more detailed block diagram of a processing unit in accordance with the present invention.

Referring now to FIG. 2, there is depicted a more detailed block diagram of an exemplary processing unit 104 in accordance with the present invention. In the depicted embodiment, each processing unit 104 includes two processor cores 200a, 200b for independently processing instructions and data. Each processor core 200 includes at least an instruction sequencing unit (ISU) 208 for fetching and ordering instructions for execution and one or more execution units 224 for executing instructions. The instructions executed by execution units 224 include instructions that request access to a memory block or cause the generation of a request for access to a memory block.

The operation of each processor core 200 is supported by a multi-level volatile memory hierarchy having at its lowest level shared system memories 108a-108d, and at its upper levels one or more levels of cache memory. In the depicted embodiment, each processing unit 104 includes an integrated memory controller (IMC) 206 that controls read and write access to a respective one of the system memories 108a-108d within its processing node 102 in response to requests received from processor cores 200a-200b and operations snooped by a snooper (S) 222 on the local interconnect 114.

In the illustrative embodiment, the cache memory hierarchy of processing unit 104 includes a store-through level one (L1) cache 226 within each processor core 200 and a level two (L2) cache 230 shared by all processor cores 200a, 200b of the processing unit 104. Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

Each processing unit 104 further includes an instance of response logic 210, which as discussed further below, implements a portion of the distributed coherency signaling mechanism that maintains cache coherency within data processing system 100. In addition, each processing unit 104 includes an instance of forwarding logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. As described further below, I/O controller 214 may issue operations on local interconnect 114 and/or system interconnect 110 in response to requests by I/O device 216.

Figure 3:
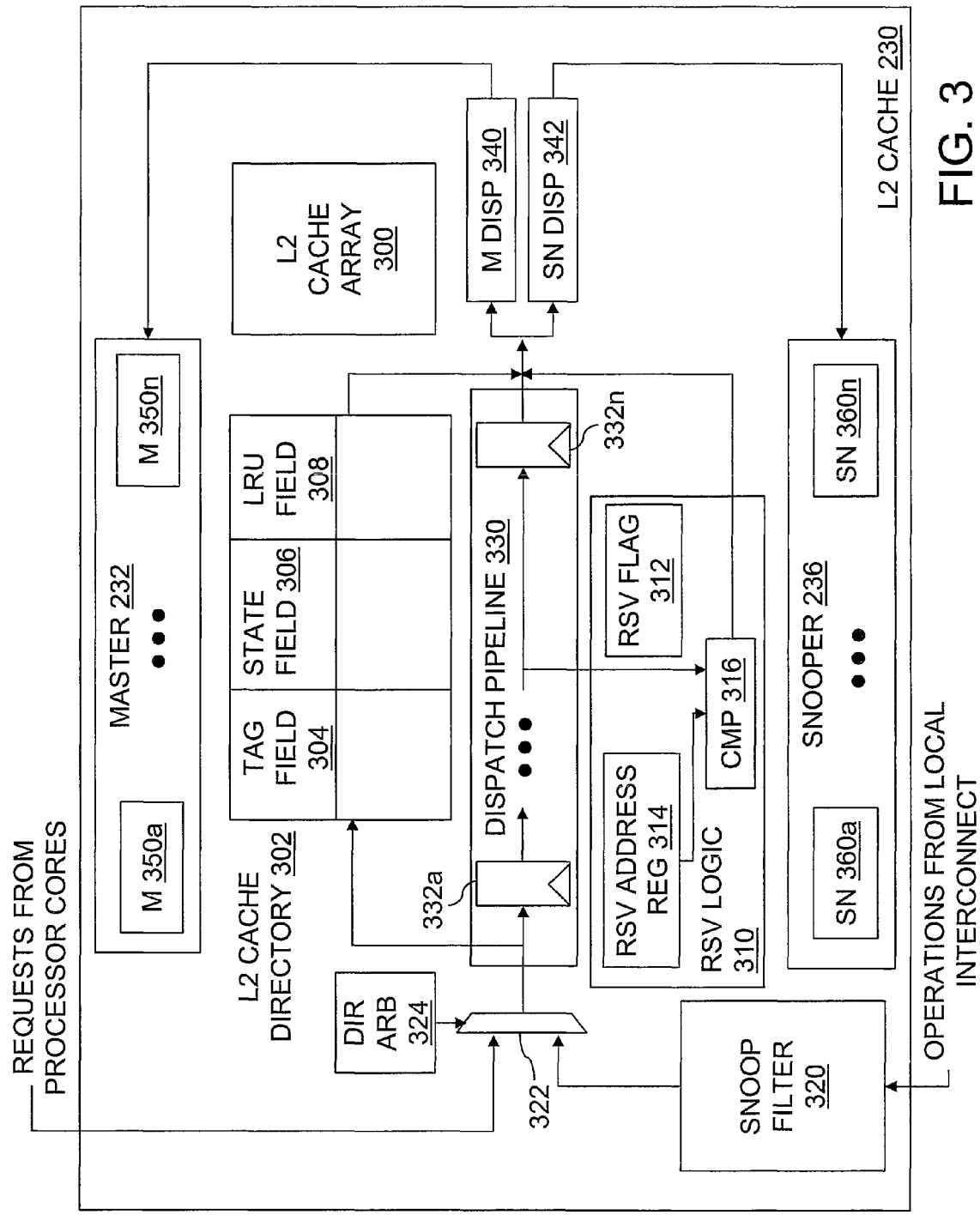
FIG. 3 is a more detailed block diagram of the L2 cache of FIG. 2.

With reference now to FIG. 3, there is illustrated a more detailed block diagram of an exemplary embodiment of an L2 cache 230 in accordance with the present invention. As illustrated, L2 cache 230 includes an L2 cache array 300 for storing memory blocks and an L2 cache directory 302 of the contents of L2 cache array 300. As in conventional set associative caches, memory locations in system memories 108 are mapped to particular congruence classes within L2 cache array 300 utilizing predetermined index bits within the system memory (real) addresses. The particular cache lines stored within cache array 300 are recorded in cache directory 302, which contains one directory entry for each cache line in L2 cache array 300. As understood by those skilled in the art, each directory entry in cache directory 302 comprises at least a tag field 304, which specifies the particular cache line stored in cache array 300 utilizing a tag portion of the corresponding real address, a state field 306, which indicates the coherency state of the cache line, and a LRU (Least Recently Used) field 308 indicating a replacement order for the cache line with respect to other cache lines in the same congruence class.

L2 cache 230 also includes reservation logic 310, which contains one or more reservation flags 312 (only one of which is shown) for indicating the presence or absence of a reservation of a real address by one of the associated processor cores 200. Each reservation flag 312 has an associated reservation register 314 for recording the real address for which the reservation is held. Reservation logic 310 further includes a comparator 316 for comparing the address(es) contained in reservation address register(s) 314 to the addresses specified by requests of the associated processor cores 200 and addresses specified by operations received from the local interconnect 114. For at least destructive processor core requests and interconnect operations, the detection of an address match by comparator 316 will cause the relevant reservation flag 312 to be reset to indicate that the reservation has been lost.

In accordance with the present invention, and as described in detail below with reference to FIG. 28, selected operations snooped from local interconnect 114 are filtered out by a snoop filter 320 in order to reduce contention for access to L2 cache directory 302. Requests by processor cores 200 and interconnect operations remaining after the filtering of snoop filter 320 are presented to a multiplexer 322, which places selected processor core requests and interconnect operations into dispatch pipeline 330 in response to signals from a directory arbiter 324. Dispatch pipeline 330 contains a number of latched stages 332a-332n from which, inter alia, access is made to L2 cache directory 302 and reservation logic 310 to determine the coherency state of the requested address in state field 306 and whether a reservation exists for the requested address in reservation logic 310.

Once the local reservation and coherency state information is obtained and appended to a processor core request or interconnect operation in dispatch pipeline 330, the processor core request or interconnect operation is dispatched for servicing. That is, master dispatcher 340 dispatches each processor core request to one of master logic instances 350a-350n within master 232 for servicing, and snoop dispatcher 342 dispatches each interconnect operation to one of snoop logic instances 360a-360n within snooper 236 for servicing. Master logic instances 350 initiate transactions on local interconnect 114 and system interconnect 110 and access L2 cache directory 302 and L2 cache array 300 in response to the processor core requests received from the associated processor cores 200a-200b. Snooper logic instances 360 provide appropriate responses to interconnect operations and perform any accesses to L2 cache directory 302 and L2 cache array 300 required by these operations.

II. Exemplary Operation

Figure 4:
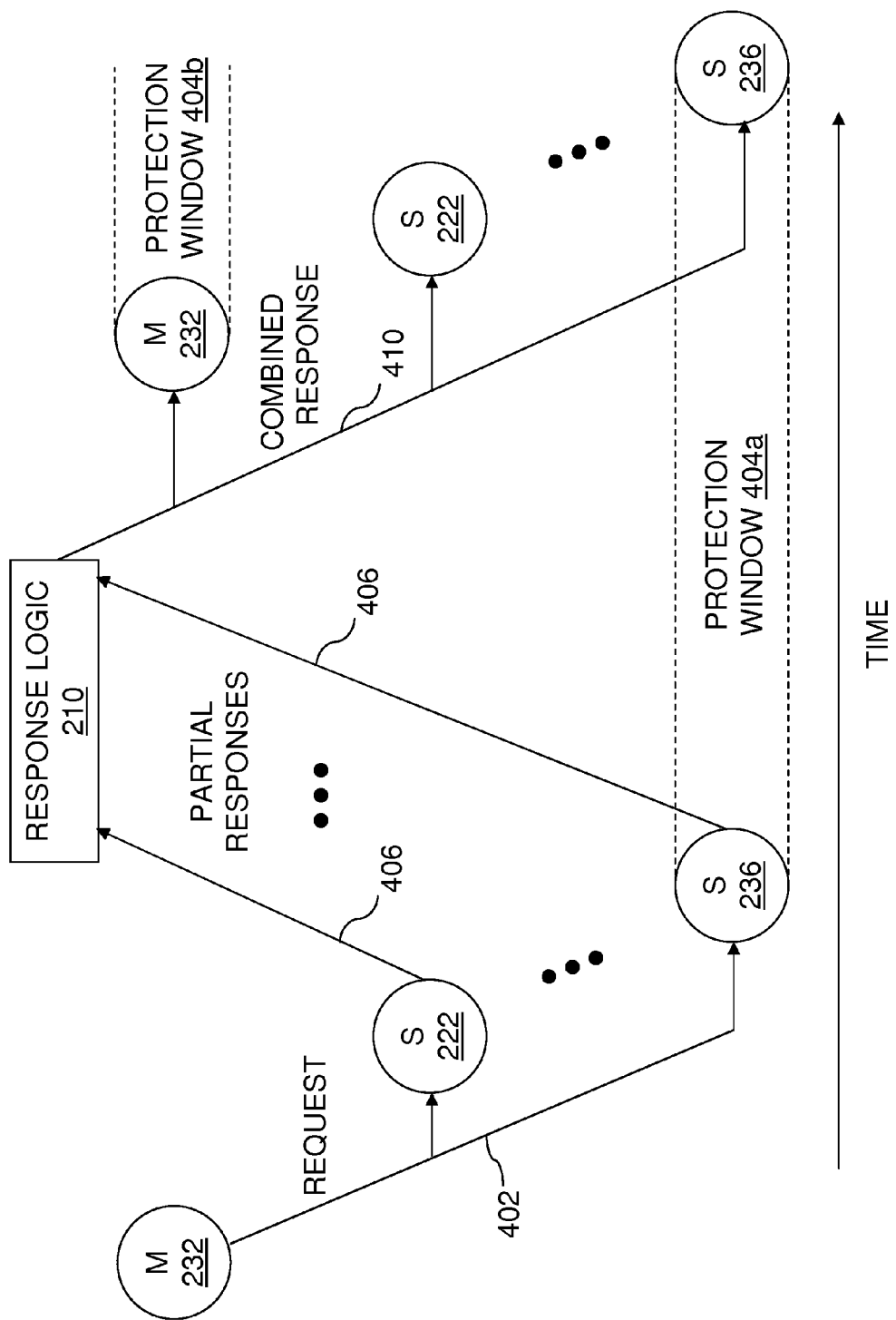
FIG. 4 is a time-space diagram of an exemplary transaction on the system interconnect of the data processing system of FIG. 1.

Referring now to FIG. 4, there is depicted a time-space diagram of an exemplary operation on a local or system interconnect 110, 114 of data processing system 100 of FIG. 1. The operation begins when a master 232 of an L2 cache 230 (or another master, such as an I/O controller 214) issues a request 402 on a local interconnect 114 and/or system interconnect 110. Request 402 preferably includes a transaction type indicating a type of desired access and a resource identifier (e.g., real address) indicating a resource to be accessed by the request. Common types of requests preferably include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Request 402 is received by the snooper 236 of L2 caches 230, as well as the snoopers 222 of memory controllers 206 (FIG. 1). In general, with some exceptions, the snooper 236 in the same L2 cache 230 as the master 232 of request 402 does not snoop request 402 (i.e., there is generally no self-snooping) because a request 402 is transmitted on local interconnect 114 and/or system interconnect 110 only if the request 402 cannot be serviced internally by a processing unit 104.

Each snooper 222, 236 that receives request 402 provides a respective partial response 406 representing the response of at least that snooper to request 402. A snooper 222 within a memory controller 206 determines the partial response 406 to provide based, for example, whether the snooper 222 is responsible for the request address and whether it has resources available to service the request. A snooper 236 of an L2 cache 230 may determine its partial response 406 based on, for example, the availability of its L2 cache directory 302, the availability of a snoop logic instance within snooper 236 to handle the request, and the coherency state associated with the request address in L2 cache directory 302.

The partial responses of snoopers 222 and 236 are logically combined either in stages or all at once by one or more instances of response logic 210 to determine a system-wide combined response (CR) 410 to request 402. Subject to the scope restrictions discussed below, response logic 210 provides combined response 410 to master 232 and snoopers 222, 236 via its local interconnect 114 and/or system interconnect 110 to indicate the system-wide response (e.g., success, failure, retry, etc.) to request 402. If CR 410 indicates success of request 402, CR 410 may indicate, for example, a data source for a requested memory block, a cache state in which the requested memory block is to be cached by master 232, and whether "cleanup" operations invalidating the requested memory block in one or more L2 caches 230 are required.

In response to receipt of combined response 410, one or more of master 232 and snoopers 222, 236 typically perform one or more operations in order to service request 402. These operations may include supplying data to master 232, invalidating or otherwise updating the coherency state of data cached in one or more L2 caches 230, performing castout operations, writing back data to a system memory 108, etc. As discussed further below, if required by request 402, a requested or target memory block may be transmitted to or from master 232 before or after the generation of combined response 410 by response logic 210.

In the following description, partial response of a snooper 222, 236 to a request and the operations performed the snooper in response to the request and/or its combined response will be described with reference to whether that snooper is a Highest Point of Coherency (HPC), a Lowest Point of Coherency (LPC), or neither with respect to the request address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 206 for the system memory 108 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1 and 2, the HPC, if any, will be an L2 cache 230. Although other indicators may be utilized to designate an HPC for a memory block, a preferred embodiment of the present invention designates the HPC, if any, for a memory block utilizing selected cache coherency state(s) within the L2 cache directory 302 of an L2 cache 230, as described further below with reference to Table II.

Still referring to FIG. 4, the HPC, if any, for a memory block referenced in a request 402, or in the absence of an HPC, the LPC of the memory block, preferably has the responsibility of protecting the transfer of ownership of a memory block in response to a request 402 during a protection window 404a. In the exemplary scenario shown in FIG. 4, the snooper 236 that is the HPC for the memory block specified by the request address of request 402 protects the transfer of ownership of the requested memory block to master 232 during a protection window 404a that extends from the time that snooper 236 determines its partial response 406 until snooper 236 receives combined response 410. During protection window 404a, snooper 236 protects the transfer of ownership by providing partial responses 406 to other requests specifying the same request address that prevent other masters from obtaining ownership until ownership has been successfully transferred to master 232. Master 232 likewise initiates a protection window 404b to protect its ownership of the memory block requested in request 402 following receipt of combined response 410.

Because snoopers 222, 236 all have limited resources for handling the CPU and I/O requests described above, several different levels of partial responses and corresponding CRs are possible. For example, if a snooper 222 within a memory controller 206 that is responsible for a requested memory block has queue available to handle a request, the snooper 222 may respond with a partial response indicating that it is able to serve as the LPC for the request. If, on the other hand, the snooper 222 has no queue available to handle the request, the snooper 222 may respond with a partial response indicating that is the LPC for the memory block, but is unable to currently service the request.

Similarly, a snooper 236 in an L2 cache 230 may require an available instance of snoop logic and access to L2 cache directory 302 in order to handle a request. Absence of access to either (or both) of these resources results in a partial response (and corresponding CR) signaling an inability to service the request due to absence of a required resource.

Hereafter, a snooper 222, 236 providing a partial response indicating that the snooper has available all internal resources required to service a request, if required, is said to "affirm" the request. For snoopers 236, partial responses affirming a snooped operation preferably indicate the cache state of the requested or target memory block at that snooper 236. A snooper 236 providing a partial response indicating that the snooper 236 does not have available all internal resources required to service the request may be said to be "possibly hidden." Such a snooper 236 is "possibly hidden" because the snooper 236, due to lack of an available instance of snoop logic or access to L2 cache directory 302, cannot "affirm" the request in sense defined above and has, from the perspective of other masters 232 and snoopers 222, 236, an unknown coherency state.

III. Data Delivery Domains

Conventional broadcast-based data processing systems handle both cache coherency and data delivery through broadcast communication, which in conventional systems is transmitted on a system interconnect to at least all memory controllers and cache hierarchies in the system. As compared with systems of alternative architectures and like scale, broadcast-based systems tend to offer decreased access latency and better data handling and coherency management of shared memory blocks.

As broadcast-based system scale in size, traffic volume on the system interconnect is multiplied, meaning that system cost rises sharply with system scale as more bandwidth is required for communication over the system interconnect. That is, a system with m processor cores, each having an average traffic volume of n transactions, has a traffic volume of m×n, meaning that traffic volume in broadcast-based systems scales multiplicatively not additively. Beyond the requirement for substantially greater interconnect bandwidth, an increase in system size has the secondary effect of increasing some access latencies. For example, the access latency of read data is limited, in the worst case, by the combined response latency of the furthest away lower level cache holding the requested memory block in a shared coherency state from which the requested data can be sourced.

In order to reduce system interconnect bandwidth requirements and access latencies while still retaining the advantages of a broadcast-based system, the present invention reduces data access latency by decreasing the average distance between a requesting L2 cache 230 and an data source. One technique for do so is to reducing the average distance between a requesting L2 cache 230 and a data source is to permit multiple L2 caches 230 distributed throughout data processing system 100 to hold copies of the same memory block in a "special" shared coherency state that permits these caches to supply the memory block to requesting L2 caches 230 using cache-to-cache intervention.

In order to implement multiple concurrent and distributed sources for shared memory blocks in an SMP data processing system, such as data processing system 100, two issues must be addressed. First, some rule governing the creation of copies of memory blocks in the "special" shared coherency state alluded to above must be implemented. Second, there must be a rule governing which snooping L2 cache 230, if any, provides a shared memory block to a requesting L2 cache 230, for example, in response to a bus read operation or bus RWITM operation.

According to the present invention, both of these issues are addressed through the implementation of data sourcing domains. In particular, each domain within a SMP data processing system, where a domain is defined to include one or more lower level (e.g., L2) caches that participate in responding to data requests, is permitted to include only one cache hierarchy that holds a particular memory block in the "special" shared coherency state at a time. That cache hierarchy, if present when a bus read-type (e.g., read or RWITM) operation is initiated by a requesting lower level cache in the same domain, is responsible for sourcing the requested memory block to the requesting lower level cache. Although many different domain sizes may be defined, in data processing system 100 of FIG. 1, it is convenient if each processing node 102 (i.e., MCM) is considered a data sourcing domain. One example of such a "special" shared state (i.e., Sr) is described below with reference to Table II.

IV. Coherency Domains

While the implementation of data delivery domains as described above improves data access latency, this enhancement does not address the m×n multiplication of traffic volume as system scale increases. In order to reduce traffic volume while still maintaining a broadcast-based coherency mechanism, preferred embodiments of the present invention additionally implement coherency domains, which like the data delivery domains hereinbefore described, can conveniently (but are not required to be) implemented with each processing node 102 forming a separate coherency domain. Data delivery domains and coherency domains can be, but are not required to be coextensive, and for the purposes of explaining exemplary operation of data processing system 100 will hereafter be assumed to have boundaries defined by processing nodes 102.

The implementation of coherency domains reduces system traffic by limiting inter-domain broadcast communication over system interconnect 110 in cases in which requests can be serviced with participation by fewer than all coherency domains. For example, if processing unit 104*a* of processing node 102*a* has a bus read operation to issue, then processing unit 104*a* may elect to first broadcast the bus read operation to all participants within its own coherency domain (e.g., processing node 102*a*), but not to participants in other coherency domains (e.g., processing node 102*b*). A broadcast operation transmitted to only those participants within the same coherency domain as the master of the operation is defined herein as a "local operation". If the local bus read operation can be serviced within the coherency domain of processing unit 104*a*, then no further broadcast of the bus read operation is performed. If, however, the partial responses and combined response to the local bus read operation indicate that the bus read operation cannot be serviced solely within the coherency domain of processing node 102*a*, the scope of the broadcast may then be extended to include, in addition to the local coherency domain, one or more additional coherency domains.

In a basic implementation, two broadcast scopes are employed: a "local" scope including only the local coherency domain and a "global" scope including all of the other coherency domains in the SMP data processing system. Thus, an operation that is transmitted to all coherency domains in an SMP data processing system is defined herein as a "global operation". Importantly, regardless of whether local operations or operations of more expansive scope (e.g., global operations) are employed to service operations, cache coherency is maintained across all coherency domains in the SMP data processing system.

In a preferred embodiment, the scope of an operation is indicated in a bus operation by a local/global indicator (signal), which in one embodiment may comprise a 1-bit flag. Forwarding logic 212 within processing units 104 preferably determines whether or not to forward an operation received via local interconnect 114 onto system interconnect 110 based upon the setting of the local/global indicator (signal) in the operation.

V. Domain Indicators

Figure 5:
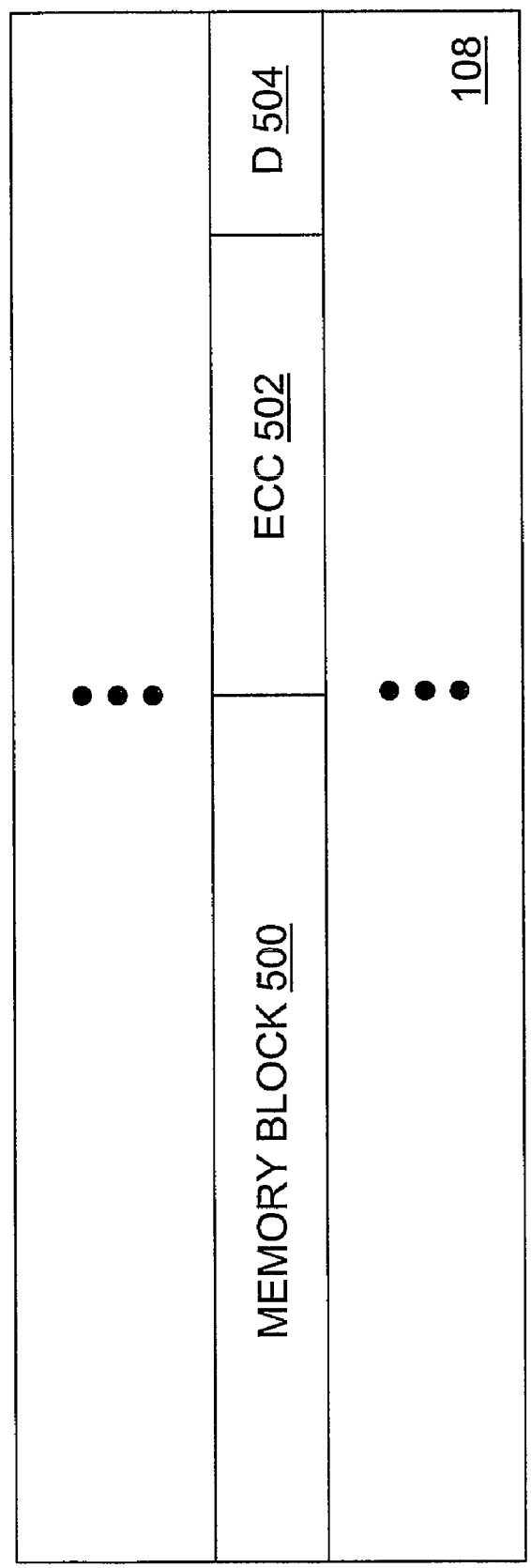
FIG. 5 illustrates a domain indicator in accordance with a preferred embodiment of the present invention.

In order to limit the issuance of unneeded local operations and thereby reduce operational latency and conserve additional bandwidth on local interconnects, the present invention preferably implements a domain indicator per memory block that indicates whether or not a copy of the associated memory block is cached outside of the local coherency domain. For example, FIG. 5 depicts a first exemplary implementation of a domain indicator in accordance with the present invention. As shown in FIG. 5, a system memory 108, which may be implemented in dynamic random access memory (DRAM), stores a plurality of memory blocks 500. System memory 108 stores in association with each memory block 500 an associated error correcting code (ECC) 502 utilized to correct errors, if any, in memory block 500 and a domain indicator 504. Although in some embodiments of the present invention, domain indicator 504 may identify a particular coherency domain (i.e., specify a coherency domain or node ID), it is hereafter assumed that domain indicator 504 is a 1-bit indicator that is set (e.g., to '1' to indicate "local") if the associated memory block 500 is cached, if at all, only within the same coherency domain as the memory controller 206 serving as the LPC for the memory block 500. Domain indicator 504 is reset (e.g., to '0' to indicate "global") otherwise. The setting of domain indicators 504 to indicate "local" may be implemented imprecisely in that a false setting of "global" will not induce any coherency errors, but may cause unneeded global broadcasts of operations.

Importantly, memory controllers 206 (and L2 caches 230) that source a memory block in response to an operation preferably transmit the associated domain indicator 504 in conjunction with the requested memory block.

VI. Exemplary Coherency Protocol

The present invention preferably implements a cache coherency protocol designed to leverage the implementation of data delivery and coherency domains as described above. In a preferred embodiment, the cache coherency states within the protocol, in addition to providing (1) an indication of whether a cache is the HPC for a memory block, also indicate (2) whether the cached copy is unique (i.e., is the only cached copy system-wide) among caches at that memory hierarchy level, (3) whether and when the cache can provide a copy of the memory block to a master of a request for the memory block, (4) whether the cached image of the memory block is consistent with the corresponding memory block at the LPC (system memory), and (5) whether another cache in a remote coherency domain (possibly) holds a cache entry having a matching address. These five attributes can be expressed, for example, in an exemplary variant of the well-known MESI (Modified, Exclusive, Shared, Invalid) protocol summarized below in Table II.

A. Ig State

In order to avoid having to access the LPC to determine whether or not the memory block is known to be cached, if at all, only locally, the Ig (Invalid global) coherency state is utilized to maintain a domain indication in cases in which no copy of a memory block remains cached in a coherency domain. The Ig state is defined herein as a cache coherency state indicating (1) the associated memory block in the cache array is invalid, (2) the address tag in the cache directory is valid, and (3) a copy of the memory block identified by the address tag may possibly be cached in another coherency domain.

The Ig state is formed in a lower level cache in response to that cache providing a requested memory block to a requester in another coherency domain in response to an exclusive access request (e.g., a bus RWITM operation). In some embodiments of the present invention, it may be preferable to form the Ig state only in the coherency domain containing the LPC for the memory block. In such embodiments, some mechanism (e.g., a partial response by the LPC and subsequent combined response) must be implemented to indicate to the cache sourcing the requested memory block that the LPC is within its local coherency domain. In other embodiments that do not support the communication of an indication that the LPC is local, an Ig state may be formed any time that a cache sources a memory block to a remote coherency node in response to an exclusive access request.

Because cache directory entries including an Ig state carry potentially useful information, it is desirable in at least some implementations to preferentially retain entries in the Ig state over entries in the I state (e.g., by modifying the Least

TABLE II

| Cache state | HPC? | Unique? | Data source? | Consistent with LPC? | Cached outside local domain? | Legal concurrent states |
|---|---|---|---|---|---|---|
| M | yes | yes | yes, before CR | no | no | I, Ig (& LPC) |
| Me | yes | yes | yes, before CR | yes | no | I, Ig (& LPC) |
| T | yes | unknown | yes, after CR if none provided before CR | no | unknown | Sr, S, I, Ig (& LPC) |
| Tn | yes | unknown | yes, after CR if none provided before CR | no | no | Sr, S, I, Ig (& LPC) |
| Te | yes | unknown | yes, after CR if none provided before CR | yes | unknown | Sr, S, I, Ig (& LPC) |
| Ten | yes | unknown | yes, after CR if none provided before CR | yes | no | Sr, S, I, Ig (& LPC) |
| Sr | no | unknown | yes, before CR | unknown | unknown | T, Tn, Te, Ten, S, I, Ig (& LPC) |
| S | no | unknown | no | unknown | unknown | T, Tn, Te, Ten, Sr, S, I, Ig (& LPC) |
| I | no | n/a | no | n/a | unknown | M, Me, T, Tn, Te, Ten, Sr, S, I, Ig (& LPC) |
| Ig | no | n/a | no | n/a | Assumed so, in absence of other information | M, Me, T, Tn, Te, Ten, Sr, S, I, Ig (& LPC) |

Recently Used (LRU) algorithm utilized to select a victim cache entry for replacement). As Ig directory entries are retained in cache, it is possible for some Ig entries to become "stale" over time in that a cache whose exclusive access request caused the formation of the Ig state may deallocate or writeback its copy of the memory block without notification to the cache holding the address tag of the memory block in the Ig state. In such cases, the "stale" Ig state, which incorrectly indicates that a global operation should be issued instead of a local operation, will not cause any coherency errors, but will merely cause some operations, which could otherwise be serviced utilizing a local operation, to be issued as global operations. Occurrences of such inefficiencies will be limited in duration by the eventual replacement of the "stale" Ig cache entries.

Several rules govern the selection and replacement of Ig cache entries. First, if a cache selects an Ig entry as the victim for replacement, a castout of the Ig entry is performed (unlike the case when an I entry is selected). Second, if a request that causes a memory block to be loaded into a cache hits on an Ig cache entry in that same cache, the cache treats the Ig hit as a cache miss and performs a castout operation with the an Ig entry as the selected victim. The cache thus avoids avoid placing two copies of the same address tag in the cache directory. Third, the castout of the Ig state is preferably performed as a local operation, or if performed as a global operation, ignored by the LPC of the castout address. If an Ig entry is permitted to form in a cache that is not within the same coherency domain as the LPC for the memory block, no update to the domain indicator in the LPC is required. Fourth, the castout of the Ig state is preferably performed as a dataless address-only operation in which the domain indicator is written back to the LPC (if local to the cache performing the castout).

Implementation of an Ig state in accordance with the present invention improves communication efficiency by maintaining a cached domain indicator for a memory block in a coherency domain even when no valid copy of the memory block remains cached in the coherency domain. As a consequence, an HPC for a memory block can service an exclusive access request (e.g., bus RWITM operation) from a remote coherency domain without retrying the request and performing a push of the requested memory block to the LPC.

B. Sr State

In the operations described below, it is useful to be able to determine whether or not a lower level cache holding a shared requested memory block in the Sr coherency state is located within the same domain as the requesting master. In one embodiment, the presence of a "local" Sr snooper within the same domain as the requesting master can be indicated by the response behavior of a snooper at a lower level cache holding a requested memory block in the Sr coherency state. For example, assuming that each bus operation includes a scope indicator indicating whether the bus operation has crossed a domain boundary (e.g., an explicit domain identifier of the master or a single local/not local bit), a lower level cache holding a shared memory block in the Sr coherency state can provide a partial response affirming the request in the Sr state only for requests by masters within the same data sourcing domain and provide partial responses indicating the S state for all other requests. In such embodiments the response behavior can be summarized as shown in Table III, where prime (') notation is utilized to designate partial responses that may differ from the actual cache state of the memory block.

TABLE III

| Domain of master of read-type request | Cache state in directory | Partial response (adequate resources available) | Partial response (adequate resources unavailable) |
|---|---|---|---|
| "local" (i.e., within same domain) | Sr | Sr' affirm | Sr' possibly hidden |
| "remote" (i.e., not within same domain) | Sr | S' affirm | S' possibly hidden |
| "local" (i.e., within same domain) | S | S' affirm | S' possibly hidden |
| "remote" (i.e., not within same domain) | S | S' affirm | S' possibly hidden |

Assuming the response behavior set forth above in Table III, the average data latency for shared data can be significantly decreased by increasing the number of shared copies of memory blocks distributed within an SMP data processing system that may serve as data sources.

VII. Exemplary Operations

With reference now generally to FIGS. 6-27, several high level logical flowcharts depicting the logical steps involved in servicing requests of processor cores 200, L2 caches 230 and I/O controllers 214 are given. In particular, FIGS. 6-12 depict the various processes within masters of the requests, and FIGS. 13-27 illustrate operations involved with communicating and servicing the requests via local and system interconnects 114, 110. Even though interconnects 110, 114 are not necessarily bused interconnects, such operations are termed "bus operations" (e.g., bus read operation, bus write operation, etc.) herein to distinguish them from cache or CPU (processor) operations. As logical flowcharts, it should be understood that these figures are not intended to convey a strict chronology of operations and that many of the illustrated operations may be performed concurrently or in a different order than that shown.

A. CPU and Cache Operations

Figure 6:
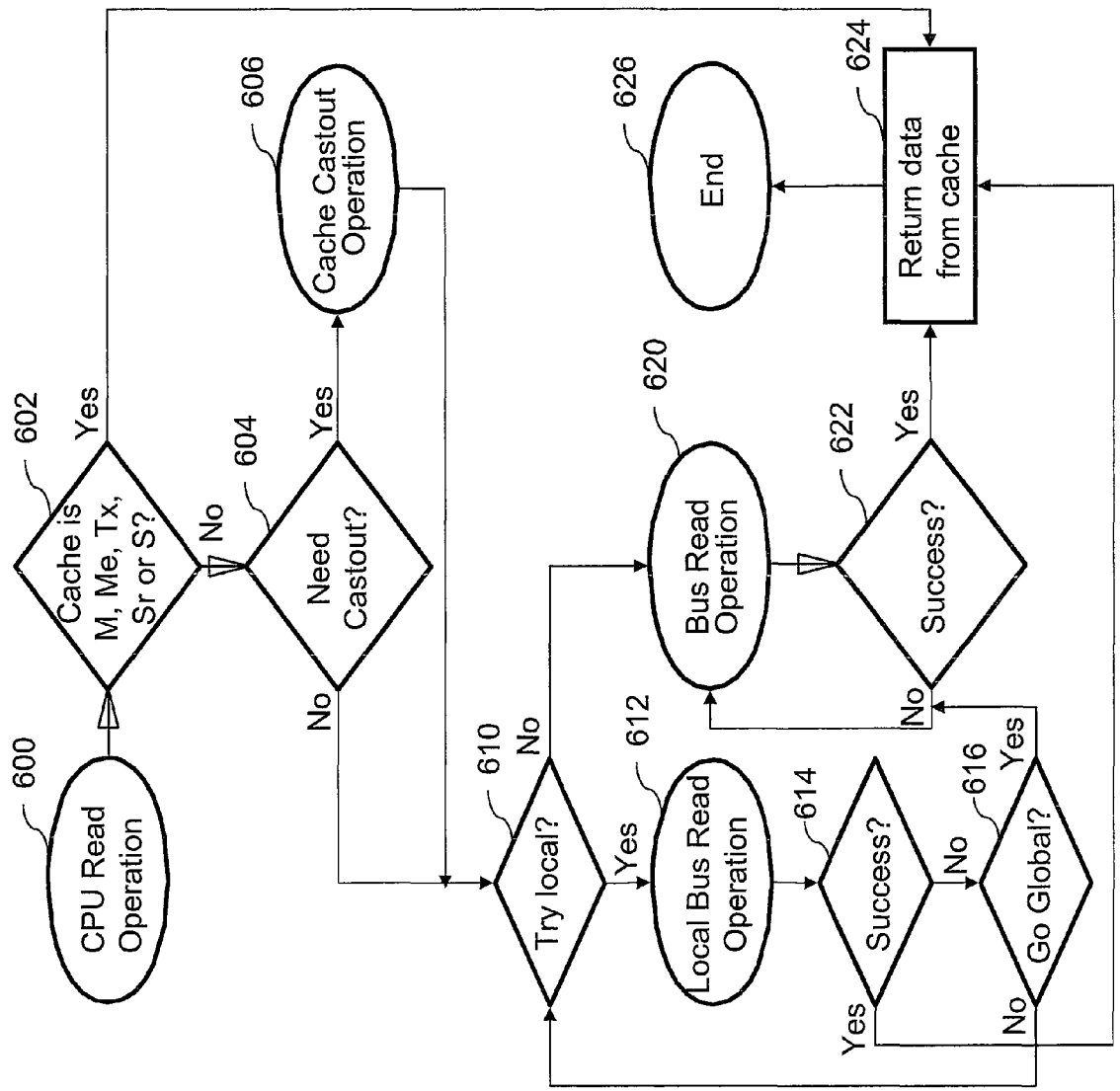
FIG. 6 is a high level logical flowchart of an exemplary method of servicing a read operation by a processor core in a data processing system in accordance with the present invention.

With reference first to FIG. 6, there is depicted a high level logical flowchart of an exemplary method of servicing a processor read operation in a data processing system in accordance with the present invention. As shown, the process begins at block 600, which represents a master 232 in an L2 cache 230 receiving a read request from an associated processor core 200. In response to receipt of the read request, master 232 determines at block 602 whether or not the requested memory block is held in L2 cache directory 302 in any of the M, Me, Tx (e.g., T, Tn, Te or Ten), Sr or S states. If so, master 232 accesses L2 cache array 300 to obtain the requested memory block and supplies the requested memory block to the requesting processor core 200, as shown at block 624. The process thereafter terminates at block 626.

Returning to block 602, if the requested memory block is not held in L2 directory 302 in any of the M, Me, Tx, S, or Sr states, a determination is also made at block 604 whether or not a castout of an existing cache line is required to accommodate the requested memory block in L2 cache 230. In one embodiment, a castout operation is required at block 604 and at similar blocks in succeeding figures if the memory block selected as a victim for eviction from the L2 cache 230 of the requesting processor is marked in L2 directory 302 as being in any of the M, T, Te, Tn or Ig coherency states. In response to a determination at block 604 that a castout is required, a cache castout operation is performed, as indicated at block 606. Concurrently, the master 232 determines at block 610 whether or not to issue a bus read operation as a local operation or a global operation.

In a first embodiment in which each bus operation is initially issued as a local operation and issued as a local operation only once, the determination depicted at block 610 (and like determinations in succeeding figures) can simply represent a determination by the master of whether or not the bus read operation has previously been issued as a local bus read operation. In a second alternative embodiment in which local bus operations can be retried, the determination depicted at block 610 can represent a determination by the master of whether or not the bus read operation has previously been issued more than a threshold number of times. In a third alternative embodiment, the determination made at block 610 can be based upon a prediction by the master of whether or not a local operation is likely to be successful (e.g., is the HPC or is likely to find the HPC in the local coherency domain). Exemplary implementations of this third alternative embodiment are described in greater detail below.

In response to a determination at block 610 to issue a global bus read operation rather than a local bus read operation, the process proceeds from block 610 to block 620, which is described below. If, on the other hand, a determination is made at block 610 to issue a local bus read operation, master 232 initiates a local bus read operation on its local interconnect 114, as illustrated at block 612 and described below with reference to FIG. 13. The local bus read operation is broadcast only within the local coherency domain (e.g., processing node 102) containing master 232. If master 232 receives a CR indicating "success" (block 614), master 232 receives the requested memory block and returns the requested memory block (or at least a portion thereof) to the requesting processor core 200, as shown at block 624. Thereafter, the process ends at block 626.

Returning to block 614, if the CR for the local bus read operation does not indicate "success", master 232 makes a determination at block 616 whether or the CR definitively indicates that the bus read operation cannot be serviced within the local coherency domain and should therefore be reissued as a global bus read operation. If so (e.g., if an L2 cache 230 in another coherency domain holds the requested memory block in the M state or Me state), the process passes to block 620, which is described below. If, on the other hand, the CR does not definitively indicate that the bus read operation cannot be serviced within the local coherency domain, the process returns from block 616 to block 610, which illustrates master 232 again determining whether or not to issue a local bus read operation. In this case, master 232 may employ in the determination any additional information provided by the CR. Following block 610, the process passes to either block 612, which is described above, or to block 620.

Block 620 depicts master 230 issuing a global bus read operation as described below with reference to FIG. 14. If the CR of the global bus read operation does not indicate "success" at block 622, master 232 repeats the global bus read operation at block 620 until a CR indicating "success" is received. If the CR of the global bus read operation indicates "success", the master 232 receives the requested memory block and returns the requested memory block (or at least a portion thereof) to the requesting processor core 200 at block 624. The process thereafter terminates at block 626.

Thus, assuming affinity between processes and their data within the same coherency domain, operations, such as the CPU read operation depicted in FIG. 6, can frequently be serviced utilizing broadcast communication limited in scope to the coherency domain of the requesting master. The combination of data delivery domains as hereinbefore described and coherency domains thus improves not only data access latency, but also reduces traffic on the system interconnect (and other local interconnects) by limiting the scope of broadcast communication.

Figure 7A:
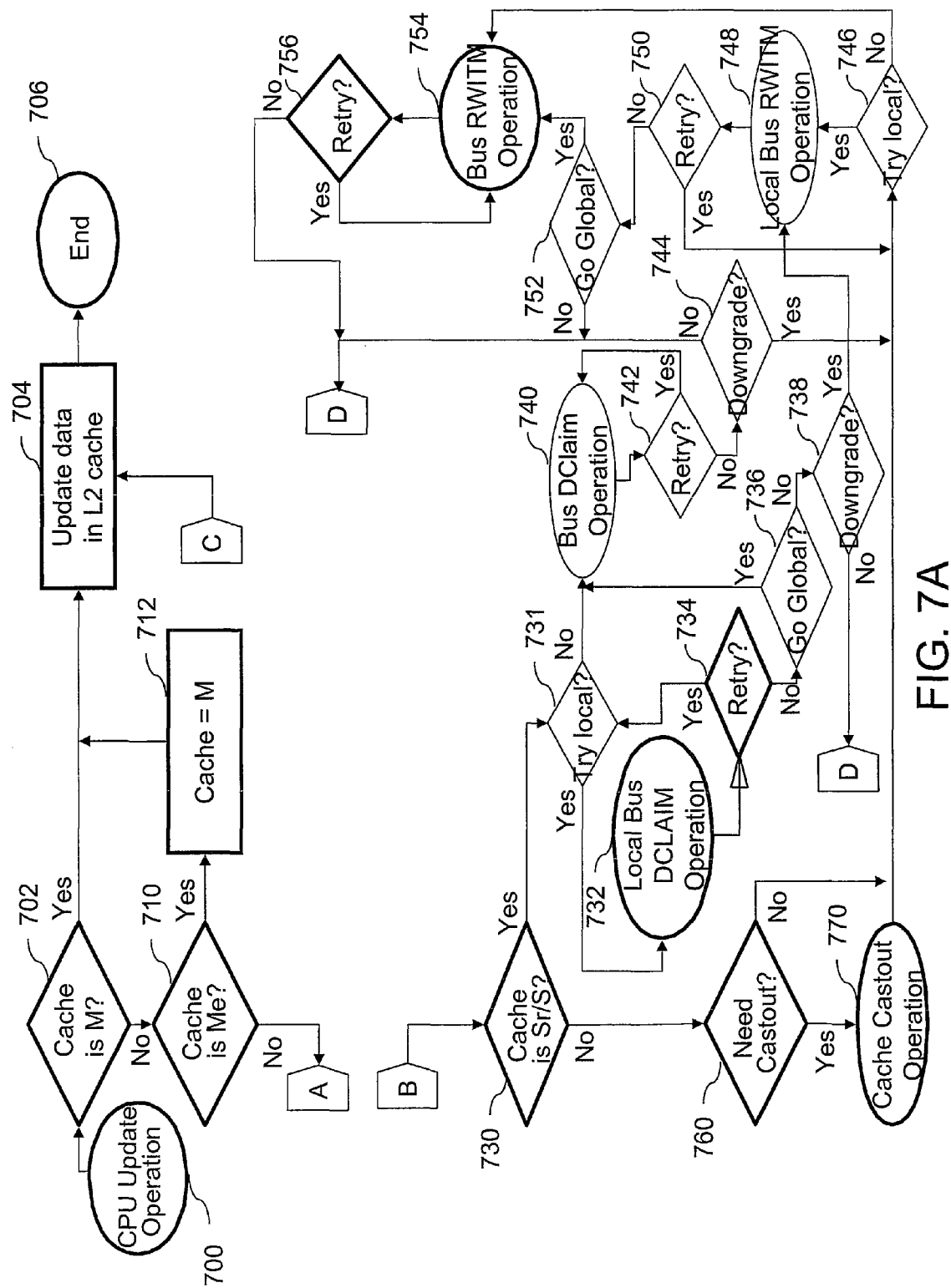
FIGS. 7A-7B together form a high level logical flowchart of an exemplary method of servicing a processor update operation in a data processing system in accordance with the present invention.
Figure 7B:
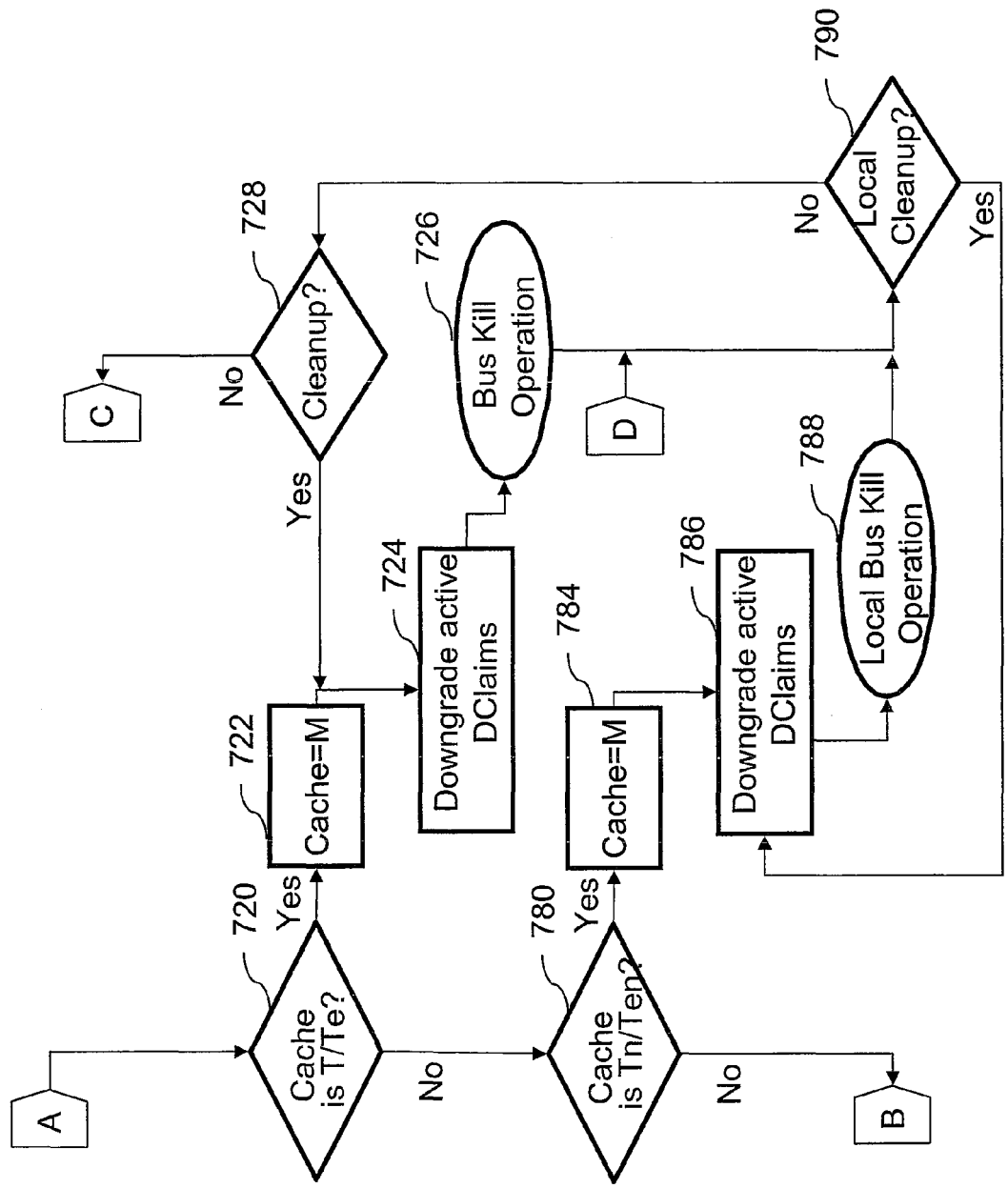

Referring now to FIG. 7A-7B, there is illustrated a high level logical flowchart of an exemplary method of servicing a processor update operation in a data processing system in accordance with the present invention. As depicted, the process begins at block 700 in response to receipt by an L2 cache 230 of an update request by an associated one of the processor cores 200 within the same processing unit 104. In response to the receipt of the update request, master 232 of the L2 cache 230 accesses L2 cache directory 302 to determine if the memory block referenced by the request address specified by the update request is cached within L2 cache 230 in M state, as shown at block 702. If so, the master 232 updates the memory block in L2 cache 232 within the new data supplied by the processor core 200, as illustrated at block 704. Thereafter, the update process ends at block 706.

As shown at blocks 710-712, if L2 cache directory 302 instead indicates that L2 cache 230 holds the specified memory block in the Me state, master 232 updates the state field 306 for the requested memory block to M state in addition to updating the memory block as shown at block 704. Thereafter, the process terminates at block 706.

Following page connector A to FIG. 7B, if L2 cache directory 302 indicates that L2 cache 230 holds the requested memory block in either of the T or Te states (block 720), meaning that the L2 cache 230 is the HPC for the requested memory block and the requested memory block may possibly be held in one or more other L2 caches 230, master 232 must gain exclusive access to the requested memory block in order to perform the requested update to the memory block. The process by which master 232 gains exclusive access to the requested memory block is shown at block 722 and following blocks.

According to this process, master 232 updates the state of the requested memory block in the associated state field 306 of L2 cache directory 302 to the M state, as depicted at block 722. This upgrade is cache state is permissible without first informing other L2 caches 230 because, as the HPC, the L2 cache 230 has the authority to award itself exclusive access to the requested memory block. As illustrated at block 724, the snooper 236 of the L2 cache 230 provides "downgrade" partial responses to competing DClaim operations snooped on its local interconnect 114, if any, by which other masters are seeking ownership of the requested memory block. These partial responses indicate that the other requesters must reissue any such competing operations as bus RWITM operations. In addition, as depicted at block 726, master 232 issues a global bus kill operation on system interconnect 110 to invalidate any other cached copies of the memory block, as described below with reference to FIG. 20.

Master 232 next determines at blocks 790 and 728 whether or not the CR for the bus kill operation indicates that the bus kill operation successfully invalidated all other cached copies of the requested memory block or whether additional local or global "cleanup" (i.e., invalidation of other cached copies) is required. If the CR indicates that additional cleanup is not required, the process proceeds through page connector C to block 704 of FIG. 7A, which has been described. If the CR indicates that additional cleanup is required, master 232 additionally determines whether the CR indicates that the other cached copy or copies of the requested memory block reside entirely within its local coherency domain or whether at least one copy of the requested memory block is cached outside the local coherency domain of master 232 (blocks 790 and 728). If the CR indicates that each remaining cached copy of the requested memory block resides in the local coherency domain of master 232, the snooper 236 of the requesting L2 cache 230 continues to downgrade active bus DClaim operations (block 786), and the master 232 of the requesting L2 cache 230 continues to issue local bus kill operation (block 788) limited in scope to the local coherency domain of master 232 until all other cached copies of the memory block are invalidated. If the CR indicates that at least one remaining cached copy of the requested memory block resides in a remote coherency domain, the process returns to block 724, which has been described.

With reference now to block 780, if the access to the L2 cache directory 302 indicates that the requested memory block is held in one of the Tn or Ten states, then master 232 knows that the requesting L2 cache 230 is the HPC for the requested memory block and that any other cached copy of the requested memory block is held by a cache in its local coherency domain. Accordingly, master 232 updates the state of the requested memory block in the associated state field 306 of L2 cache directory 302 to the M state, as depicted at block 784. In addition, the snooper 236 of the requesting L2 cache 230 provides "downgrade" partial responses to any competing DClaim operations snooped on its local interconnect 114 (block 786), and the master 232 of the requesting L2 cache 230 continues to issue local bus kill operation (block 788) limited in scope to the local coherency domain of master 232 until any other cached copies of the memory block are invalidated. If the master 232 determines by reference to the CR for a local bus kill operation that no further local cleanup is required (block 790), the process passes through block 728 and page connector C to block 704, which has been described.

Referring now to block 730 of FIG. 7A, if the access to L2 cache directory 302 indicates that the requested memory block is held in the Sr or S states, the requesting L2 cache 230 is not the HPC for the requested memory block, and master 232 must gain ownership of the requested memory block from the HPC, if any, or in the absence of an HPC, the LPC, prior to updating the memory block.

Accordingly, master 232 first determines at block 731 whether to issue a bus DClaim operation as a local or global operation. If master 232 makes a determination to issue a global bus DClaim operation, the process proceeds to block 740, which is described below. In response to a determination at block 731 to issue a bus DClaim operation as a local operation, master 232 issues a local bus DClaim operation at block 732, as described below in greater detail with reference to FIG. 17. Master 232 then awaits receipt of the CR of the local bus DClaim operation, which is represented by the collection of decision blocks 734, 736 and 738. If the CR indicates "retry" (block 734), the process returns to block 731, which has been described. If the CR alternatively indicates definitively that the bus DClaim operation cannot be serviced with the local coherency domain (block 736), the process proceeds to block 740, which is described below. If the CR alternatively indicates "downgrade", meaning that another requestor has obtained ownership of the requested memory block via a bus DClaim operation, the process passes to block 748, which is described below. If the CR alternatively indicates that master 232 has been awarded ownership of the requested memory block by the HPC based upon the local bus DClaim operation, the process passes through page connector D to block 790 of FIG. 7B and following blocks, which have been described.

Block 740 depicts master 232 issuing a global bus DClaim operation, as described below with respect to FIG. 18. Master 232 next determines at blocks 742-744 whether or not the CR for the global bus DClaim operation indicates that it succeeded, should be retried, or was "downgraded" to a RWITM operation. If the CR indicates that the bus DClaim operation should be retried (block 742), master 232 reissues a global bus DClaim operation at block 740 and continues to do so until a CR other than "retry" is received. If the CR is received indicating that the global bus DClaim operation has been downgraded in response to another requestor successfully issuing a bus DClaim operation targeting the requested memory block, the process proceeds to block 746, which is described below. If the CR alternatively indicates that master 232 has been awarded ownership of the requested memory block by the HPC based upon the global bus DClaim operation, the process passes through page connector D to block 790 of FIG. 7B and following blocks, which have been described.

Block 746 depicts master 232 of the requesting L2 cache 230 determining whether or not to issue a bus RWITM operation as a local or global operation. If master 232 elects to issue a global RWITM operation, the process passes to block 754, which is described below. If, however, master 232 elects to issue a local bus RWITM operation, the process proceeds to block 748, which illustrates master 232 issuing a local bus RWITM operation and awaiting the associated CR. As indicated at block 750, if the CR indicates "retry", the process returns to block 746, which represents master 232 again determining whether to issue a local or global RWITM operation utilizing the additional information, if any, provided in the retry CR. If the CR to the local bus RWTIM operation issued at block 748 does not indicate "retry" (block 750) but instead indicates that the bus RWITM operation was successful in obtaining ownership of the requested memory block (block 752), the process passes through page connector D to block 790 of FIG. 7B, which has been described. If master 232 determines at block 752 that the CR to the local bus RWITM operation indicates that the operation cannot be serviced within the local coherency domain, the process passes to block 754 and following blocks.

Blocks 754 and 756 depict master 232 iteratively issuing a global bus RWITM operation for the requested memory block, as described below with reference to FIGS. 16A-16B, until a CR other than "retry" is received. In response to master 232 receiving a non-retry CR indicating that it succeeded in obtaining ownership of the requested memory block (block 756), the process passes through page connector D to block 790 and following blocks, which have been described.

With reference now to block 760, if a negative determination has been made at blocks 702, 710, 720, 5502 and 730, L2 cache 230 does not hold a valid copy of the requested memory block. Accordingly, as indicated at blocks 760 and 770, L2 cache 230 performs a cache castout operation if needed to allocate a cache line for the requested memory block. Thereafter, the process passes to block 746 and following blocks as described above.

Figure 8A:
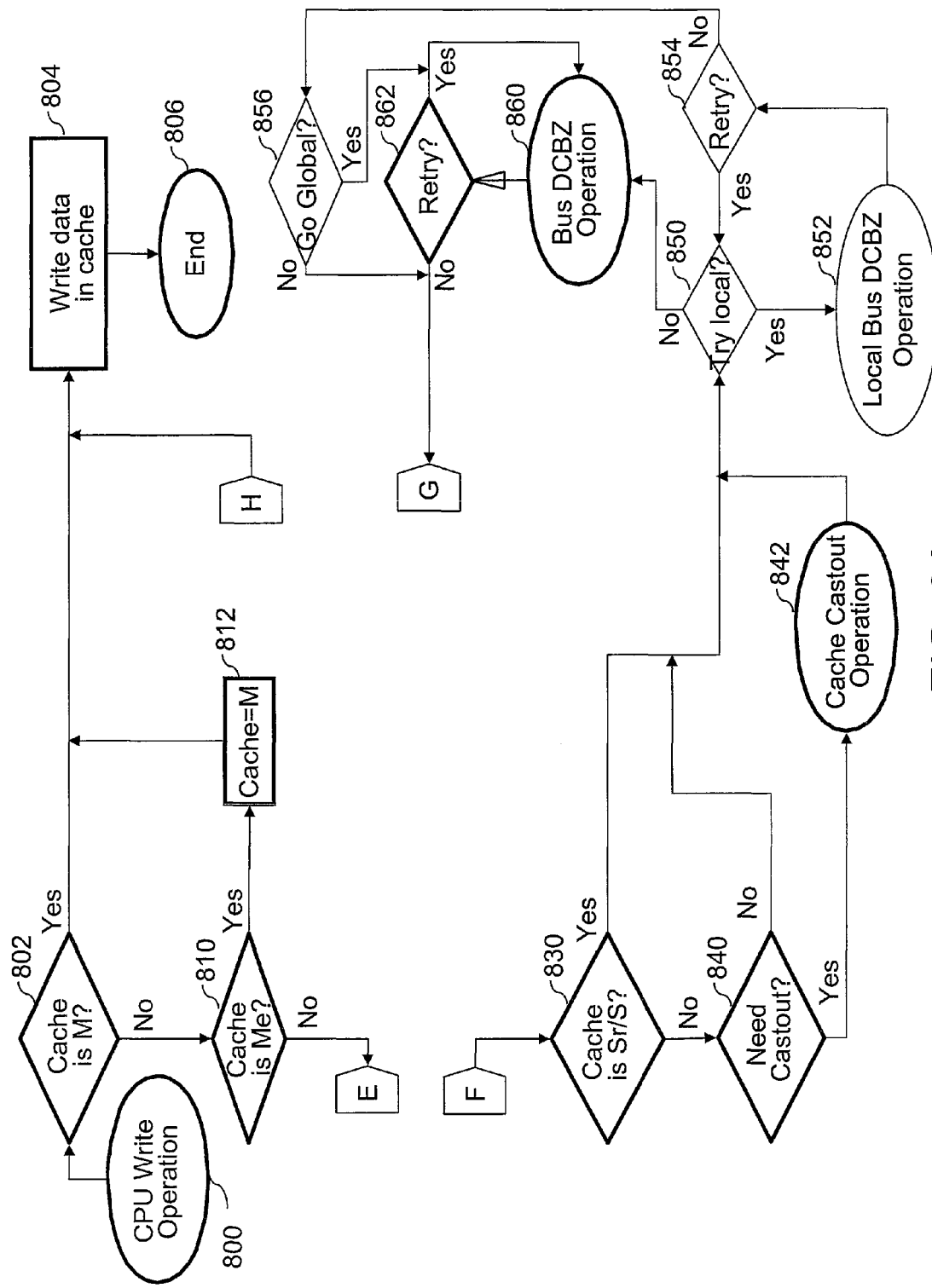
FIG. 8A-8B together form a high level logical flowchart of an exemplary method of servicing a processor write operation in a data processing system in accordance with the present invention.
Figure 8B:
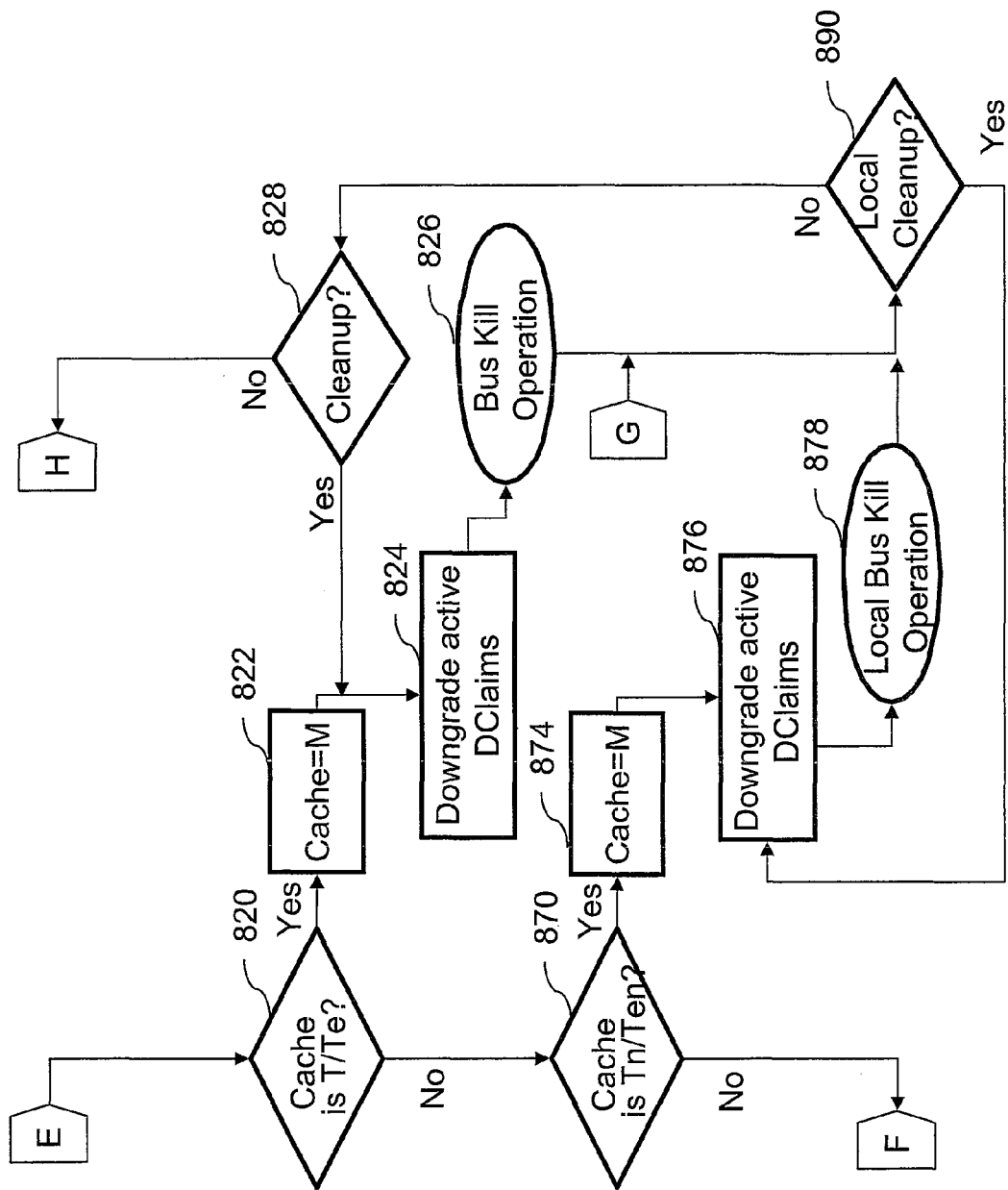

With reference now to FIGS. 8A-8B, there is depicted a high level logical flowchart of an exemplary method of servicing a processor write operation in a data processing system in accordance with the present invention. The process begins at block 800 in response to receipt by an L2 cache 230 of a write request by an associated one of the processor cores 200 within the same processing unit 104. In response to the receipt of the write request, master 232 of the L2 cache 230 accesses L2 cache directory 302 to determine if the memory block referenced by the request address specified by the update request is cached within L2 cache 230 in M state, as shown at block 802. If so, the master 232 writes the data supplied by the processor core 200 into L2 cache array 300, as illustrated at block 804. Thereafter, the process ends at block 806.

As shown at blocks 810-812, if L2 cache directory 302 instead indicates that L2 cache 230 holds the specified memory block in the Me state, master 232 updates the state field 306 for the requested memory block to M state in addition to writing the memory block as shown at block 804. Thereafter, the process terminates at block 806.

Passing through page connector E to block 820 of FIG. 8B, if L2 cache directory 302 indicates that L2 cache 230 holds the requested memory block in either of the T or Te states, meaning that the L2 cache 230 is the HPC for the requested memory block and the requested memory block may possibly be held in one or more other L2 caches 230, master 232 must gain exclusive access to the requested memory block in order to perform the requested write to the memory block. The process by which master 232 gains exclusive access to the requested memory block is shown at block 822 and following blocks.

According to this process, master 232 updates the state of the requested memory block in the associated state field 306 of L2 cache directory 302 to the M state, as depicted at block 822. As illustrated at block 824, the snooper 236 of the requesting L2 cache 230 provides "downgrade" partial responses to competing DClaim operations snooped on its local interconnect 114 to attempt to force other requestors for the memory block to reissue any such competing requests as RWITM requests. In addition, as depicted at block 826, master 232 issues a global bus kill operation to invalidate any other cached copies of the memory block, as described in detail below with reference to FIG. 20.

Master 232 next determines at blocks 890 and 828 whether or not the CR for the bus kill operation indicates that the bus kill operation successfully invalidated all other cached copies of the requested memory block or whether additional local or global "cleanup" (i.e., invalidation of other cached copies) is required. If the CR indicates that additional cleanup is not required, the process proceeds through page connector H to block 804 of FIG. 8A, which has been described. If the CR indicates that additional cleanup is required, master 232 additionally determines whether the CR indicates that the other cached copy or copies of the requested memory block reside entirely within its local coherency domain (block 890) or whether at least one copy of the requested memory block is cached outside the local coherency domain of master 232 (block 828). If the CR indicates that each remaining cached copy of the requested memory block resides in the local coherency domain of master 232, the snooper 236 of the requesting L2 cache 230 continues to downgrade active bus DClaim operations (block 876), and the master 232 of the requesting L2 cache 230 continues to issue local bus kill operation (block 878) limited in scope to the local coherency domain of master 232 until all other cached copies of the memory block are invalidated. If the CR indicates that at least one remaining cached copy of the requested memory block resides in a remote coherency domain, the process returns to block 824, which has been described.

With reference now to block 870, if the access to the L2 cache directory 302 indicates that the requested memory block is held in one of the Tn or Ten states, then master 232 knows that the requesting L2 cache 230 is the HPC for the requested memory block and that any other cached copy of the requested memory block is held by another cache in its local coherency domain. Accordingly, master 232 updates the state of the requested memory block in the associated state field 306 of L2 cache directory 302 to the M state, as depicted at block 874. In addition, the snooper 236 of the requesting L2 cache 230 provides "downgrade" partial responses to any competing DClaim operations snooped on its local interconnect 114 (block 876), and the master 232 of the requesting L2 cache 230 continues to issue local bus kill operation (block 878) limited in scope to the local coherency domain of master 232 until any other cached copies of the memory block are invalidated. If the master 232 determines by reference to the CR for a local bus kill operation that no further local cleanup is required (block 890), the process passes through block 828 and page connector H to block 804, which has been described.

Referring now to block 830 of FIG. 8A, if the access to L2 cache directory 302 indicates that the requested memory block is held in the Sr or S states, the requesting L2 cache 230 is not the HPC for the requested memory block, and master 232 must gain ownership of the requested memory block from the HPC, if any, or in the absence of an HPC, the LPC, prior to writing the memory block. Accordingly, master 232 first determines at block 850 whether to issue a bus DBCZ operation as a local or global operation.

If master 232 elects to issue a global bus DCBZ operation, the process passes to block 860, which is described below. If, however, master 232 elects to issue a local bus DCBZ operation, the process proceeds to block 852, which illustrates master 232 issuing a local bus DCBZ operation, as described below with reference to FIG. 21, and then awaiting the associated CR. As indicated at block 854, if the CR for the local bus DCBZ operation indicates "retry", the process returns to block 850, which represents master 232 again determining whether to issue a local or global bus DCBZ operation utilizing the additional information, if any, provided in the retry CR. If the CR to the local bus DCBZ operation issued at block 852 does not indicate "retry" (block 854) but instead indicates that the bus RWITM operation was successful in obtaining ownership of the requested memory block (block 856), the process passes through page connector G to block 890 of FIG. 8B, which has been described. If master 232 determines at block 856 that the CR to the local bus DCBZ operation indicates that the operation cannot be serviced within the local coherency domain, the process passes to block 860 and following blocks.

Block 860 illustrates master 232 issuing a global bus DCBZ operation, as described below with respect to FIG. 22. As shown at block 862, master 232 reissues the global bus DCBZ operation at block 860 until a CR other than "retry" is received. Following receipt of a CR to the global bus DCBZ operation other than "retry" at block 862, the process passes through page connector G to block 890 of FIG. 8B and following blocks, which have been described.

With reference now to block 840, if a negative determination has been made at blocks 802, 810, 820, 870 and 830, L2 cache 230 does not hold a valid copy of the requested memory block. Accordingly, as indicated at block 840 and 842, L2 cache 230 performs a cache castout operation if needed to allocate a cache line for the requested memory block. Thereafter, the process passes to block 850 and following blocks, which have been described.

Figure 9:
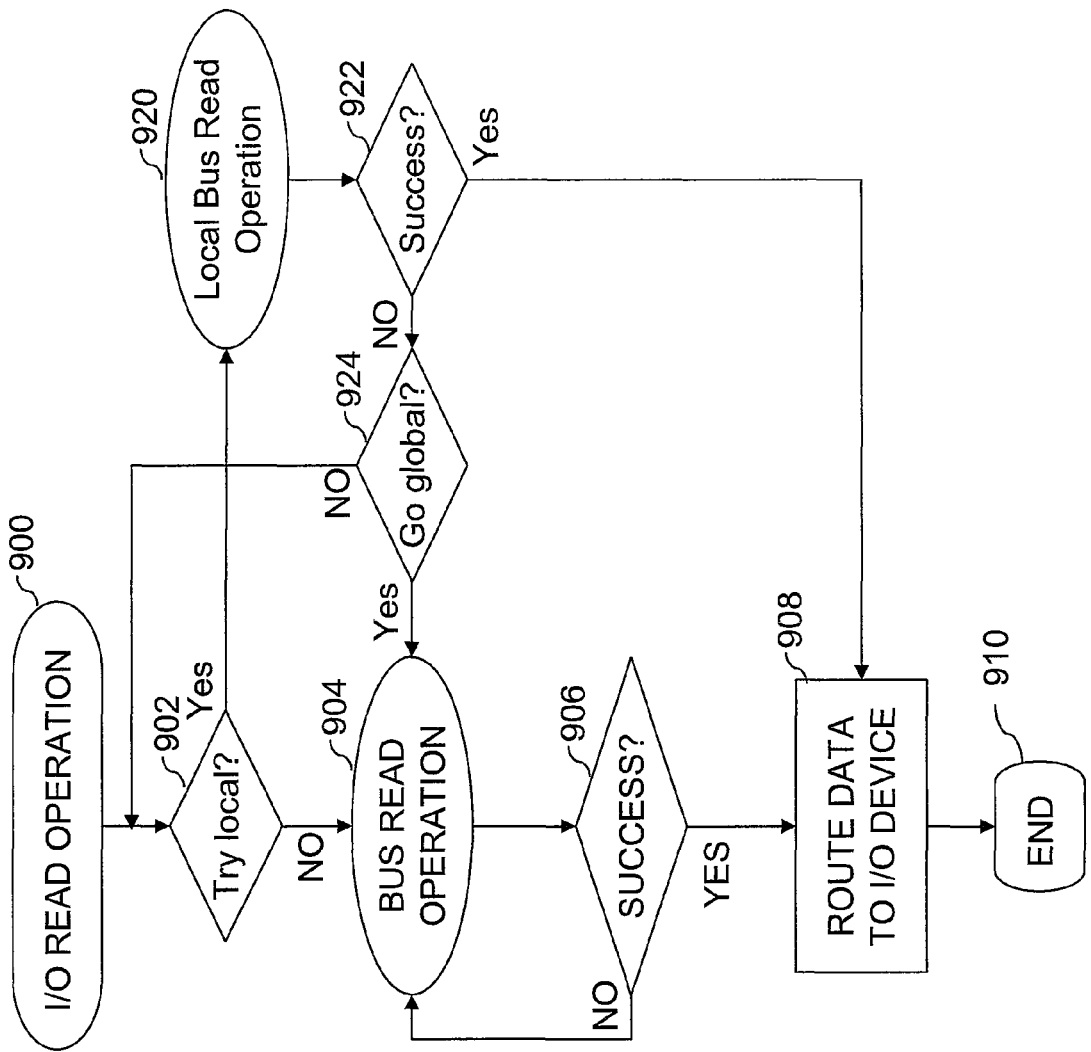
FIG. 9 is a high level logical flowchart of an exemplary method of performing an I/O read operation in a data processing system in accordance with the present invention.

Referring now to FIG. 9, there is illustrated a high level logical flowchart of an exemplary method of performing an I/O read operation in a data processing system in accordance with the present invention. As shown, the process begins at block 900 in response to receipt by the I/O controller 214 of a processing unit 104 of an I/O read request by an attached I/O device 216. In response to receipt of the I/O read request, I/O controller 214 determines at block 902 whether or not to issue a global or local bus read operation to obtain the requested memory block.

If the I/O controller 214 elects to issue a global bus DCBZ operation, the process passes to block 904, which is described below. If, however, I/O controller 214 elects to issue a local bus read operation, the process proceeds to block 920, which illustrates I/O controller 214 issuing a local bus read operation, as described below with reference to FIG. 13, and then awaiting the associated CR. As indicated at block 922, if the CR indicates "success", I/O controller 214 receives the requested memory block and then routes the requested memory block to I/O device 216, as shown at block 908. Thereafter, the process ends at block 910.

Returning to block 922, if the CR for the local bus read operation issued at block 920 does not indicate "success", the process passes to block 924, which depicts I/O controller 214 determining whether the CR definitively indicates that a bus read operation cannot be serviced within the local coherency domain. If not, the process returns to block 902, which represents I/O controller 214 again determining whether to issue a local or global bus read operation utilizing the additional information, if any, provided in the CR. In response to I/O controller 214 electing at block 902 to issue a global bus read operation or in response to I/O controller 214 determining at block 924 that the CR to the local bus read operation definitively indicates that the bus read operation cannot be serviced within the local coherency domain, the process passes to block 906 and following blocks.

Block 906 depicts I/O controller 214 issuing a global bus read operation on system interconnect 110 via local interconnect 114, as described below with reference to FIGS. 14A-14B. As indicated at block 906, I/O controller 214 continues to issue the bus read operation until a CR is received indicating "success". Once the global bus read operation succeeds and the requested memory block is received, I/O controller 214 routes the data received in response to the global bus read operation to the requesting I/O device 216, as illustrated at block 908. The process thereafter terminates at block 910.

Figure 10:
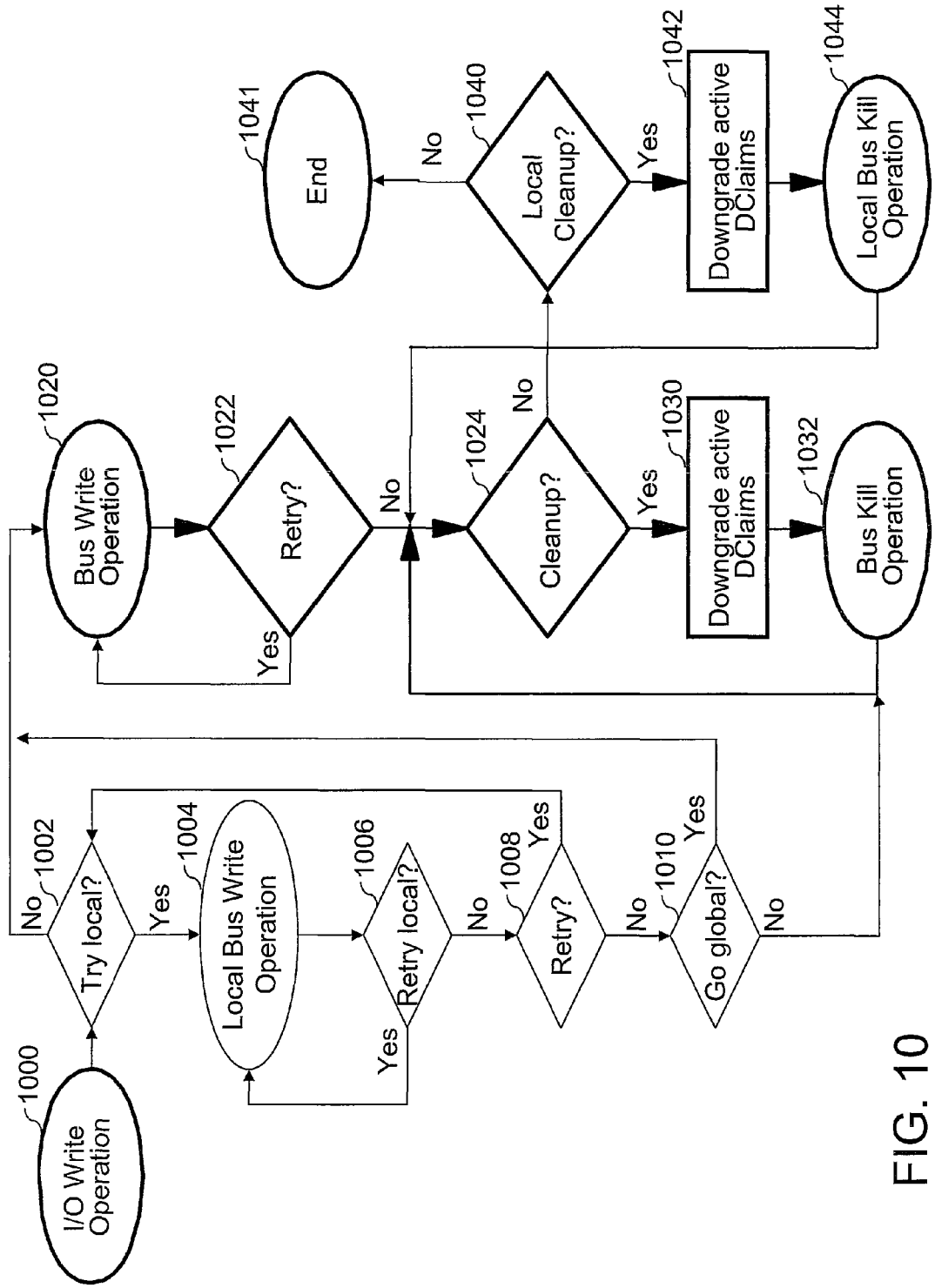
FIG. 10 is a high level logical flowchart of an exemplary method of performing an I/O write operation in a data processing system in accordance with the present invention.

Referring now to FIG. 10, there is depicted a high level logical flowchart of an exemplary method of performing an I/O write operation in a data processing system in accordance with the present invention. As shown, the process begins at block 1000 in response to receipt by the I/O controller 214 of a processing unit 104 of an I/O write request by an attached I/O device 216. In response to receipt of the I/O write request, I/O controller 214 determines at block 1002 whether or not to issue a global or local bus write operation to obtain the requested memory block.

If I/O controller 214 elects to issue a global bus write operation, the process passes to block 1020, which is described below. If, however, I/O controller 214 elects to issue a local bus write operation, the process proceeds to block 1004, which illustrates I/O controller 214 issuing a local bus write operation, as described below with reference to FIG. 25, and then awaiting the associated CR. As indicated at block 1006, if the CR indicates "retry local", meaning that the local bus write operation can definitely be serviced within the local coherency domain if retried, I/O controller 214 reissues the local bus write operation at block 1004. If I/O controller 214 receives a CR providing more equivocal information, for example, simply "retry" (block 1008), the process returns block 1002, which has been described. Alternatively, if I/O controller 214 receives a CR indicating definitively that the bus write operation cannot be serviced within the local coherency domain (block 1010), the process proceeds to block 1020, which is described below. Finally, if I/O controller 214 receives a CR indicating that it has been awarded ownership of the requested memory block, the process passes from block 1004 through blocks 1006, 1008 and 1010 to block 1024 and following blocks, which illustrate I/O controller 214 performing cleanup operations, if necessary, as described below.

Referring now to block 1020, I/O controller 214 issues a global bus I/O write operation, as described below with reference to FIG. 10. As indicated at block 1022, I/O controller 214 continues to issue the global bus I/O write operation until a CR other than "retry" is received. If the CR for the global bus write operation issued at block 1020 indicates that no other snooper holds a valid copy of the requested memory block (blocks 1024 and 1040), the process ends at block 1026 with the attached I/O device 216 able to write to the requested memory block. If, however, I/O controller 214 determines at block 1024 that the CR indicates that at least one stale cached copy of the requested memory block remains outside of its local coherency domain, I/O controller 214 performs a global "cleanup" by downgrading any conflicting DClaim operations it snoops, as shown at block 1030, and issuing global bus kill operations, as depicted at block 1032, until a CR is received at block 1024 indicating that no stale cached copies of the requested memory block remain outside of the local coherency domain.

If I/O controller 214 determines at block 1040 that the CR indicates that no stale cached copies of the requested memory block remain outside of the local coherency domain but at least one stale cached copy of the requested memory block remains within its local coherency domain, I/O controller 214 performs a local "cleanup" by downgrading any conflicting DClaim operations it snoops, as shown at block 1042, and issuing local bus kill operations, as depicted at block 1044 until a CR is received indicating that no stale cached copies of the requested memory block remain within data processing system 100 (blocks 1024 and 1040). Once cleanup operations are complete, the process ends at block 1041.

As has been described, the implementation of Tn and Ten coherency states provides an indication of whether a possibly shared memory block is additionally cached only within the local coherency domain. Consequently, when a requestor within the same coherency domain as a cache holding a memory block in one of the Tn or Ten states issues an exclusive access operation (e.g., a bus DClaim, bus RWITM, bus DCBZ or bus write operation) for the memory block, the scope of broadcast operations, such as bus kill operations, can advantageously be restricted to the local coherency domain, reducing interconnect bandwidth utilization.

Figure 11:
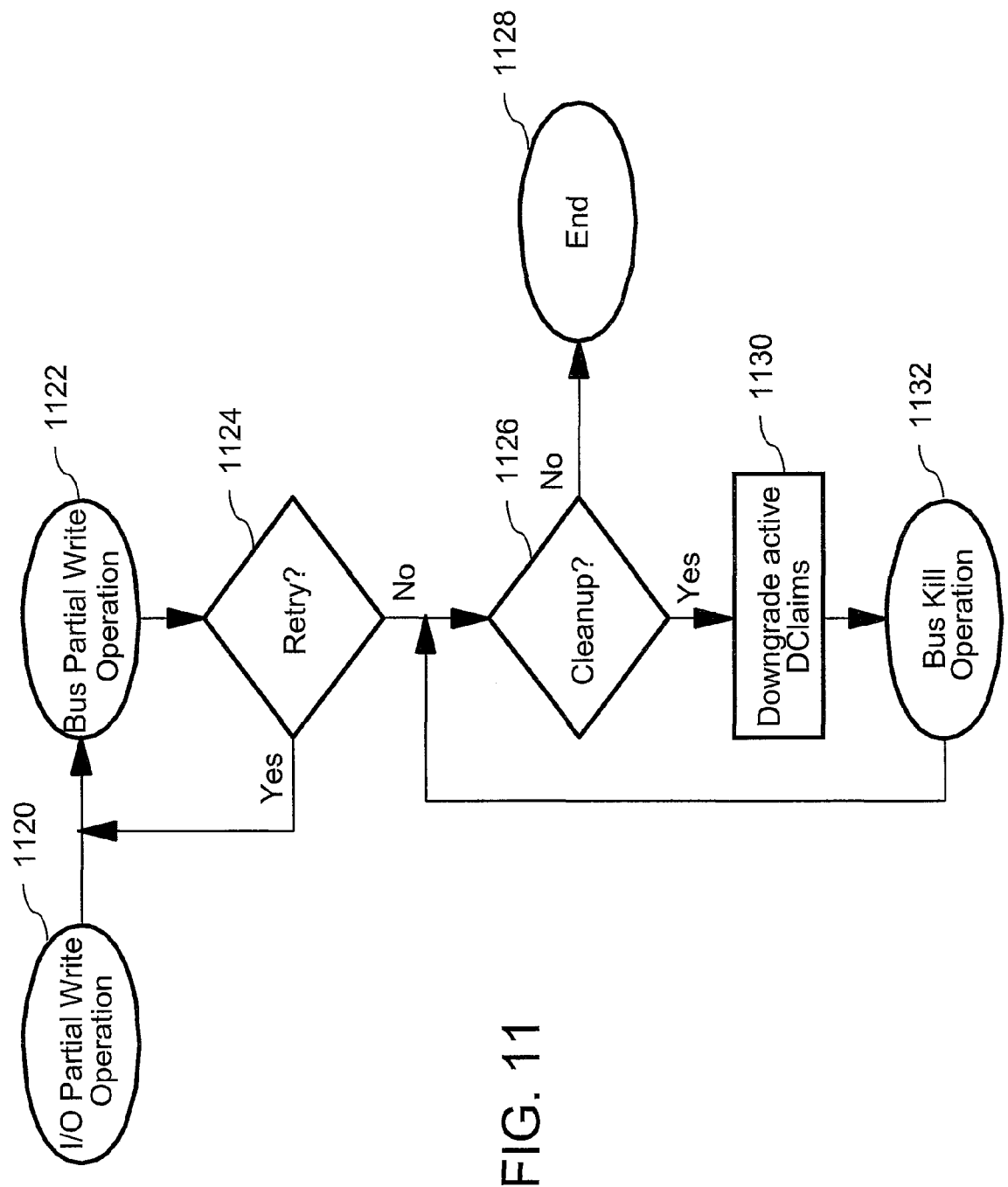
FIG. 11 is a high level logical flowchart of an exemplary method of performing an I/O partial write operation in a data processing system in accordance with the present invention.

With reference now to FIG. 11, there is illustrated a high level logical flowchart of an exemplary method of performing an bus I/O partial write operation in accordance with the present invention. As shown, the process begins at block 1120 in response to receipt by the I/O controller 214 of a processing unit 104 of an I/O partial write request (i.e., a request to write a portion of a memory block) by an attached I/O device 216. In response to receipt of the I/O partial write request, I/O controller 214 issues a bus I/O partial write operation on system interconnect 110 via local interconnect 114, as depicted at block 1122 and described below with reference to FIG. 27. As indicated at block 1124, I/O controller 214 continues to issue the bus partial write operation until a CR other than "retry" is received.

If the CR indicates that no other snooper holds a valid copy of the requested memory block, the process passes from block 1124 to block 1126 and ends at block 1128. If, however, I/O controller 214 determines at block 1126 that the CR indicates that at least one stale cached copy of the requested memory block may remain, I/O controller 214 performs "cleanup" by downgrading any conflicting DClaim operations snooped on system interconnect 110, as shown at block 1130, and issuing bus kill operations, as depicted at block 1132, until a CR is received at block 1126 indicating that no stale cached copies of the requested memory block remain in data processing system 100. Once cleanup operations are complete, the process ends at block 1128.

Figure 12:
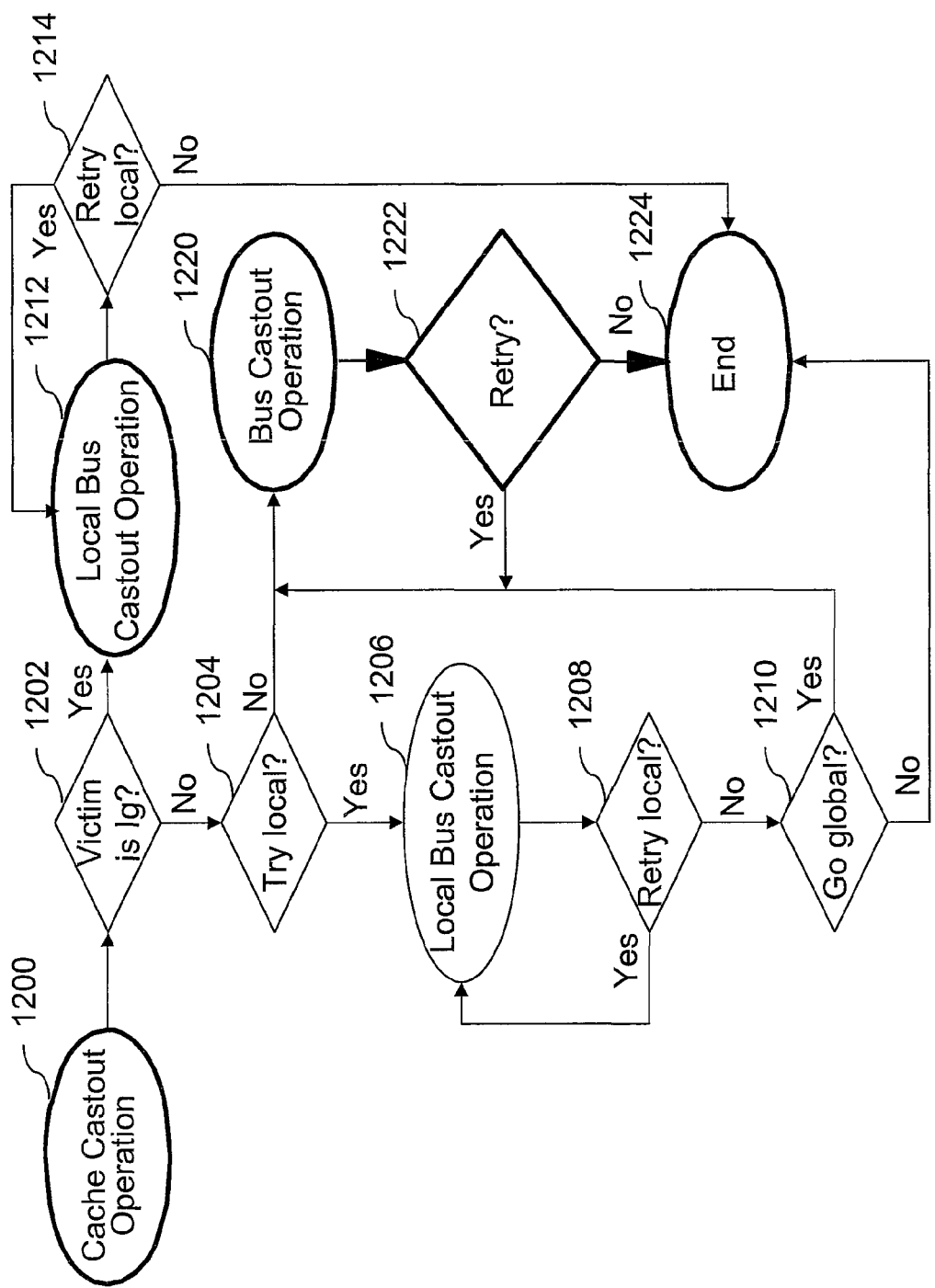
FIG. 12 is a high level logical flowchart of an exemplary cache castout operation for a data processing system in accordance with the present invention.

Referring now to FIG. 12, a high level logical flowchart of an exemplary cache castout operation for a data processing system in accordance with the present invention. The illustrated process begins at block 1200 when an L2 cache 230 determines that a castout of a cache line is needed, for example, at block 606 of FIG. 6, block 770 of FIG. 7A, or block 842 of FIG. 8A. To perform the castout operation, the L2 cache 230 first determines at block 1202 whether or not the victim entry selected for replacement from the target congruence class is in the Ig state. If so, an address-only local bus castout operation is issued at block 1212 and, if necessary, retried (as indicated by block 1214) in order to update the corresponding domain indicator in the LPC system memory 108. As noted above, the castout of the Ig entry is preferably performed only as a local operation, meaning that if the LPC system memory 108 is not within the local coherency domain, the CR does not indicate "retry local" at block 1214. Thereafter, the cache castout operation ends at block 1224.

Returning to block 1202, if the victim entry selected for replacement is not in the Ig state, the L2 cache 230 determines at block 1204 whether to issue a global or local bus castout operation for the selected memory block. If L2 cache 230 elects to issue a global bus castout operation, the process passes to block 1220, which is described below. If, however, L2 cache 230 elects to issue a local bus castout operation, the process proceeds to block 1206, which illustrates the L2 cache 230 issuing a local bus castout operation, as described above with reference to FIG. 23, and then awaiting the associated CR. As indicated at block 1208, if the CR indicates "retry local", meaning that the local bus write operation can definitely be serviced within the local coherency domain if retried, L2 cache 230 reissues the local bus castout operation at block 1206. Alternatively, if L2 cache 230 receives a CR indicating definitively that the bus write operation cannot be serviced within the local coherency domain (block 1210), the process proceeds to block 1220, which is described below. Finally, if L2 cache 230 receives a CR indicating that the castout of the selected memory block succeeded, the process simply ends at block 1224.

Block 1220 depicts L2 cache 230 issuing a global bus castout operation on system interconnect 110 via local interconnect 114, as described below with reference to FIG. 24. As indicated at block 1222, the L2 cache 230 reissues the global bus castout operation until a CR other than "retry" is received. Thereafter, the process ends at block 1224.

B. Interconnect Operations

Figure 13:
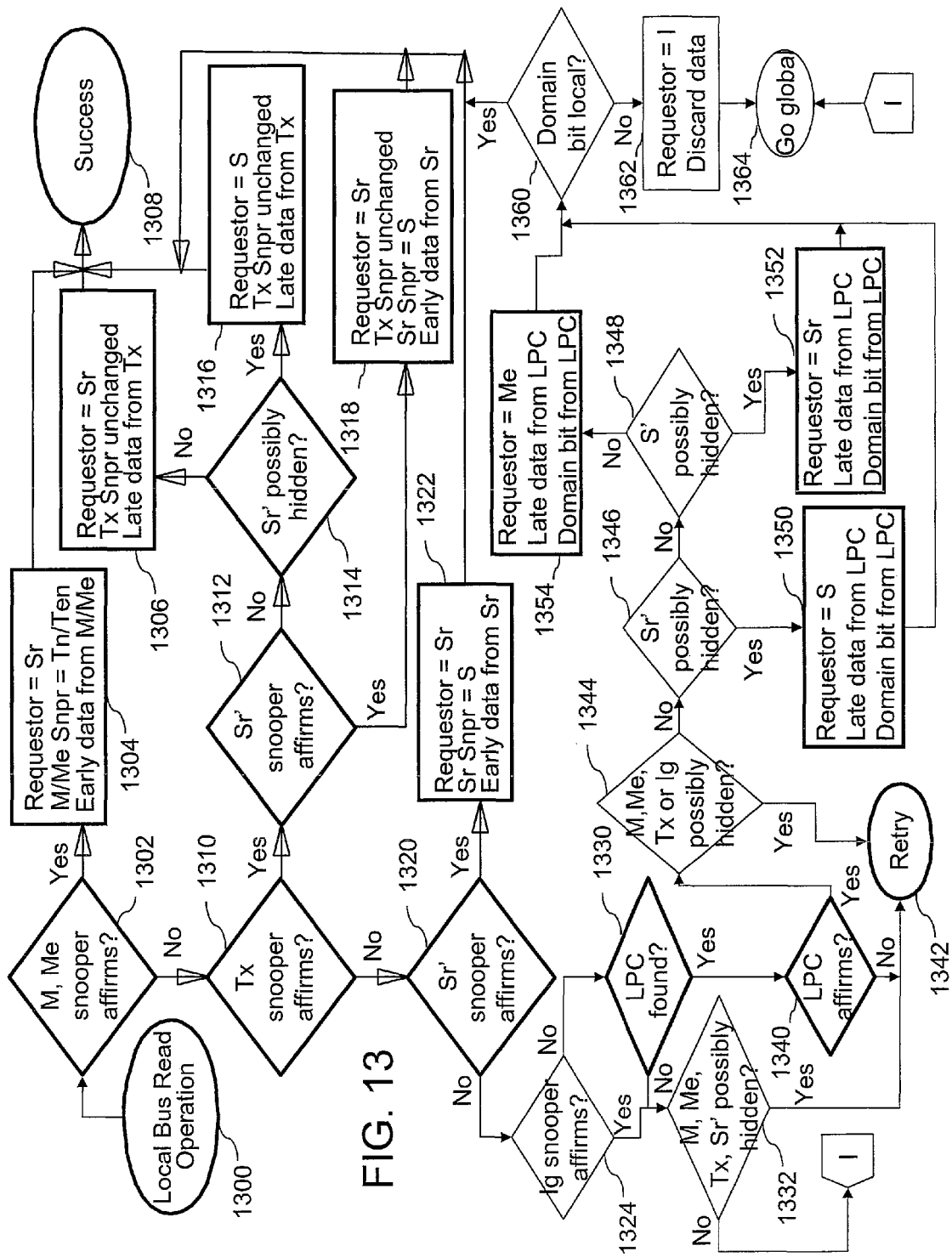
FIG. 13 is a high level logical flowchart of an exemplary method of performing a local bus read operation in a data processing system in accordance with the present invention.

Referring now to FIGS. 13-27, exemplary local and global bus operations in an illustrative data processing system 100 will now be described. Referring first to FIG. 13, there is depicted a high level logical flowchart of an exemplary method of performing a local bus read operation in a data processing system in accordance with the present invention. The process begins at block 1300, for example, at block 612 of FIG. 6, with an L2 cache 230 issuing a local bus read operation on its local interconnect 114. The various partial responses that snoopers 222, 236 may provide to distributed response logic 210 in response to snooping the local bus read operation are represented in FIG. 13 by the outcomes of decision blocks 1302, 1310, 1312, 1314, 1320, 1330, 1332, 1340, 1344, 1346 and 1348. These partial responses in turn determine the CR for the local bus read operation.

As shown at block 1302, if a snooper 236 of an L2 cache 230 affirms the local bus read operation with a partial response indicating that the L2 cache 230 holds the requested memory block in either the M or Me state, the process proceeds from block 1302 to block 1304. Block 1304 indicates the operations of the requesting L2 cache 230 and the affirming L2 cache 230 in response to the local bus read operation. In particular, the snooper 236 in the affirming L2 cache 230 updates the cache state of the requested memory block from M to Tn or from Me to Ten. In addition, the snooper 236 in the affirming L2 cache 230 may initiate transmission of the requested memory block to the requesting L2 cache 230 prior to receipt of the CR (i.e., provides "early" data). Upon receipt, the master 232 in the requesting L2 cache 230 places the requested memory block in L2 cache array 300 in the Sr state. The process ends with distributed response logic 210 generating a CR indicating "success", as depicted at block 1308.

If, on the other hand, a snooper 236 of an L2 cache 230 affirms the local bus read operation with a partial response indicating that the L2 cache 230 holds the requested memory block in the Tx state (block 1310) and an Sr' snooper 236 also affirms the bus read operation (block 1312), the process passes to block 1318. Block 1318 represents the Sr' snooper 236 updating the cache state of the requested memory block to S and initiating transmission of the requested memory block to the requesting L2 cache 230 prior to receipt of the CR (i.e., provides "early" data). The Tx snooper 236 remains unchanged. Upon receipt of the requested memory block, the master 232 in the requesting L2 cache 230 places the requested memory block in L2 cache array 300 in the Sr state. The process ends with distributed response logic 210 generating a CR indicating "success", as depicted at block 1308.

If the complex of partial responses includes a Tx snooper 236 affirming the local bus read operation (block 1310), no Sr' snooper 236 affirming the bus read operation (block 1312), and a snooper 236 providing an partial response (e.g., a type of retry) indicating that an Sr' snooper 236 may be possibly hidden in the local data delivery domain (block 1314), the process passes to block 1316. Block 1316 represents the Tx snooper 236 that affirmed the bus read operation initiating transmission of the requested memory block to the requesting L2 cache 230 after receipt of the CR (i.e., provides "late" data) and retaining the requested memory block in the Tx state. Upon receipt, the master 232 in the requesting L2 cache 230 places the requested memory block in L2 cache directory 300 in the S state (since an Sr' snooper 236 may be hidden and only one Sr' snooper 236 is permitted in each data delivery domain for the requested memory block). The process ends with distributed response logic 210 generating a CR indicating "success", as depicted at block 1308.

If the complex of partial responses includes a T or Te snooper 236 affirming the local bus read operation (block 1310), no Sr' snooper 236 affirming the bus read operation (block 1312), and no snooper 236 providing a partial response that may possibly hide a Sr' snooper 236 (block 1314), the process passes to block 1306. Block 1306 represents the T or Te snooper 236 that affirmed the bus read operation initiating transmission of the requested memory block to the requesting L2 cache 230 after receipt of the CR (i.e., provides "late" data) and retaining the requested memory block in the T or Te state. Upon receipt, the master 232 in the requesting L2 cache 230 places the requested memory block in L2 cache array 300 in the Sr state (since no other Sr' snooper 236 exists for the requested memory block in the local data delivery domain). The process ends with distributed response logic 210 generating a CR indicating "success", as depicted at block 1308.

Referring now to block 1320, if no M, Me, or Tx snooper 236 affirms the local bus read operation, but an Sr' snooper 236 affirms the local bus read operation, the local bus read operation is serviced in accordance with block 1322. In particular, the Sr' snooper 236 affirming the bus read operation initiates transmission of the requested memory block to the requesting L2 cache 230 prior to receipt of CR and updates the state of the requested memory block in its L2 cache directory 302 to the S state. The master 232 in the requesting L2 cache 230 places the requested memory block in its L2 cache array 300 in the Sr state. The process ends with distributed response logic 210 generating a CR indicating "success", as depicted at block 1308.

With reference now to block 1324, if no M, Me, Tx or Sr' snooper 236 affirms the local bus read operation, but an L2 cache 230 provides a partial response affirming the local bus read operation indicating that the L2 cache 230 holds the address tag of the requested memory block in the Ig state. If no M, Me, Tx or Sr' snooper 236 is possibly hidden by an incomplete partial response (block 1332), distributed response logic 210 provides a "go global" CR, as depicted at block 3164. If, on the other hand, an Ig snooper 236 affirms the local bus read operation and the complex of partial responses indicates an M, Me, Tx or Sr' snooper 236 is possibly hidden, response logic 210 generates a "retry" CR, as depicted at block 1342.

Turning now to block 1330, if no M, Me, Tx, Sr' or Ig snooper 236 affirms the local bus read operation, and further, if no snooper 222 provides a partial response indicating that it is responsible (i.e., the LPC) for the requested memory block, the process passes to block 1332, which has been described. If, however, no M, Me, Tx, Sr' or Ig snooper 236 affirms the local bus read operation, and further, if a snooper 222 provides a partial response indicating that it is responsible (i.e., the LPC) for the requested memory block, the process proceeds to block 1340.

Referring now to block 1340, if a snooper 222 provides a partial response indicating that it is responsible (i.e., the LPC) for the requested memory block but does not affirm the local bus read operation, response logic 210 generates a CR indicating "retry", as depicted at block 1342. If, however, a snooper 222 affirms the local bus read operation, the process proceeds to block 1344. As indicated by decision block 1344, response logic 210 also generates a "retry" CR at block 1342 if a memory controller snooper 222 affirms the bus read operation and an L2 cache snooper 236 provides a partial response indicating that it may hold the requested memory block in one of the M, Me, Tx or Ig states but cannot affirm the local bus read operation. In each of these cases, response logic 210 generates a "retry" CR because the bus read operation, if reissued as a local operation, may be able to be serviced without resorting to a global broadcast.

With reference now to block 1346, if no M, Me, Tx or Ig snooper 236 affirms the local bus read operation, no M, Me, Tx or Ig snooper 236 is possibly hidden, and a memory controller snooper 222 affirms the local bus read operation, the snooper 222 affirming the local bus read operation provides the requested memory block and the associated domain indicator 504 to the requesting L2 cache 230 in response to the CR, as depicted at each of blocks 1350, 1352 and 1354. As shown at blocks 1350, 1352 and 1354, the master 232 of the requesting L2 cache 230 handles the requested memory block in accordance with the CR and the state of the domain indicator 504. In particular, if master 232 determines at block 1360 that the domain indicator 3004 is reset to "global", meaning that a modified copy of the requested memory block may be cached outside the local domain, master 232 of the requesting L2 cache 230 discards the requested memory block, remaining in the I state with respect to the requested memory block. In addition, in light of the "global" domain indicator 504, master 232 interprets the CR as indicating "go global" (block 1364), meaning that master 232 will reissue the bus read operation as a global bus read operation.

If, on the other hand, the domain indicator 504 is set to indicate "local" (block 1360), the master 232 of the requesting cache 230 interprets the CR as indicating "success" (block 1308) and places both the requested memory block and domain indicator 504 within its L2 cache array 300. The master 232 also sets the state field 306 associated with the requested memory block to a state indicated by the CR. In particular, if the partial responses and hence the CR indicate that a Sr' snooper 236 may be hidden (block 1346), the requesting L2 cache 230 holds the requested memory block in the S state (block 1350) because only one Sr copy of the memory block is permitted in any domain. Alternatively, if the partial responses and CR indicate that no Sr' snooper 236 may be hidden, but an S' snooper 236 may be hidden, the requesting L2 cache 236 holds the requested memory block in the Sr state (block 1352). Finally, if neither a Sr' or S' snooper 236 may be possibly hidden (block 1348), the requesting L2 cache 230 holds the requested memory block in the Me state (block 1354) because the requesting L2 cache 230 is guaranteed to be the only cache system-wide holding the requested memory block.

Figure 14A:
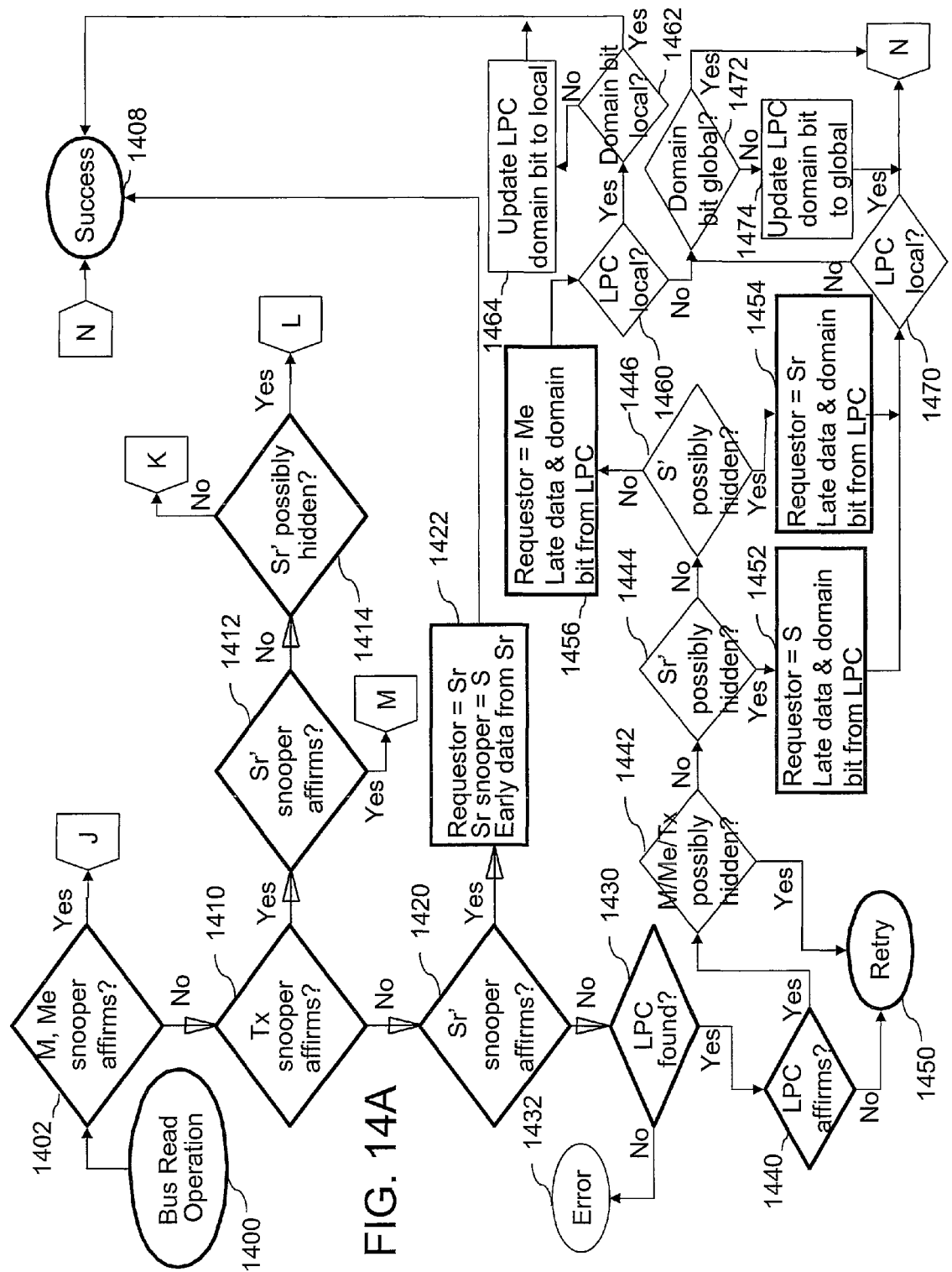
FIGS. 14A-14B together form a high level logical flowchart of an exemplary method of performing a global bus read operation in a data processing system in accordance with the present invention.
Figure 14B:
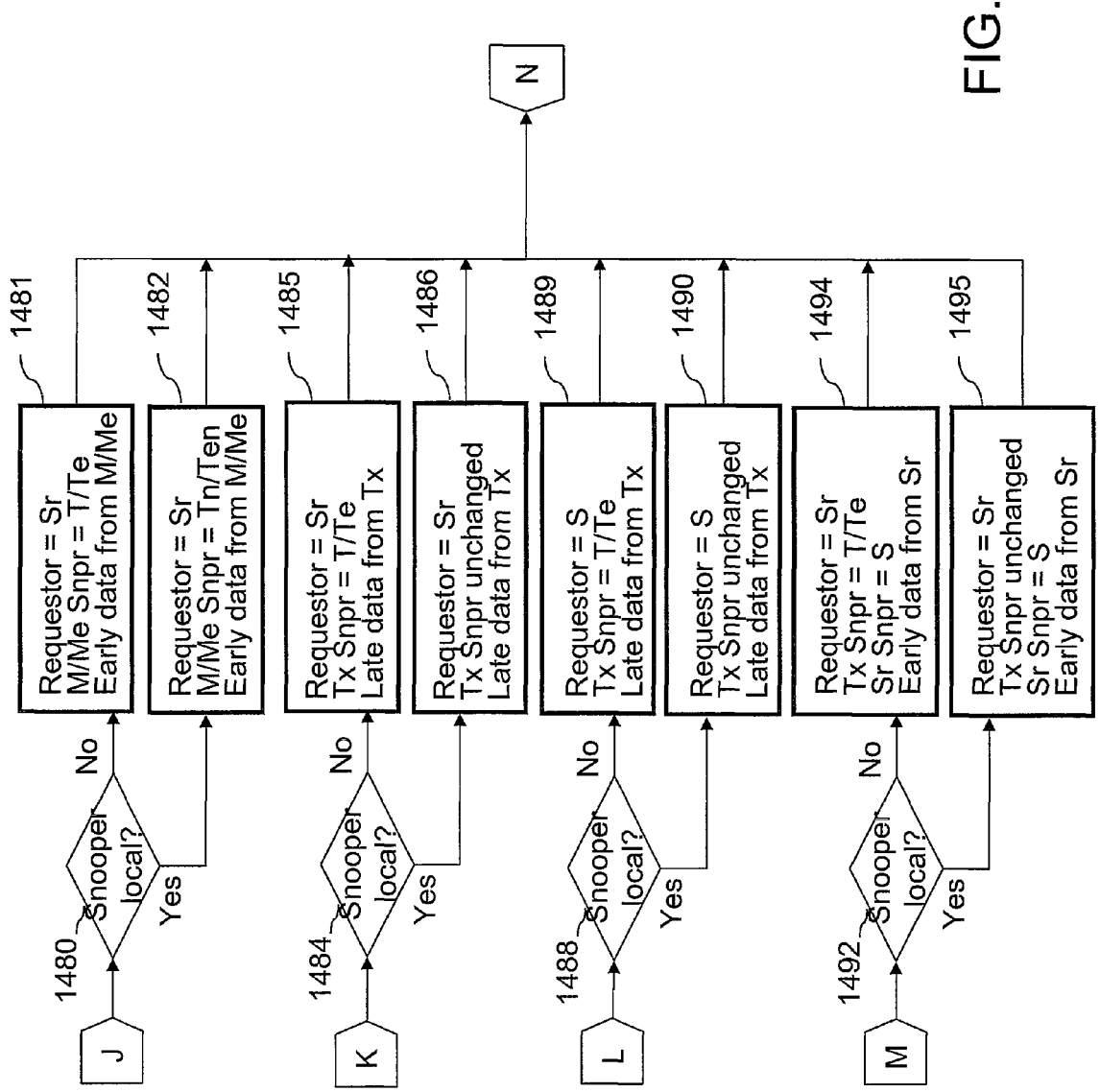

With reference now to FIGS. 14A-14B, there is depicted a high level logical flowchart of an exemplary method of performing a global bus read operation in a data processing system implementing Tn and Ten coherency states in accordance with the present invention. The process begins at block 1400, for example, at block 620 of FIG. 6, with an L2 cache 230 issuing a global bus read operation on its local interconnect 114. The various partial responses that snoopers 222, 236 may provide to distributed response logic 210 in response to snooping the global bus read operation are represented in FIG. 14A by the outcomes of decision blocks 1402, 1410, 1412, 1414, 1420, 1430, 1440, 1442, 1444, and 1446. These partial responses in turn determine the CR for the global bus read operation.

As shown at block 1402, if a snooper 236 of an L2 cache 230 affirms the global bus read operation with a partial response indicating that the L2 cache 230 holds the requested memory block in either the M or Me state, the process proceeds from block 1402 through page connector J to block 1480 of FIG. 14B. Block 1480 represents the fact that the M or Me snooper 236 updates its cache state differently depending upon whether the M or Me snooper 236 is local (i.e., within the same coherency domain) as the requesting L2 cache 230 as indicated by the scope indicator in the global bus read operation. In either case, the snooper 236 in the affirming L2 cache 230 may initiate transmission of the requested memory block to the requesting L2 cache 230 prior to receipt of the CR (i.e., provides "early" data), and upon receipt, the master 232 in the requesting L2 cache 230 places the requested memory block in its L2 cache array 300 in the Sr state (blocks 1481 and 1482). However, the snooper 236 in the affirming L2 cache 230 updates the state of the requested memory block from M to T or from Me to Te if the snooper 236 is not local to the requesting L2 cache 230 (block 1481) and updates the state of the requesting memory block from M to Tn or from Me to Ten if the snooper 236 is local (block 1482). The process then returns to FIG. 14A through page connector N and ends with distributed response logic 210 generating a CR indicating "success", as depicted at block 1408.

If a snooper 236 of an L2 cache 230 affirms the global bus read operation with a partial response indicating that the L2 cache 230 holds the requested memory block in any the T, Tn, Te or Ten states (generically designated in block 1410 as Tx)

and an Sr' snooper 236 also affirms the bus read operation (block 1412), the process passes through page connector M to block 1492. Block 1492 indicates that the affirming Tx snooper 236 updates the state of the requested memory block differently depending upon whether the scope indicator of the global bus read operation indicated that the snooper 236 is within the coherency domain of the requesting L2 cache 230. In either case, the Sr' snooper 236 updates the state of the requested memory block to S and initiates transmission of the requested memory block to the requesting L2 cache 230 prior to receipt of the CR (blocks 1494 and 1495). Upon receipt, the master 232 in the requesting L2 cache 230 places the requested memory block in L2 cache array 300 in the Sr state (blocks 1494 and 1495). In addition, the Tx snooper 236 updates the state of the requested memory block, if necessary, from Tn to T or from Ten to Te if the snooper 236 is not local to the requesting L2 cache 230 (block 1494), but leaves the state of the requested memory block unchanged if the Tx snooper 236 is local to the requesting L2 cache (block 1495). The process then returns to FIG. 14A through page connector N and ends with distributed response logic 210 generating a CR indicating "success", as depicted at block 1408.

If the complex of partial responses includes a Tx snooper 236 affirming the global bus read operation (block 1410), no Sr' snooper 236 affirming the bus read operation (block 1412), and a snooper 236 providing an partial response (e.g., a type of retry) indicating that an Sr' snooper 236 may exist in the local data delivery domain but did not affirm the global bus read operation, the process passes through page connector L to block 1488 of FIG. 14B. Block 1488 indicates that the affirming Tx snooper 236 updates the state of the requested memory block differently depending upon whether the scope indicator of the global bus read operation indicated that the snooper 236 is within the coherency domain of the requesting L2 cache 230. In either case, the Tx snooper 236 that affirmed the global bus read operation initiates transmission of the requested memory block to the requesting L2 cache 230 after receipt of the CR (blocks 1489 and 1490). Upon receipt, the master 232 in the requesting L2 cache 230 places the requested memory block in L2 cache directory 300 in the S state (since an Sr' snooper 236 may be hidden within the local domain the requesting cache 236 and only one Sr' snooper 236 is permitted in each domain for the requested memory block). In addition, the Tx snooper 236 updates the state of the requested memory block, if necessary, from Tn to T or from Ten to Te if the snooper 236 is not local to the requesting L2 cache 230 (block 1489), but leaves the state of the requested memory block unchanged if the Tx snooper 236 is local to the requesting L2 cache (block 1490). The process then returns to FIG. 14A through page connector N and ends with distributed response logic 210 generating a CR indicating "success", as depicted at block 1408.

If the complex of partial responses includes a Tx snooper 236 affirming the global bus read operation, no Sr' snooper 236 affirming the bus read operation, and no snooper 236 providing a partial response that may hide a Sr' snooper 236, the process passes through page connector K to block 1484 of FIG. 14B. Block 1484 indicates that the affirming Tx snooper 236 updates the state of the requested memory block differently depending upon whether the scope indicator of the global bus read operation indicated that the snooper 236 is within the coherency domain of the requesting L2 cache 230. In either case, the Tx snooper 236 that affirmed the global bus read operation initiates transmission of the requested memory block to the requesting L2 cache 230 after receipt of the CR (i.e., provides "late" data), the master 232 in the requesting L2 cache 230 places the requested memory block in its L2 cache array 300 in the Sr state (since no other Sr' snooper 236 exists for the requested memory block in the local domain). In addition, the Tx snooper 236 updates the state of the requested memory block, if necessary, from Tn to T or from Ten to Te if the snooper 236 is not local to the requesting L2 cache 230 (block 1485), but leaves the state of the requested memory block unchanged if the Tx snooper 236 is local to the requesting L2 cache (block 1486). The process then returns to FIG. 14A through page connector N and ends with distributed response logic 210 generating a CR indicating "success", as depicted at block 1408.

Referring now to block 1420, if no M, Me, or Tx snooper 236 affirms the global bus read operation, but an Sr' snooper 236 affirms the global bus read operation, the global bus read operation is serviced in accordance with block 1422. In particular, the Sr' snooper 236 that affirmed the global bus read operation initiates transmission of the requested memory block to the requesting L2 cache 230 prior to receipt of CR and updates the state of the requested memory block in its L2 cache directory 302 to the S state. The master 232 in the requesting L2 cache 230 places the requested memory block in L2 cache array 300 in the Sr state. The process ends with distributed response logic 210 generating a CR indicating "success", as depicted at block 1408.

Turning now to block 1430, if no M, Me, Tx or Sr' snooper 236 affirms the global bus read operation, and further, if no snooper 222 provides a partial response indicating that it is responsible (i.e., the LPC) for the requested memory block, an error occurs that halts processing as shown at block 1432 because every memory block is required to have an LPC.

Referring now to block 1440, if a snooper 222 provides a partial response indicating that it is responsible (i.e., the LPC) for the requested memory block but does not affirm the global bus read operation, response logic 210 generates a CR indicating "retry", as depicted at block 1450. As indicated by decision block 1442, response logic 210 similarly generates a "retry" CR at block 1450 if a memory controller snooper 222 affirms the global bus read operation and an L2 cache snooper 236 provides a partial response indicating that it may hold the requested memory block in one of the M, Me, or Tx states but cannot affirm the global bus read operation. In each of these cases, response logic 210 generates a "retry" CR to cause the operation to be reissued because one of the possibly hidden snoopers 236 may be required to source the requested memory block to the requesting L2 cache 230.

With reference now to block 1444, if no M, Me, Tx or Sr' snooper 236 affirms the bus read operation, no M, Me, or Tx snooper 236 is possibly hidden, and a memory controller snooper 222 affirms the global bus read operation, the snooper 222 affirming the global bus read operation provides the requested memory block and the associated domain indicator 504 to the requesting L2 cache 230 in response to the CR, as depicted at each of blocks 1452 and 1454. As shown at blocks 1444, 1446, 1452, 1454 and 1456, the master 232 of the requesting L2 cache 230 handles the requested memory block in accordance with the partial responses compiled into the "success" CR represented at block 1408. In particular, if the CR indicates that no Sr' or S' snooper 236 is possibly hidden, the requesting L2 cache 230 holds the requested memory block in the Me state (block 1456); the requesting L2 cache 230 holds the requested memory block in the Sr state if no Sr' snooper 236 is possibly hidden and a S' snooper 236 is possibly hidden; and the requesting L2 cache 230 holds the requested memory block in the S state if an Sr' snooper 236 is possibly hidden.

In response to the CR, the memory controller snooper 222 that is the LPC for the requested memory block then determines whether to update the domain indicator for the requested memory block, as illustrated at blocks 1460, 1462, 1470, 1472 and 1474. If the CR indicates that the new cache state for the requested memory block is Me, the LPC snooper 222 determines whether it is within the same domain as the requesting L2 cache 230 (block 1460), for example, by reference to the scope indicator in the global bus read operation, and whether the domain indicator 504 indicates local or global (blocks 1460 and 1472). If the LPC is within the same domain as the requesting L2 cache 230 (block 1460), the LPC snooper 222 sets the domain indicator 504 to "local" if it is reset to "global" (block 1462 and 1464). If the LPC is not within the same domain as the requesting L2 cache 230 (block 1460), the LPC snooper 222 resets the domain indicator 504 to "global" if it is set to "local" (block 1472 and 1474).

If the CR indicates that the new cache state for the requested memory block is S or Sr, the LPC snooper 222 similarly determines whether it is within the same domain as the requesting L2 cache 230 (block 1470) and whether the domain indicator 504 indicates local or global (block 1472). If the LPC is within the same domain as the requesting L2 cache 230 (block 1470), no update to the domain indicator 504 is required. If, however, the LPC is not within the same domain as the requesting L2 cache 230 (block 1470), the LPC snooper 222 resets the domain indicator 504 to "global" if it is set to "local" (block 1472 and 1474). Thus, LPC snooper 222 updates the domain indicator 504, if required, in response to receipt of the CR.

Figure 15:
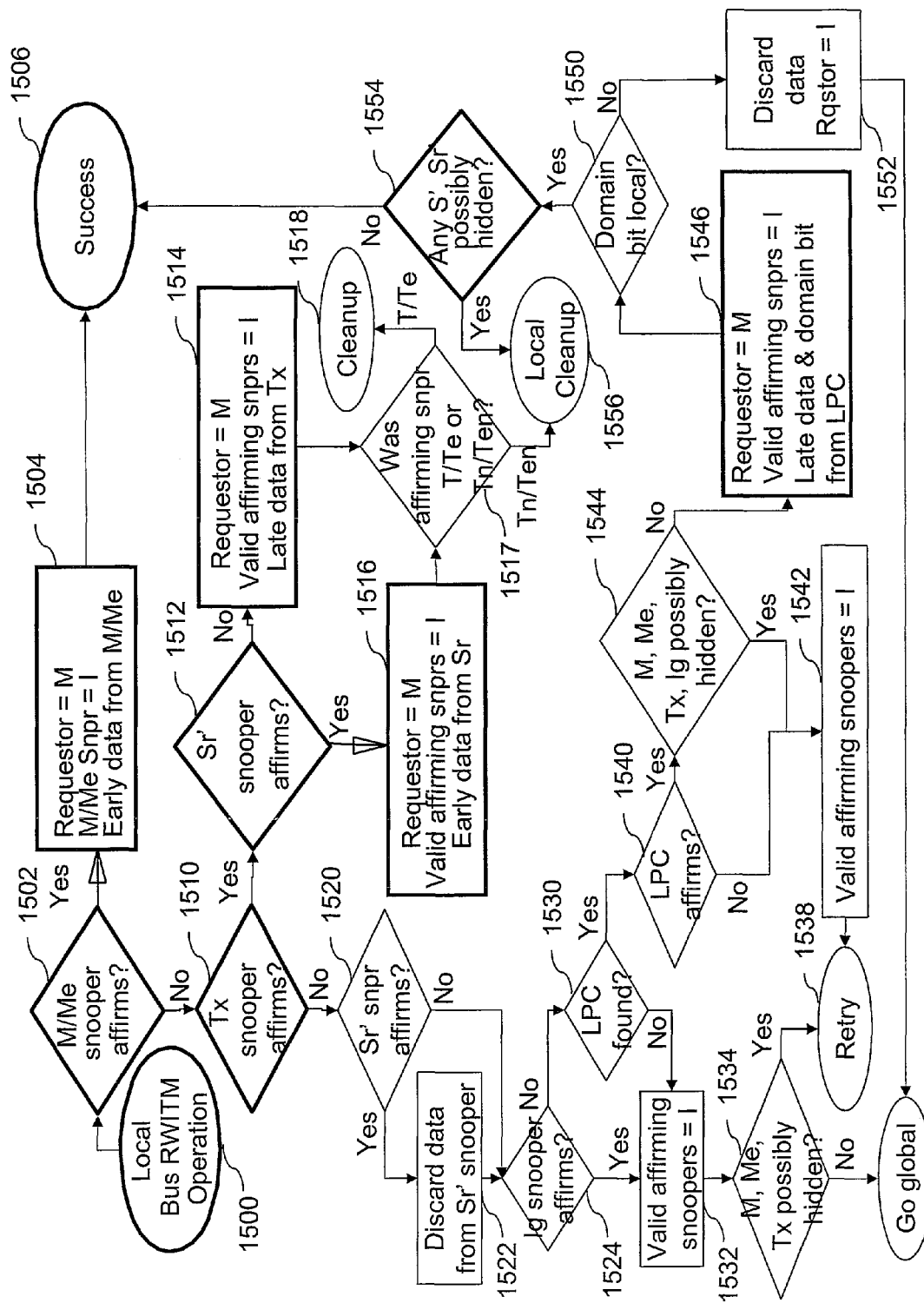
FIG. 15 is a high level logical flowchart of an exemplary method of performing a local bus RWITM operation in a data processing system in accordance with the present invention.

Referring now to FIG. 15, there is depicted a high level logical flowchart of an exemplary method of performing a local bus RWITM operation in a data processing system in accordance with the present invention. The process begins at block 1500, for example, with a master 232 of an L2 cache 230 issuing a local bus RWITM operation its local interconnect 114 at block 748 of FIG. 7A. The various partial responses that snoopers 222, 236 may provide to distributed response logic 210 are represented in FIG. 15 by the outcomes of decision blocks 1502, 1510, 1512, 1520, 1524, 1530, 1534, 1540 and 1544. These partial responses in turn determine the CR for the local bus RWITM operation.

If a snooper 236 affirms the local bus RWITM operation with a partial response indicating that the L2 cache 230 containing the snooper 236 holds the requested memory block in either the M or Me state as shown at block 1502, the process proceeds from block 1502 to block 1504. Block 1504 indicates the operations of the requesting L2 cache 230 and the affirming L2 cache 230 in response to the local bus RWITM operation. In particular, the snooper 236 in the affirming L2 cache 230 updates the cache state of the requested memory block from the M or Me state to the I state and may initiate transmission of the requested memory block to the requesting L2 cache 230 prior to receipt of the CR (i.e., provides "early" data). Upon receipt, the master 232 in the requesting L2 cache 230 places the requested memory block in its L2 cache array 300 in the M state. The process ends with distributed response logic 210 generating a CR indicating "success", as depicted at block 1506.

Referring to block 1510, if a snooper 236 affirms the local bus RWITM operation with a partial response indicating that the L2 cache 230 containing the snooper 236 holds the requested memory block in any of the T, Tn, Te or Ten states (generically designated as Tx in FIG. 15) and no Sr' snooper 236 affirms the local bus RWITM operation (block 1512), the process passes to block 1514. Block 1514 represents the Tx snooper 236 that affirmed the local bus RWITM operation initiating transmission of the requested memory block to the requesting L2 cache 230 in response to receipt of the CR from response logic 210. In response to receipt of the requested memory block, the requesting L2 cache 230 holds the requested memory block in the M state. All valid affirming snoopers 236 (i.e., not Ig snoopers 236) update their respective cache states for the requested memory block to I.

If the complex of partial responses includes a Tx snooper 236 and an Sr' snooper 236 both affirming the local bus RWITM operation (blocks 1510 and 1512), the process passes to block 1516. Block 1516 represents the Sr' snooper 236 that affirmed the local bus RWITM operation initiating transmission of the requested memory block to the requesting L2 cache 230 prior to receipt of the CR provided by response logic 210. In response to receipt of the requested memory block, the requesting L2 cache 230 holds the requested memory block in the M state. All affirming snoopers 236 (i.e., not Ig snoopers 236) update their respective cache states for the requested memory block to I.

As shown at block 1517, in either of the cases represented by blocks 1514 and 1516, response logic 210 generates a CR dependent upon whether the Tx affirming snooper 236 held the requested memory block in one of the T/Te states or the Tn/Ten states. If the Tx snooper 236 was T or Te, response logic 210 generates a CR indicating "cleanup", as shown at block 1518. If, however, the Tx snooper 236 was Tn or Ten, response logic 210 advantageously restricts the scope of the cleanup operations to the local domain by generating a CR indicating "local cleanup", as shown at block 1556. The limited scope of cleanup operations is permitted because the existence of a Tn or Ten coherency state guarantees that no remote cache holds the requested memory block, meaning that coherency can be maintained without a wider broadcast of the local bus RWITM operation or attendant bus kill operations.

The local bus RWITM operation cannot be serviced by a L2 cache snooper 236 without retry if no M, Me, or Tx snooper 236 (i.e., HPC) affirms the local bus RWITM operation to signify that it can mediate the data transfer. Accordingly, if an Sr' snooper 236 affirms the local bus RWITM operation and supplies early data to the requesting L2 cache 230 as shown at block 1520, the master 232 of the requesting L2 cache 230 discards the data provided by the Sr' snooper 236, as depicted at block 1522.

Block 1524 represents the differences in handling the local bus RWITM operation depending upon whether a snooper 236 of an L2 cache 230 provides a partial response affirming the local bus RWITM operation and indicating that the L2 cache 230 holds the address tag of the requested memory block in the Ig state. If so, any valid affirming snooper 236 (i.e., not Ig snoopers 236) invalidates the relevant cache entry (block 1532). If no M, Me, or Tx snooper 236 is possibly hidden by an incomplete partial response (block 1534), distributed response logic 210 provides a "go global" CR, as depicted at block 1536. If, on the other hand, an Ig snooper 236 affirms the local bus RWITM operation and the complex of partial responses indicates an M, Me, or Tx snooper 236 is possibly hidden, response logic 210 generates a "retry" CR, as depicted at block 1538. Thus, the affirmance of the local bus RWITM operation by an Ig snooper 236 will cause the operation to be reissued as a global operation if no HPC is possibly hidden in the local coherency domain.

If an Ig snooper 236 does not affirm the local bus RWITM operation at block 1524, the local bus RWITM operation is handled in accordance with block 1530 and following blocks. In particular, if no memory controller snooper 222 provides a partial response indicating that it is responsible (i.e., the LPC) for the requested memory block (block 1530), each valid affirming snooper 236 invalidates the requested memory block in its respective L2 cache directory 302 (block 1532). The CR generated by response logic 210 depends upon whether any partial responses indicate that an M, Me, or Tx snooper 236 may be hidden (block 1534). That is, if no M, Me, or Tx snooper 236 may be hidden, response logic 210 generates a "go global" CR at block 1536 to inform the master 232 that the local bus RWITM operation must be reissued as a global RWITM operation. On the other hand, if an M, Me, or Tx snooper 236 (i.e., an HPC) for the requested memory block may be hidden, response logic 210 generates a CR indicating "retry", as depicted at block 1538, because the operation may be serviced locally if retried.

Similarly, valid affirming snoopers 236 invalidate the irrespective copies of the requested memory block (block 1542), and response logic 210 provides a "retry" CR for the local bus RWITM operation (block 1538) if no M, Me, or Tx snooper 236 affirms the local bus RWITM operation and a snooper 222 provides a partial response indicating that it is the LPC but does not affirm the local bus RWITM operation. A "retry" CR is also generated at block 1538, and snoopers 236 invalidate their respective copies of the requested memory block (block 1542) if no M, Me, or Tx snooper 236 affirmed the local bus RWTIM operation (blocks 1502, 1510), a snooper 222 affirmed the local bus RWITM operation (block 1540), and an M, Me, Tx or Ig snooper 236 may be possibly hidden (block 1544).

As shown at block 1546, if no M, Me, or Tx snooper 236 affirms the local bus RWITM operation or is possibly hidden and the LPC snooper 222 affirms the local bus RWITM operation, each valid affirming snooper 236 (i.e., not Ig snoopers 236) invalidates its respective copy of the requested memory block. In addition, the LPC snooper 222 provides the requested memory block and associated domain indicator 504 to the requesting L2 cache 230 in response to receipt of the CR from response logic 210. The master 232 of the requesting L2 cache 230 handles the data in accordance with the domain indicator 504. In particular, if the domain indicator 504 is reset to "global", meaning that a remote cached copy may exist that renders stale the data received from the LPC snooper 222, master 232 discards the data received from the LPC snooper 222, maintains an invalid coherency state with respect to the requested memory block (block 1552), and interprets the CR provided by response logic 210 as "go global" (block 1536). If, on the other hand, the domain indicator 504 is set to "local", meaning that no remote cached copy of the requested memory block renders the data received from the LPC snooper 222 potentially stale, the master 232 places the requested memory block and domain indicator 504 in its L2 cache array 300 and sets the associated state field 306 to M (block 1546). If the partial responses and hence the CR indicate an S' or Sr' snooper 236 is possibly hidden (block 1554), the CR indicates local "cleanup" (block 1556), meaning that the requesting L2 cache 230 must invalidate the other valid locally cached copies of the requested memory block, if any, through one or more local bus kill operations. If no such S' or Sr' snoopers 236 are possibly hidden by incomplete partial responses, the CR indicates "success", as depicted at block 1506.

It will be further appreciated that in some embodiments, the master of the local bus RWITM operation may speculatively perform a local cleanup as shown at block 1556 prior to receipt of the domain indicator 3004 from the LPC (block 1550). In this manner, the latency associated with data delivery from the LPC can be masked by the one or more local bus kill operations involved in the local cleanup operations.

Figure 16A:
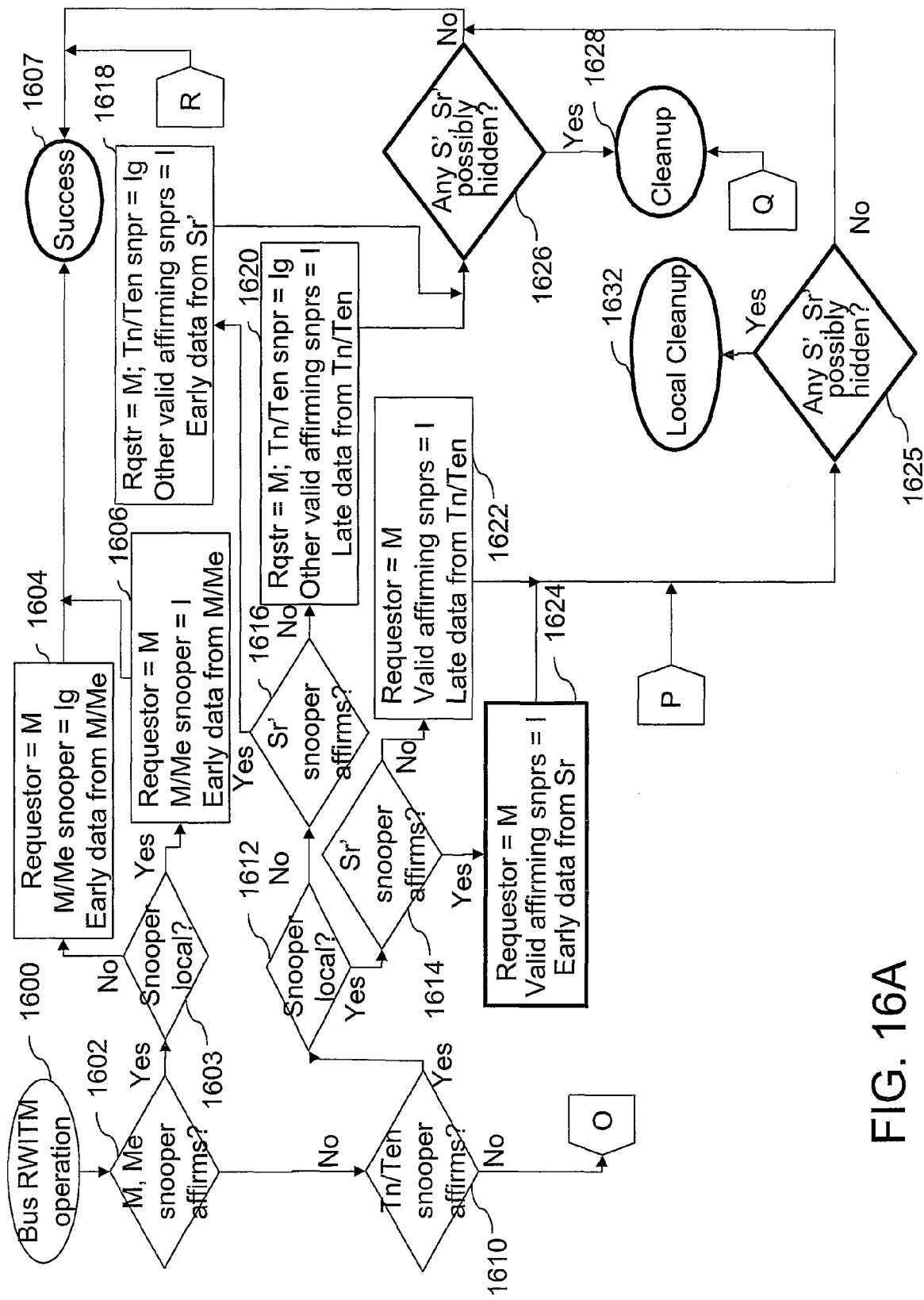
FIGS. 16A-16B together form a high level logical flowchart of an exemplary method of performing a global bus RWITM operation in a data processing system in accordance with the present invention.
Figure 16B:
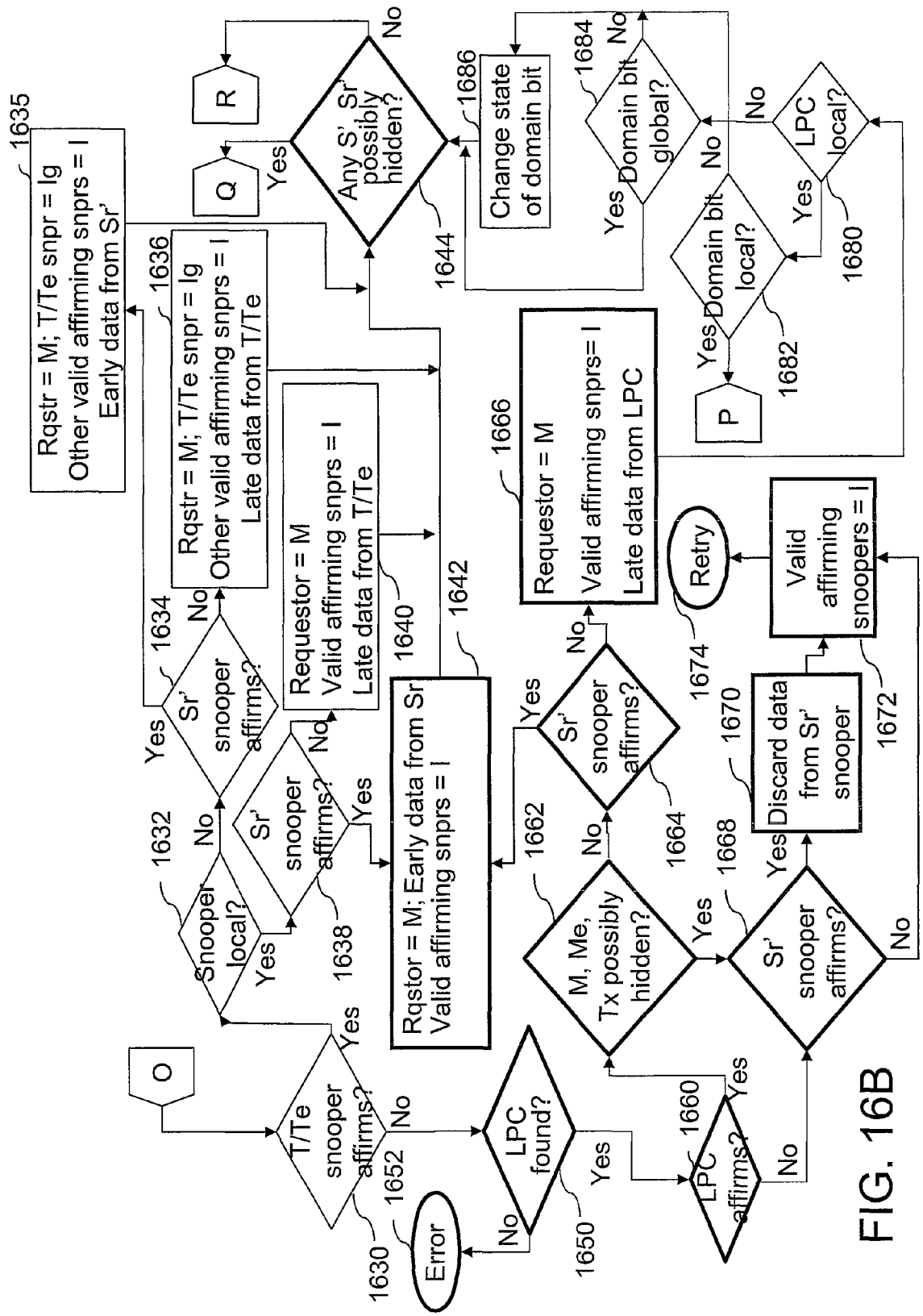

With reference now to FIGS. 16A-16B, there is illustrated a high level logical flowchart of an exemplary method of performing a global bus RWITM operation in a data processing system in accordance with the present invention. As shown, the process begins at block 1600 in response to the master 232 of a requesting L2 cache 230 issuing a global bus RWITM operation, for example, at block 754 of FIG. 7A. If a snooper 236 affirms the global bus RWITM operation with a partial response indicating that the L2 cache 230 containing the snooper 236 holds the requested memory block in the M or Me state as shown at block 1602, the M or Me snooper 236 provides early data to the requesting master 232, which holds the requested memory block in the M state (block 1604 or block 1606). Response logic 210 generates a CR indicating "success", as shown at block 1607. In addition, the M or Me snooper 236 updates its cache state to either I or Ig depending upon whether or not it is local to (i.e., in the same coherency domain as) the requesting master 232 (block 1603). If the M or Me snooper 236 determines it belongs to the same coherency domain as the requesting master 232, for example, by reference to the scope indicator in the bus operation, the M or Me snooper 236 updates its cache state for the requested memory block to I (block 1606). On the other hand, if the M or Me snooper 236 determines it does not belong to the same coherency domain as the requesting master 232, the M or Me snooper 236 updates its cache state for the requested memory block to Ig in order to maintain a cached domain indicator for the requested memory block in its coherency domain (block 1604). Consequently, no retry-push is required in response to the global bus RWITM operation in order to update the domain indicator 504 in the LPC system memory 108.

Turning now to block 1610, if a snooper 236 affirms the global bus RWITM operation with a partial response indicating that the L2 cache 230 containing the snooper 236 holds the requested memory block in either the Tn or Ten state, the process passes to block 1612, which represents the Tn or Ten snooper 236 determining whether or not it is local to the requesting master 232. If so, the global bus RWITM operation is handled in accordance with blocks 1614 and following blocks, which are described below. If, however, the Tn or Ten snooper 236 affirming the global bus RWITM operation determines that it is not local to the requesting master 232, the global bus RWITM operation is serviced in accordance with either block 1618 or block 1620, depending upon whether or not an Sr' snooper 236 also affirmed the global bus RWITM operation.

As shown at blocks 1618, if an Sr' snooper 236 affirmed the global bus RWITM operation, the Sr' snooper 236 provides early data to the requesting master 232, and the Tn or Ten snooper 236 that affirmed the global bus RWITM operation updates its cache state for the entry containing the requested memory block to Ig. In response to receipt of the requested memory block, the requesting L2 cache 230 holds the requested memory block in the M state. In addition, any valid affirming snooper 236 (i.e., not an Ig snooper 236) other than the Tn or Ten snooper 236 updates its respective cache state for the requested memory block to I. Alternatively, as depicted at block 1620, if an Sr' snooper 236 does not affirm the global bus RWITM operation, the Tn or Ten snooper 236 provides late data in response to receipt of the CR. In response to receipt of the requested memory block, the requesting L2 cache 230 holds the requested memory block in the M state. In addition, the Tn or Ten snooper 236 updates its cache state to Ig, and any other valid affirming snooper 236 (i.e., not an Ig snooper 236) updates its respective cache state for the requested memory block to I. Thus, if a remote Tn or Ten snooper 236 affirms the global bus RWITM operation, the affirming Tn or Ten snooper 236 enters the Ig state in order to maintain a cached domain indicator for the requested memory block in its coherency domain. Consequently, no retry-push is required in response to the global bus RWITM operation in order to update the domain indicator 504 in the LPC system memory 108.

In either of the cases represented by blocks 1618 and 1620, response logic 210 generates a CR dependent upon whether an S' or Sr' snooper 236 is possibly hidden and thus unable to invalidate its copy of the requested memory block in response to snooping the global bus RWITM operation. If response logic 210 makes a determination at block 1626 based upon the partial responses to the global bus RWITM operation that an S' or Sr' snooper 236 is possibly hidden, response logic 210 generates a CR indicating "cleanup", as shown at block 1628. Alternatively, if response logic 210 determines that no S' or Sr' snooper 236 is possibly hidden, response logic 210 generates a CR indicating "success", as depicted at block 1607.

Returning to block 1612, if a Tn or Ten snooper 236 that is local to the requesting master 232 affirms the global bus RWITM operation, the global bus RWITM operation is serviced in accordance with either block 1624 or block 1622, depending upon whether or not an Sr' snooper 236 also affirmed the global bus RWITM operation.

As shown at block 1624, if an Sr' snooper 236 affirmed the global bus RWITM operation, the Sr' snooper 236 provides early data to the requesting master 232, and each valid snooper 236 that affirmed the global bus RWITM operation updates its respective cache state for the entry containing the requested memory block to I. In response to receipt of the requested memory block, the requesting L2 cache 230 holds the requested memory block in the M state. Alternatively, as depicted at block 1622, if an Sr' snooper 236 does not affirm the global bus RWITM operation, the Tn or Ten snooper 236 provides late data in response to receipt of the CR. In response to receipt of the requested memory block, the requesting L2 cache 230 holds the requested memory block in the M state. In addition, each valid affirming snooper 236 (i.e., not an Ig snooper 236) updates its respective cache state for the requested memory block to I.

In either of the cases represented by blocks 1624 and 1622, response logic 210 generates a CR dependent upon whether an S' or Sr' snooper 236 is possibly hidden and thus unable to invalidate its copy of the requested memory block in response to snooping the global bus RWITM operation. If response logic 210 makes a determination at block 1625 based upon the partial responses to the global bus RWITM operation that an S' or Sr' snooper 236 is possibly hidden, response logic 210 generates a CR indicating "local cleanup", as shown at block 1632. Thus, the scope of the bus kill operations required to ensure coherency are advantageously limited to the local coherency domain containing the requesting L2 cache 230 and the (former) Tn or Ten snooper 236. Alternatively, if response logic 210 determines that no S' or Sr' snooper 236 is possibly hidden, response logic 210 generates a CR indicating "success", as depicted at block 1607.

Following page connector 0 to block 1630 of FIG. 16B, if a T or Te snooper 236 affirms the global bus RWITM operation, the process passes to block 1632, which represents the T or Te snooper 236 determining whether or not it is local to the requesting master 232. If so, the global bus RWITM operation is handled in accordance with blocks 1638 and following blocks, which are described in detail below. If, however, the T or Te snooper 236 affirming the global bus RWITM operation determines that it is not local to the requesting master 232, the global bus RWITM operation is serviced in accordance with either block 1636 or block 1635, depending upon whether or not an Sr' snooper 236 affirmed the global bus RWITM operation.

As shown at blocks 1635, if an Sr' snooper 236 affirmed the global bus RWITM operation, the Sr' snooper 236 provides early data to the requesting master 232, and the T or Te snooper 236 that affirmed the global bus RWITM operation updates its cache state for the entry containing the requested memory block to Ig. In response to receipt of the requested memory block, the requesting L2 cache 230 holds the requested memory block in the M state. In addition, any valid affirming snooper 236 other than the T or Te snooper 236 updates its respective cache state for the requested memory block to I. Alternatively, as depicted at block 1636, if an Sr' snooper 236 does not affirm the global bus RWITM operation, the T or Te snooper 236 provides late data in response to receipt of a CR. In response to receipt of the requested memory block, the requesting L2 cache 230 holds the requested memory block in the M state. In addition, the T or Te snooper 236 updates its cache state to Ig, and any other valid affirming snooper 236 updates its respective cache state for the requested memory block to I. Thus, if a remote T or Te snooper 236 affirms the global bus RWITM operation, the affirming T or Te snooper 236 enters the Ig state in order to maintain a cached domain indicator for the requested memory block in its coherency domain. Consequently, no retry-push is required in response to the global bus RWITM operation in order to update the domain indicator 504 in the LPC system memory 108.

In either of the cases represented by block 1635 or block 1636, response logic 210 generates a CR dependent upon whether an S' or Sr' snooper 236 is possibly hidden and thus unable to invalidate its copy of the requested memory block in response to snooping the global bus RWITM operation. If response logic 210 makes a determination at block 1644 based upon the partial responses to the bus RWITM operation that an S' or Sr' snooper 236 is possibly hidden, response logic 210 generates a CR indicating "cleanup", as shown at block 1626. Alternatively, if response logic 210 determines that no S' or Sr' snooper 236 is possibly hidden, response logic 210 generates a CR indicating "success", as depicted at block 1607.

Returning to blocks 1632 and 1638, if the T or Te snooper 236 determines at block 3412 that it is local the requesting master 232, the global bus RWITM operation is serviced in accordance with either block 1640 or block 1642, depending upon whether an Sr' snooper 236 also affirmed the global bus RWITM operation. That is, as shown at block 1640, if no Sr' snooper 236 affirms the global bus RWITM operation (block 1638), the T or Te snooper 236 that affirmed the global bus RWITM operation initiates transmission of the requested memory block to the requesting L2 cache 230 in response to receipt of the CR (i.e., provides "late" data). In response to receipt of the requested memory block, the requesting L2 cache 230 holds the requested memory block in the M state. In addition, all valid affirming snoopers 236 update their respective cache states for the requested memory block to I. Alternatively, as depicted at block 1642, if an Sr' snooper 236 affirms the global bus RWITM operation (block 1638), the Sr' snooper 236 initiates transmission of the requested memory block to the requesting L2 cache 230 prior to receipt of the CR (i.e., provides "early" data). In response to receipt of the requested memory block, the requesting L2 cache 230 holds the requested memory block in the M state. In addition, all valid affirming snoopers 236 update their respective cache states for the requested memory block to I. Following either block 1640 or block 1642, the process passes to block 1644, which has been described.

Referring now to block 1650, if no M, Me, or Tx snooper 236 affirms the global bus RWITM operation, and further, if no snooper 222 provides a partial response indicating that it is responsible (i.e., the LPC) for the requested memory block, an error occurs causing processing to halt, as depicted at block 1652. If, on the other hand, no M, Me, or Tx snooper 236 affirms the bus RWITM operation and a snooper 222 provides a partial response indicating that it is responsible (i.e., the LPC) for the requested memory block but does not affirm the bus RWITM operation (block 1660), each valid affirming snooper 236 (i.e., not an Ig snooper 236) invalidates the requested memory block in its respective L2 cache directory 302 (block 1672), and response logic 210 generates a CR indicating "retry", as depicted at block 1674. In addition, data provided by an Sr' snooper 236 affirming the global bus RWITM operation, if any, is discarded by the master 232 (blocks 1668 and 1670). As indicated by decision block 1662, affirming snoopers 236 similarly invalidate their respective copies of the requested memory block at block 1672 and response logic 210 generates a "retry" CR at block 1674 if a memory controller snooper 222 affirms the global bus RWITM operation (block 1660) and an L2 cache snooper 236 provides a partial response indicating that it may hold the requested memory block in one of the M, Me, or Tx states but cannot affirm the global bus RWITM operation (block 1662).

With reference now to block 1664, if no M, Me, or Tx snooper 236 affirms the global bus RWITM operation or is possibly hidden, a snooper 222 affirms the global bus RWITM operation, and a Sr' snooper 236 affirms the global bus RWITM operation, the global bus RWITM operation is serviced in accordance with block 1642 and following blocks, which are described above. Assuming these same conditions except for the absence of an Sr' snooper 236 affirming the global bus RWITM operation, the global bus RWITM operation is serviced in accordance with block 1666. In particular, in response to the CR, the LPC snooper 222 provides the requested memory block to the requesting L2 cache 230, which obtains the requested memory block in the M state, and all valid affirming snoopers 236 invalidate their respective copies of the requested memory block, if any.

Following block 1666, the process passes to blocks 1680-1686, which collectively represent the LPC snooper 222 determining whether or not to update the domain indicator 504 for the requested memory block based upon whether the LPC snooper 222 is local to the requesting master 232 (block 1680) and the present state of the domain indicator (blocks 1682 and 1684). If the LPC snooper 222 is local to the requesting L2 cache 230 and the domain indicator 504 in system memory 108 is set to indicate "local", no update is required, and the process passes through page connector P to block 1625 of FIG. 16A, which has been described. On the other hand, LPC snooper 222 changes the state of the domain indicator 504 at block 1686 if LPC snooper 222 is local to the requesting master 232 and domain indicator 504 is reset to indicate "global" or if LPC snooper 222 is not local to the requesting master 232 and domain indicator 504 is reset to indicate "local".

If the partial responses indicate an S' or Sr' snooper 236 is possibly hidden (block 1644), the requesting L2 cache 230 receives a "cleanup" CR at block 1628, indicating that it must invalidate any other valid cached copies of the requested memory block. If no S' or Sr' snoopers 236 are possibly hidden by incomplete partial responses, response logic 210 generates a "success" CR, as depicted at block 1607.

Figure 17:
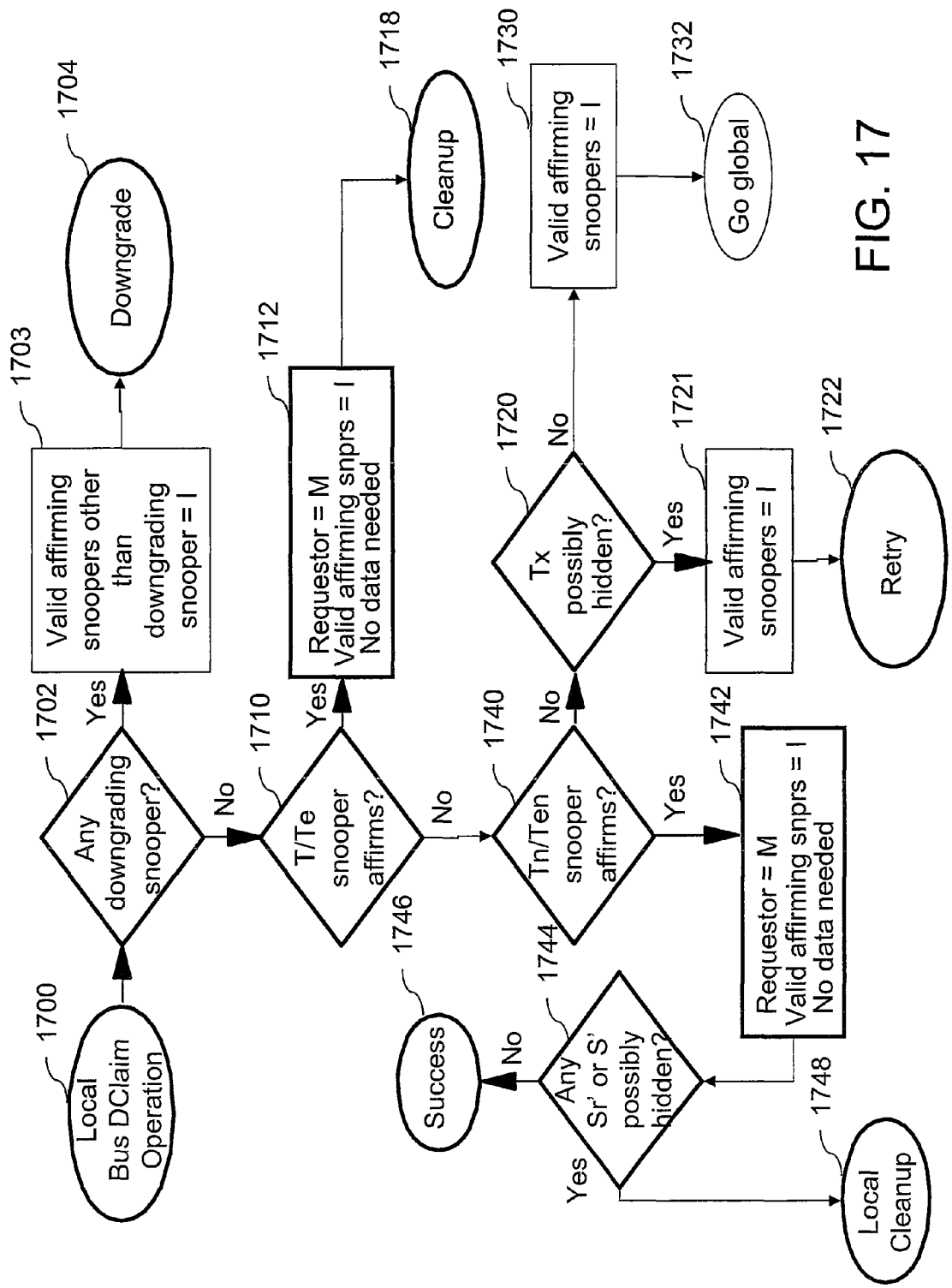
FIG. 17 is a high level logical flowchart of an exemplary method of performing a local bus DClaim operation in a data processing system in accordance with the present invention.

With reference now to FIG. 17, there is illustrated a high level logical flowchart of an exemplary method of performing a local bus DClaim operation in a data processing system in accordance with the present invention. As shown, the process begins at block 1700, for example, with a master 232 issuing a local bus DClaim operation on a local interconnect 114 at block 732 of FIG. 7A. The various partial responses that snoopers 236 may provide to distributed response logic 210 in response to the local bus DClaim operation are represented in FIG. 17 by the outcomes of decision blocks 1702, 1710, 1720, 1740, and 1744. These partial responses in turn determine what CR response logic 210 generates for the local bus DClaim operation.

As shown at block 1702, if any snooper 236 issues a partial response downgrading the local bus DClaim operation to a bus RWITM operation as illustrated, for example, at blocks 748 and 754 of FIG. 7A, each other affirming snooper 236 holding the requested memory block in a valid state invalidates its respective copy of the requested memory block, as shown at block 1703. In response to the local bus DClaim operation and the partial responses, distributed response logic 210 generates a CR indicating "downgrade", as shown at block 1704. In response to this CR, the master 232 of the local bus DClaim operation must next attempt to gain ownership of the requested memory block utilizing a local bus RWITM operation, as depicted at block 748 of FIG. 7A.

If a snooper 236 affirms the local bus DClaim operation with a partial response indicating that the L2 cache 230 containing the snooper 236 holds the requested memory block in either the T or Te state as shown at block 1710, the process passes to block 1712. Because no data transfer is required in response to a bus DClaim operation, block 1712 indicates that the master 232 in the requesting L2 cache 230 updates the cache state of the requested memory block in L2 cache directory 302 to the M state. All valid affirming snoopers 236 update their respective cache states for the requested memory block to I. As shown at block 1718, distributed response logic 210 generates a CR indicating "cleanup", meaning that the requesting L2 cache 230 must issue one or more bus kill operations to invalidate copies of the requested memory block, if any, held outside of the local coherency domain.

As illustrated at block 1740, if a Tn or Ten snooper 236 affirms the local bus DClaim operation, the process passes to block 1742. Because no data transfer is required in response to a bus DClaim operation, block 1742 indicates that the master 232 in the requesting L2 cache 230 updates the cache state of the requested memory block in L2 cache directory 302 to the M state. All valid affirming snoopers 236 update their respective cache states for the requested memory block to I. As shown at block 1744, distributed response logic 210 generates a CR that is dependent upon whether the partial responses received by response logic 210 indicate that an Sr' or S' snooper 236 may be possibly hidden. If not, distributed response logic 210 generates a response indicating "success", as shown at block 1746, because the presence of the Tn or Ten coherency state guarantees that no L2 cache 230 outside of the local coherency domain holds a copy of the requested memory block. If the partial responses indicate that an Sr' or S' snooper 236 may be possibly hidden, response logic 210 generates a CR indicating "local cleanup", as shown at block 1748. Only local cleanup operations are required because the Tn or Ten coherency state again guarantees that no L2 cache 230 outside of the local coherency domain holds a valid copy of the requested memory block.

Turning now to block 1720, if no snooper downgrades the local bus DClaim operation (block 1702), no Tx snooper 236 affirms the local bus DClaim operation (blocks 1710 and 1740), and further, and a snooper 236 provides a partial response indicating that it may hold the requested memory block in a Tx state but cannot affirm the local bus DClaim operation, each valid affirming snoopers 236 updates its respective coherency state for the requested memory block to the I state (block 1721). In addition, response logic 210 generates a CR indicating "retry", as depicted at block 1722. In response to the "retry" CR, the requesting master 232 may reissue the bus DClaim operation as either a local or global operation, as explained above with reference to block 736 of FIG. 7A. If, however, no snooper downgrades the local bus DClaim operation (block 1702), no Tx snooper 236 affirms the bus DClaim operation or is possibly hidden (blocks 1702, 1710, 1740, and 1720), response logic 210 provides a "go global" CR, as shown at block 1732, and all affirming snoopers, if any, having a valid copy of the requested memory block invalidate their respective copies of the requested memory block, as shown at block 1730. In response to the "go global" CR, the master 232 reissues the bus DClaim operation as a global operation, as depicted at block 740 of FIG. 7A.

Figure 18:
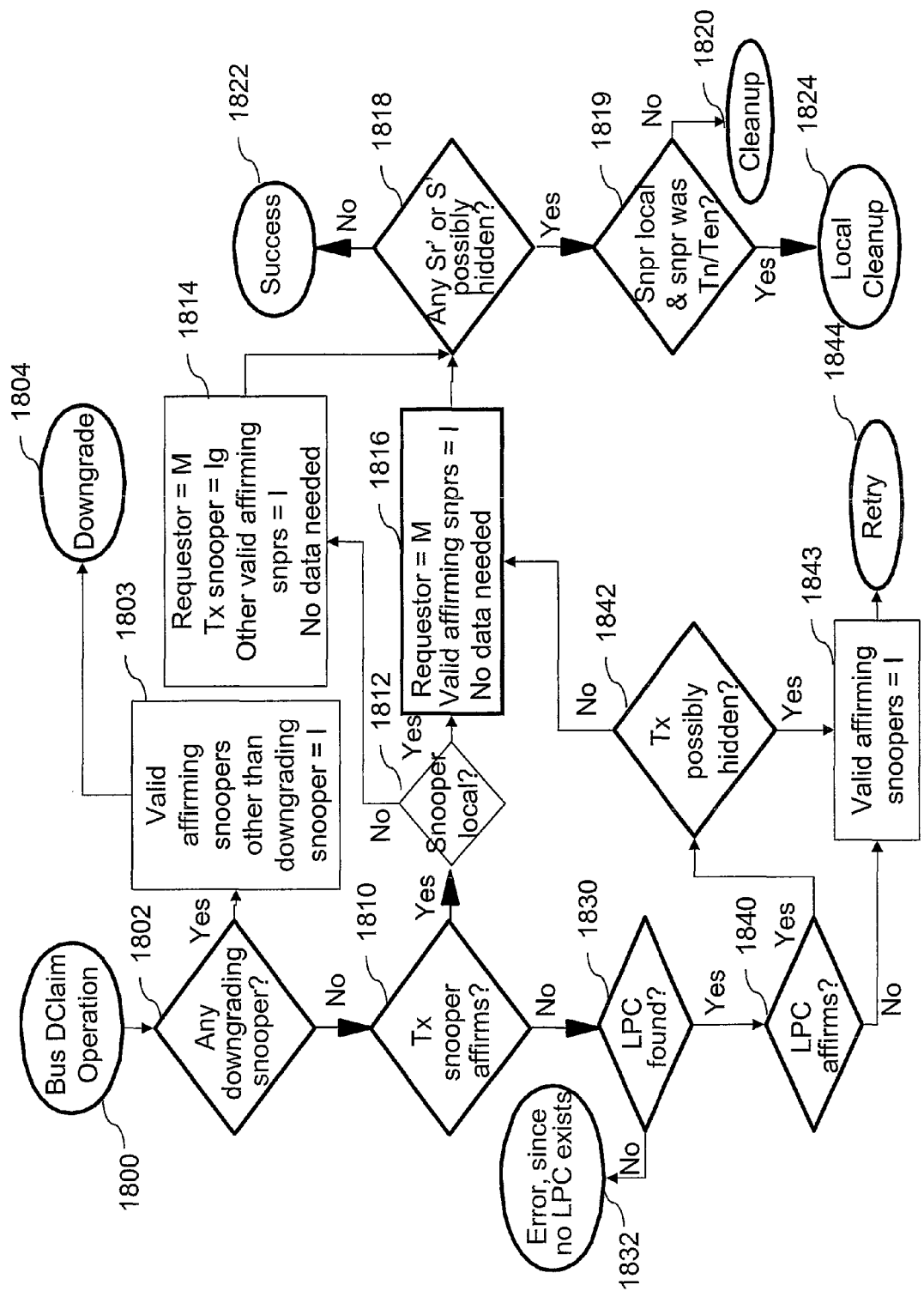
FIG. 18 is a high level logical flowchart of an exemplary method of performing a global bus DClaim operation in a data processing system in accordance with the present invention.

Referring now to FIG. 18, there is depicted a high level logical flowchart of an exemplary method of performing a global bus DClaim operation in a data processing system in accordance with the present invention. The process begins at block 1800, for example, with a master 232 of an L2 cache 230 issuing a global bus DClaim operation on system interconnect 110 at block 740 of FIG. 7A. The various partial responses that snoopers 222, 236 may provide to distributed response logic 210 in response to the global bus DClaim operation are represented in FIG. 18 by the outcomes of decision blocks 1802, 1810, 1818, 1830, 1840, 1842 and 1819 These partial responses in turn determine what CR response logic 210 generates for the global bus DClaim operation.

As shown at block 1802, if any snooper 236 issues a partial response downgrading the global bus DClaim operation to a bus RWITM operation, each valid affirming snooper 236 (i.e., not an Ig snooper 236) other than the downgrading snooper 236 invalidates its copy of the requested memory block, as shown at block 1803. In addition, distributed response logic 210 generates a CR indicating "downgrade", as shown at block 1804. In response to this CR, the master 232 of the global bus DClaim operation must next attempt to gain ownership of the requested memory block utilizing a bus RWITM operation, as depicted at blocks 748 and 754 of FIG. 7A.

If a Tx (e.g., T, Te, Tn, or Ten) snooper 236 affirms the global bus DClaim operation as shown at block 1810, the process passes to block 1812. Block 1812 depicts the Tx snooper 236 determining whether it is local to the requesting master 232. If not, the Tx snooper 236 updates the state of its relevant entry to Ig to maintain a cached domain indicator for the requested memory block as shown at block 1814. In addition, the requesting master 232 updates the coherency state of its copy of the requested memory block to M, and each valid affirming snooper 236 other than the Tx snooper 236 updates its coherency state for the requested memory block to I (block 1814).

Returning to block 1812, if the Tx snooper 236 determines that it is local to the requesting master 232, the global bus DClaim operation is handled in accordance with block 1816. In particular, the master 232 in the requesting L2 cache 230 updates the state of its copy of the requested memory block to the M state, and all valid affirming snoopers 236 update their respective cache states for the requested memory block to I.

As shown at blocks 1818 and 1822, if the partial responses indicate that no S' or Sr' snooper 236 is possibly hidden, the process ends with distributed response logic 210 generating a CR indicating "success" (block 1822). If, on the other hand, a determination is made at block 1818 that at least one partial response indicating the presence of a possibly hidden S' or Sr' snooper 236 was given in response to the global bus DClaim operation, some type of cleanup operation will be required. If the affirming Tx snooper 236 is within the same coherency domain as the requesting master 232 and, prior to the operation, was in one of the Te and Ten states, distributed response logic 210 generates a CR indicating "local cleanup" (block 1824), meaning that the requesting L2 cache 230 must issue one or more local bus kill operations to invalidate the requested memory block in any such hidden S' or Sr' snooper 236. If the affirming Tx snooper 236 is not within the same coherency domain as the requesting master 232 or the affirming Tx snooper 236 was, prior to the operation, in one of the T or Te coherency states, global cleanup is required, and response logic 210 generates a CR indicating "cleanup" (block 1820). Thus, the presence of a Tn or Ten coherency state can again be utilized to limit the scope of bus kill operations.

Turning now to block 1830, if no Tx snooper 236 affirms the global bus DClaim operation, and further, if no snooper 222 provides a partial response indicating that it is responsible (i.e., the LPC) for the requested memory block, an error occurs causing processing to halt, as depicted at block 1832. If, on the other hand, no Tx snooper 236 affirms the global bus DClaim operation and a snooper 222 provides a partial response indicating that it is responsible (i.e., the LPC) for the requested memory block but does not affirm the global bus DClaim operation (block 1840), each valid affirming snooper 236 invalidates its respective copy of the requested memory block (block 1843), and response logic 210 generates a CR indicating "retry", as depicted at block 1844. As indicated by decision block 1842, each valid affirming snooper also invalidates its respective copy of the requested memory block at block 1843, and response logic 210 similarly generates a "retry" CR at block 1844 if a memory controller snooper 222 affirms the bus DClaim operation (block 1840) and an Tx snooper 236 may be possibly hidden (block 1842).

As depicted at block 1842, if no Tx snooper 236 affirms the global bus DClaim operation or is possibly hidden and a snooper 222 affirms the global bus DClaim operation, the global bus DClaim operation is serviced in accordance with block 1816, which is described above.

Figure 19:
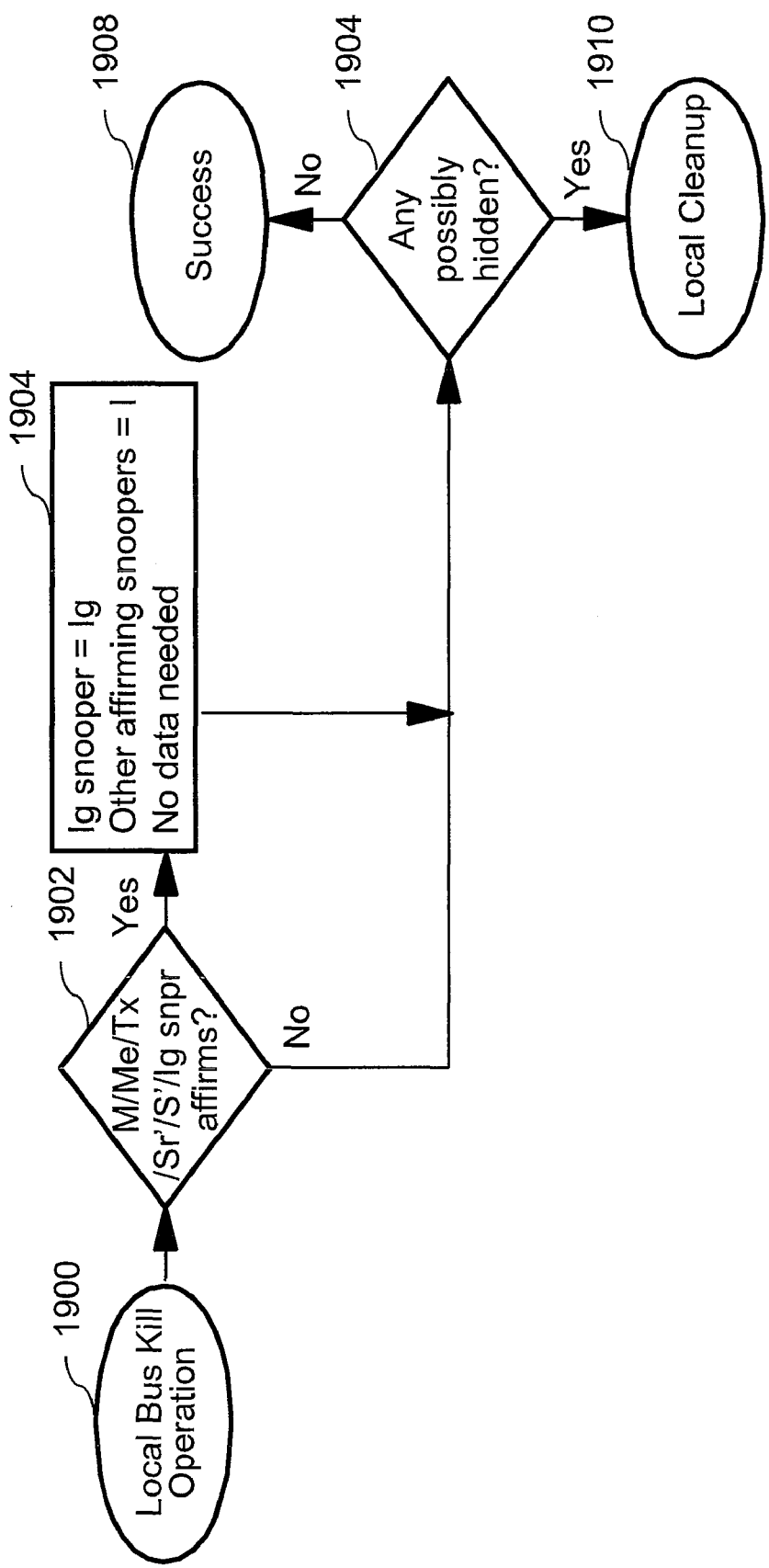
FIG. 19 is a high level logical flowchart of an exemplary method of performing a local bus kill operation in a data processing system in accordance with the present invention.

With reference now to FIG. 19, there is illustrated a high level logical flowchart of an exemplary method of performing a local bus kill operation in a data processing system in accordance with the present invention. The limitation of scope of the local bus kill operation to one coherency domain is enabled by the additional information provided by the Tn and Ten coherency states, namely, that no shared copy of the memory block resides outside of the coherency domain.

As depicted, the process begins at block 1900, for example, with the master 232 of an L2 cache 230 issuing a local bus kill operation on its local interconnect 114, for example, at block 788 of FIG. 7B, block 878 of FIG. 8B or block 1044 of FIG. 10. The various partial responses that snoopers 222, 236 may provide to distributed response logic 210 in response to the local bus kill operation are represented in FIG. 19 by the outcomes of decision blocks 1902 and 1906. These partial responses in turn determine what CR response logic 210 generates for the local bus kill operation.

In particular, as depicted at blocks 1902 and 1904, any snooper 236 affirming the bus kill operation in any of the M, Me, Tx, Sr' or S' states invalidates its copy of the requested memory block without any transmission of data in response to receipt of the CR. An affirming Ig snooper 236, if any, remains in the Ig state. As further shown at blocks 1906, 1908 and 1910, response logic 210 generates a CR indicating "local cleanup" if any snooper 236 provides a partial response not affirming the local bus kill operation and otherwise generates a CR indicating "success".

Figure 20:
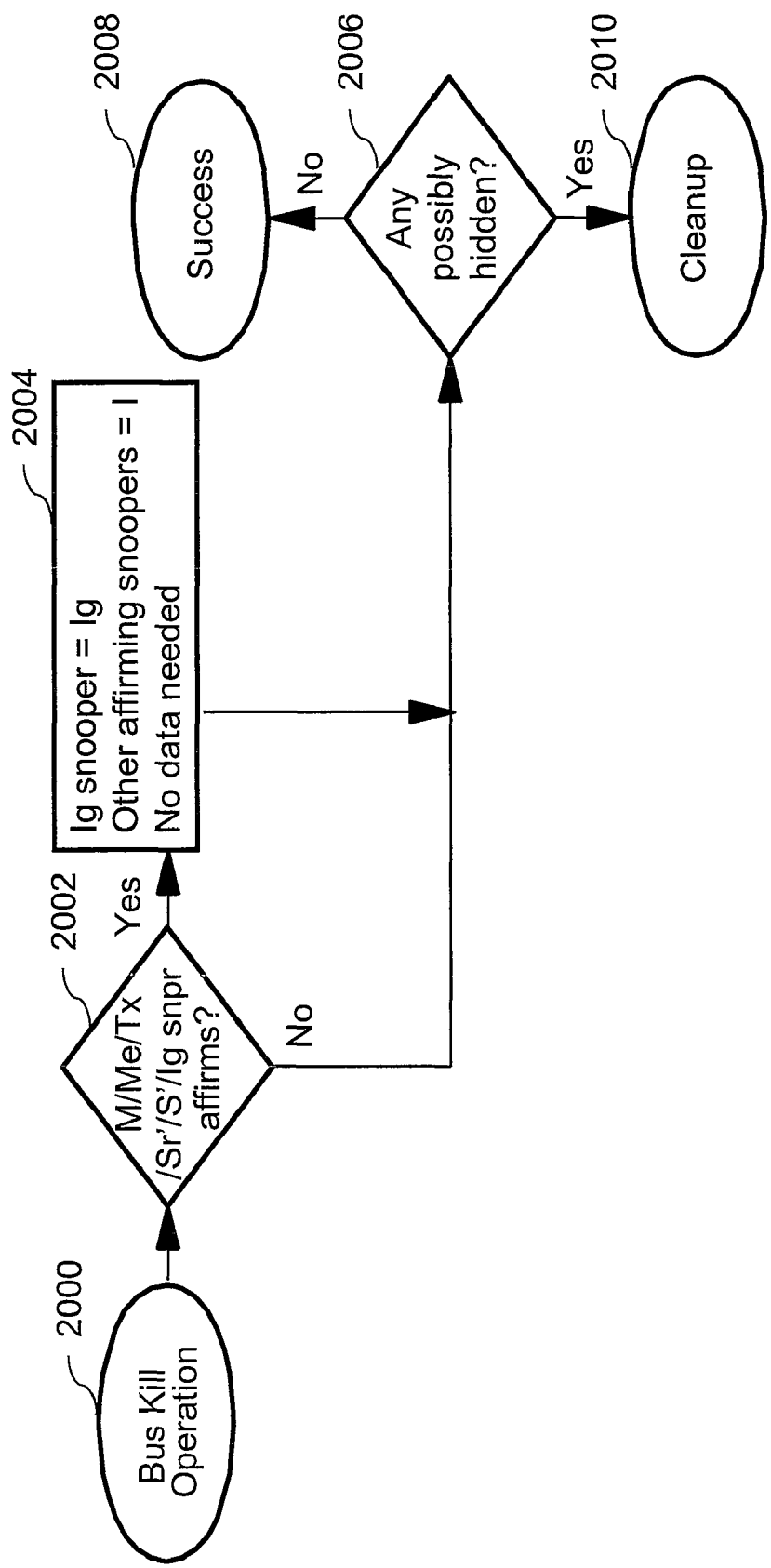
FIG. 20 is a high level logical flowchart of an exemplary method of performing a global bus kill operation in a data processing system in accordance with the present invention.

With reference now to FIG. 20, there is illustrated a high level logical flowchart of an exemplary method of performing a global bus kill operation in accordance with the present invention. As depicted, the process begins at block 2000, for example, with the master 232 of an L2 cache 230 issuing a bus kill operation on system interconnect 110, for example, at block 626 of FIG. 6, block 726 of FIG. 7 or block 912 of FIG. 9. The various partial responses that snoopers 222, 236 may provide to distributed response logic 210 in response to the global bus kill operation are represented in FIG. 20 by the outcomes of decision blocks 2002 and 2006. These partial responses in turn determine what CR response logic 210 generates for the bus kill operation.

In particular, as depicted at blocks 2002 and 2004, any valid snooper 236 affirming the bus kill operation in any of the M, Me, Tx, Sr' or S' states invalidates its copy of the requested memory block without any transmission of data in response to receipt of the CR. An affirming Ig snooper 236, if any, remains in the Ig state. As further shown at blocks 2006, 2008 and 2010, response logic 210 generates a CR indicating "cleanup" if any snooper 236 provided a partial response not affirming the bus kill operation and otherwise generates a CR indicating "success".

Figure 21:
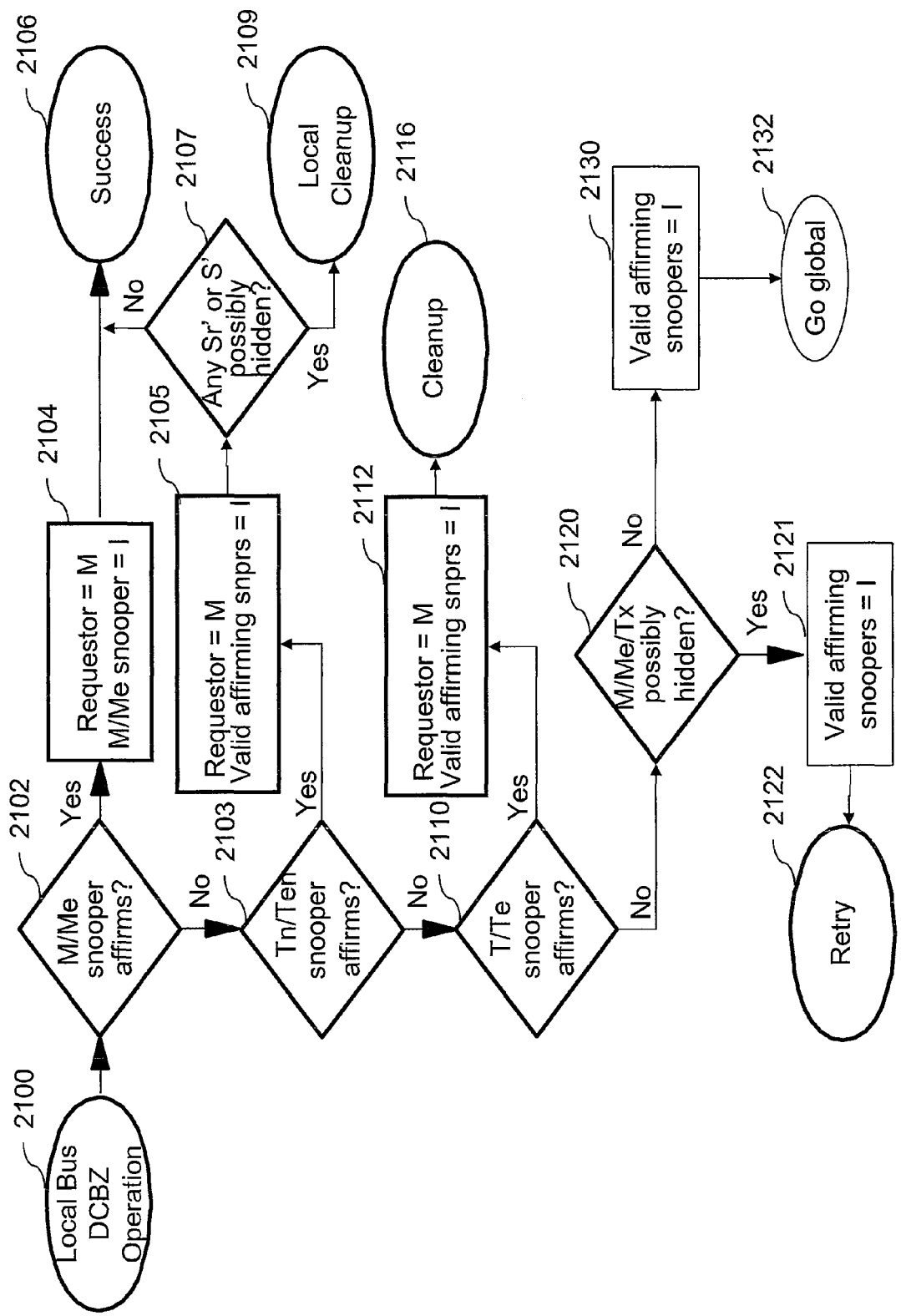
FIG. 21 is a high level logical flowchart of an exemplary method of performing a local bus DCBZ operation in a data processing system in accordance with the present invention.

With reference now to FIG. 21, there is depicted a high level logical flowchart of an exemplary method of performing a local bus DCBZ operation in a data processing system in accordance with the present invention. The process begins at block 2100, for example, with the issuance of a local bus DCBZ operation on a local interconnect 114 at block 2052 of FIG. 56A. The various partial responses that snoopers 236 may provide to distributed response logic 210 are represented in FIG. 21 by the outcomes of decision blocks 2102, 2103, 2107, 2110, and 2120. These partial responses in turn determine the CR for the local bus DCBZ operation.

If a snooper 236 affirms the local bus DCBZ operation with a partial response indicating that the L2 cache 230 containing the snooper 236 holds the requested memory block in either the M or Me state as shown at block 2102, the process proceeds to block 2104. Block 2104 indicates the operations of the requesting L2 cache 230 and affirming L2 cache 230 in response to the request. In particular, the master 232 in the requesting L2 cache 230 updates the cache state of the requested memory block to the M state (no data is transferred), and the snooper 236 in the affirming L2 cache 230 updates the cache state of the requested memory block to the I state. The process then ends with distributed response logic 210 generating a CR indicating "success", as depicted at block 2106.

As depicted at blocks 2103 and 2105, if a Tn or Ten snooper 236 affirms the local bus DCBZ operation, the Tn or Ten snooper 236 and any other valid affirming snooper 236 invalidates its copy of the requested memory block, and the requesting L2 cache 230 updates its cache state for the requested memory block to the M state. If response logic 210 received a partial response indicating that an Sr' or S' snooper 236 is possibly hidden (block 2107), response logic 210 generates a CR indicating "local cleanup", as illustrated at block 2109. Thus, the existence of the Tn or Ten state enables the scope of cleanup operations to be restricted to the local coherency domain. If response logic 210 determines at block 2107 that no Sr' or S' snooper 236 is possibly hidden, response logic 210 generates a CR indicating "success", as shown at block 2106.

Referring now to block 2110, if a T or Te snooper 236 affirms the local bus DCBZ operation, the process passes to block 2112. Block 2112 represents the T or Te snooper 236 and any other valid affirming snooper 236 invalidating its respective copy of the requested memory block and the master 232 in the requesting L2 cache 230 updating the cache state of the requested memory block to the M state. As further illustrated at block 2116, distributed response logic 210 generates a CR indicating "cleanup" in order to ensure the invalidation of copies of the requested memory block, if any, held in L2 caches 230 outside of the local coherency domain.

Turning now to block 2120, if no M, Me, or Tx snooper 236 affirms the local bus DCBZ operation (blocks 2102 and 2110), and further, a snooper 236 provides a partial response indicating that it may hold the requested memory block in the M, Me, or Tx state but cannot affirm the local bus DCBZ operation, each valid affirming snooper 236 invalidates its respective copy of the requested memory block (block 2121), and response logic 210 generates a CR indicating "retry", as depicted at block 2122. In response to the "retry" CR, the requesting master 232 may reissue the bus DCBZ operation as either a local or global operation, as explained above with reference to block 2050 of FIG. 20. If, however, no M, Me, or Tx snooper 236 affirms the bus DClaim operation or is possibly hidden (blocks 2102, 2110, 2120), response logic 210 provides a "go global" CR, as shown at block 2132, and all affirming snoopers, if any, having a valid copy of the requested memory block invalidate their respective copies of the requested memory block, as shown at block 2130. In response to the "go global" CR, the master 232 reissues the bus DCBZ operation as a global operation, as depicted at block 860 of FIG. 8A.

Figure 22:
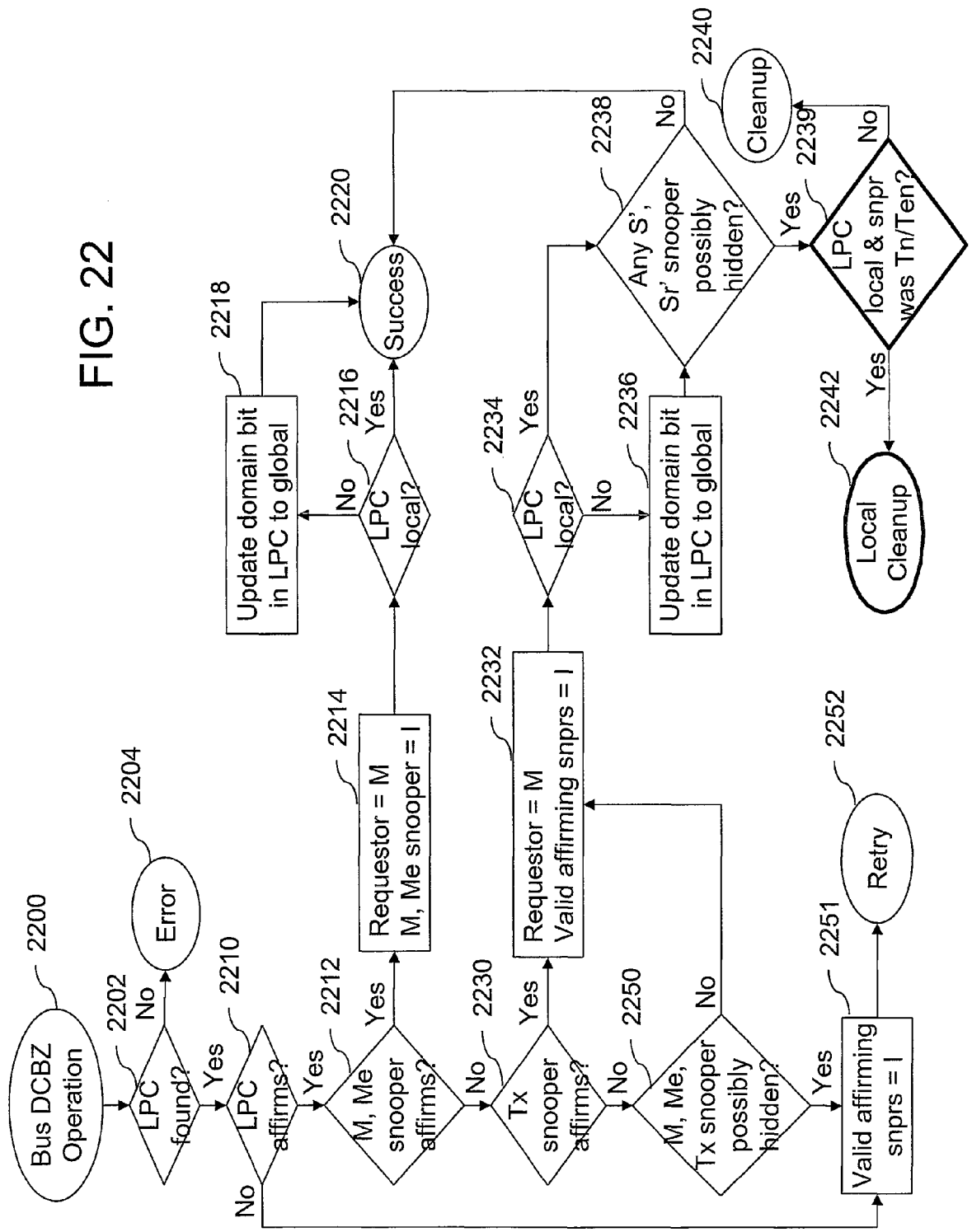
FIG. 22 is a high level logical flowchart of an exemplary method of performing a global bus DCBZ operation in a data processing system in accordance with the present invention.

Referring now to FIG. 22, there is depicted a high level logical flowchart of an exemplary method of performing a global bus DCBZ operation in a data processing system in accordance with the present invention. The process begins at block 2200, for example, with the master 232 of an L2 cache 230 issuing a global bus DCBZ operation on system interconnect 110 at block 860 of FIG. 8A. The various partial responses that snoopers 222, 236 may provide to distributed response logic 210 are represented in FIG. 22 by the outcomes of decision blocks 2202, 2210, 2212, 2230, 2238, 2239 and 2250. These partial responses in turn determine the CR for the global bus DCBZ operation.

As indicated at blocks 2202-2204, if no snooper 222 provides a partial response indicating that it is responsible (i.e., the LPC) for the requested memory block, an error halting processing occurs, since the no LPC was found. If a snooper 222 indicates that it is the LPC for the requested memory block, but does not affirm the global DCBZ operation, each affirming snooper 236 invalidates its respective copy of the requested memory block (block 2251), and response logic 210 generates a CR indicating "retry", as depicted at block 2252. A "retry" CR is similarly generated by response logic 210 at block 2252 and each valid affirming snooper 236 invalidates its respective copy of the requested memory block at block 2251 if a snooper 222 affirms the global bus DCBZ operation, no M, Me, or Tx snooper 236 affirms the global bus DCBZ operation, and an M, Me, or Tx snooper 236 is possibly hidden.

If a snooper 236 affirms the global bus DCBZ operation with a partial response indicating that the L2 cache 230 containing the snooper 236 holds the requested memory block in either the M or Me state as shown at block 2212, the process proceeds to block 2214. Block 2214 indicates the operations of the requesting L2 cache 230 and the affirming L2 cache 230 in response to the global bus DCBZ operation. In particular, the master 232 in the requesting L2 cache 230 updates the cache state of the requested memory block to the M state (no data is transferred), and the snooper 236 in the affirming L2 cache 230 updates the cache state of the requested memory block to the I state. As further shown at block 2216 and 2218, the LPC snooper 222 also resets the domain indicator 504 associated with the requested memory block to "global" if the LPC snooper 222 is not within the same coherency domain as the requesting master 232. The process ends with distributed response logic 210 generating a CR indicating "success", as depicted at block 2220.

If a Tx snooper 236 affirms the global bus DCBZ operation as shown at block 2230, the process passes to block 2232. Block 2232 represents the Tx snooper 236 and any other valid affirming snooper 236 invalidating its copy of the requested memory block and the master 232 in the requesting L2 cache 230 updating the cache state of its copy of the requested memory block to the M state. As further shown at block 2234 and 2236, the LPC snooper 222 also resets the domain indicator 504 associated with the requested memory block to "global" if the LPC snooper 222 is not within the same coherency domain as the requesting master 232.

If response logic 210 determines at block 2238 that the partial responses indicate that no S' or Sr' snooper 236 is possibly hidden, distributed response logic 210 provides a CR indicating "success" as shown at block 2220. If, on the other hand, at least one partial response indicating the presence of a possibly hidden S' or Sr' snooper 236 was given in response to the global bus DCBZ operation, cleanup operations are required. Accordingly, as shown at blocks 2239, 2242 and 2240, distributed response logic 210 generates a CR indicating "local cleanup" if the LPC snooper 222 is local to the requesting master 232 and the affirming snooper 236 held the requested memory block in one of the Tn or Ten coherency states, and otherwise generates a CR indicating global "cleanup".

As indicated by decision block 2250, if a memory controller snooper 222 affirms the global bus DCBZ operation (block 2210) and no M, Me, or Tx snooper 236 affirms the global bus DCBZ operation or is possibly hidden (blocks 2212, 2230 and 2250), the global bus DCBZ operation is serviced as described above with reference to block 2232 and following blocks.

Figure 23:
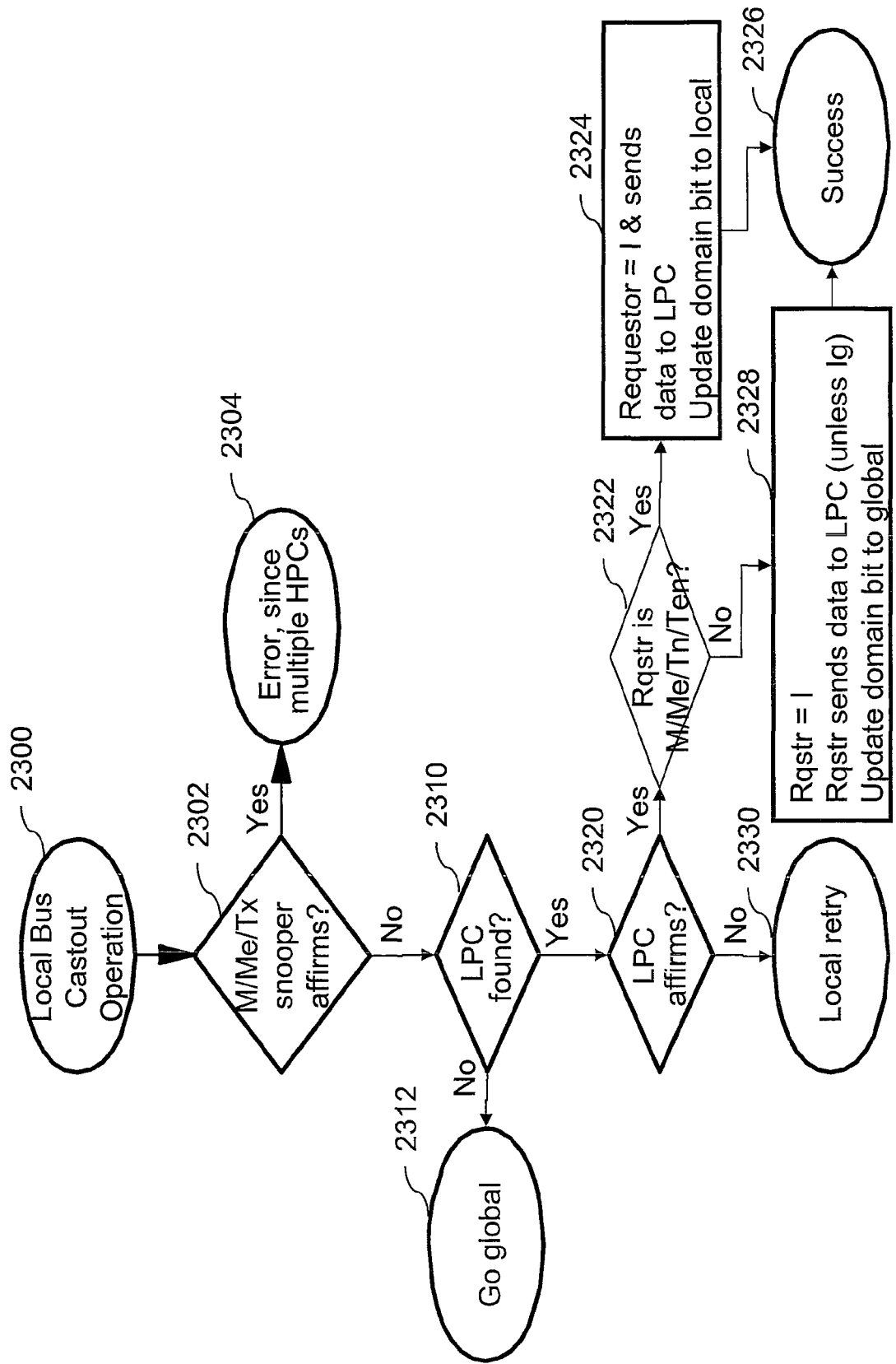
FIG. 23 is a high level logical flowchart of an exemplary method of performing a local bus castout operation in a data processing system in accordance with the present invention.

With reference now to FIG. 23, there is illustrated a high level logical flowchart of an exemplary method of performing a local bus castout operation in a data processing system in accordance with preferred embodiments of the present invention. The process begins at block 2300, for example, with the issuance of a local bus castout operation on a local interconnect 114 at block 1206 or block 1212 of FIG. 12. The various partial responses that snoopers 222, 236 may provide to distributed response logic 210 are represented in FIG. 23 by the outcomes of decision blocks 2302 and 2310. These partial responses in turn determine the CR for the local bus castout operation.

If a snooper 236 affirms the local bus castout operation with a partial response indicating that the L2 cache 230 containing the snooper 236 holds the requested memory block in any of the M, Me, or Tx states as shown at block 2302, an error halting processing occurs, as indicated at block 2304, because the memory block being castout can have only one HPC (i.e., the requesting L2 cache 230).

As depicted at block 2310, if no M, Me or Tx snooper 236 affirms the local bus castout operation (block 2302), and further, if no snooper 222 provides a partial response indicating that it is responsible (i.e., the LPC) for the requested memory block, response logic 210 provides a "go global" CR, as depicted at block 2312, because the LPC is a required participant to receive the castout memory block. If, however, no M, Me, or Tx snooper 236 affirms the bus castout operation (block 2302) and a snooper 222 provides a partial response indicating that it is responsible (i.e., the LPC) for the requested memory block but does not affirm the bus castout operation (blocks 2310 and 2320), response logic 210 generates a CR indicating "local retry", as depicted at block 2330, because the LPC is in the local coherency domain but must be available to receive the castout memory block. If a memory controller snooper 222 affirms the bus castout operation (block 2320) and no M, Me, or Tx snooper 236 affirms the bus castout operation (block 2302), the requesting L2 cache 230 invalidates the memory block within its cache directory 302 and transmits the memory block to the LPC (block 2324 or block 2328), unless the requesting L2 cache 230 is in the Ig state. In addition to updating the memory block, the LPC snooper 222 sets the associated domain indicator 504 to "local" if the memory block is in the M, Me, Tn or Ten state (blocks 2322 and 2324), and resets the associated domain indicator 504 to "global" if the memory block is in the T or Te state (blocks 2322 and 2328). The update of the domain indicator 504 to local is possible because a castout of a memory block in either of the M, Me, Tn or Ten states guarantees that no remotely cached copy of the memory block exists. In response to an affirmative determination at block 2320, response logic 210 generates a CR indicating "success", as illustrated at block 2326.

Figure 24:
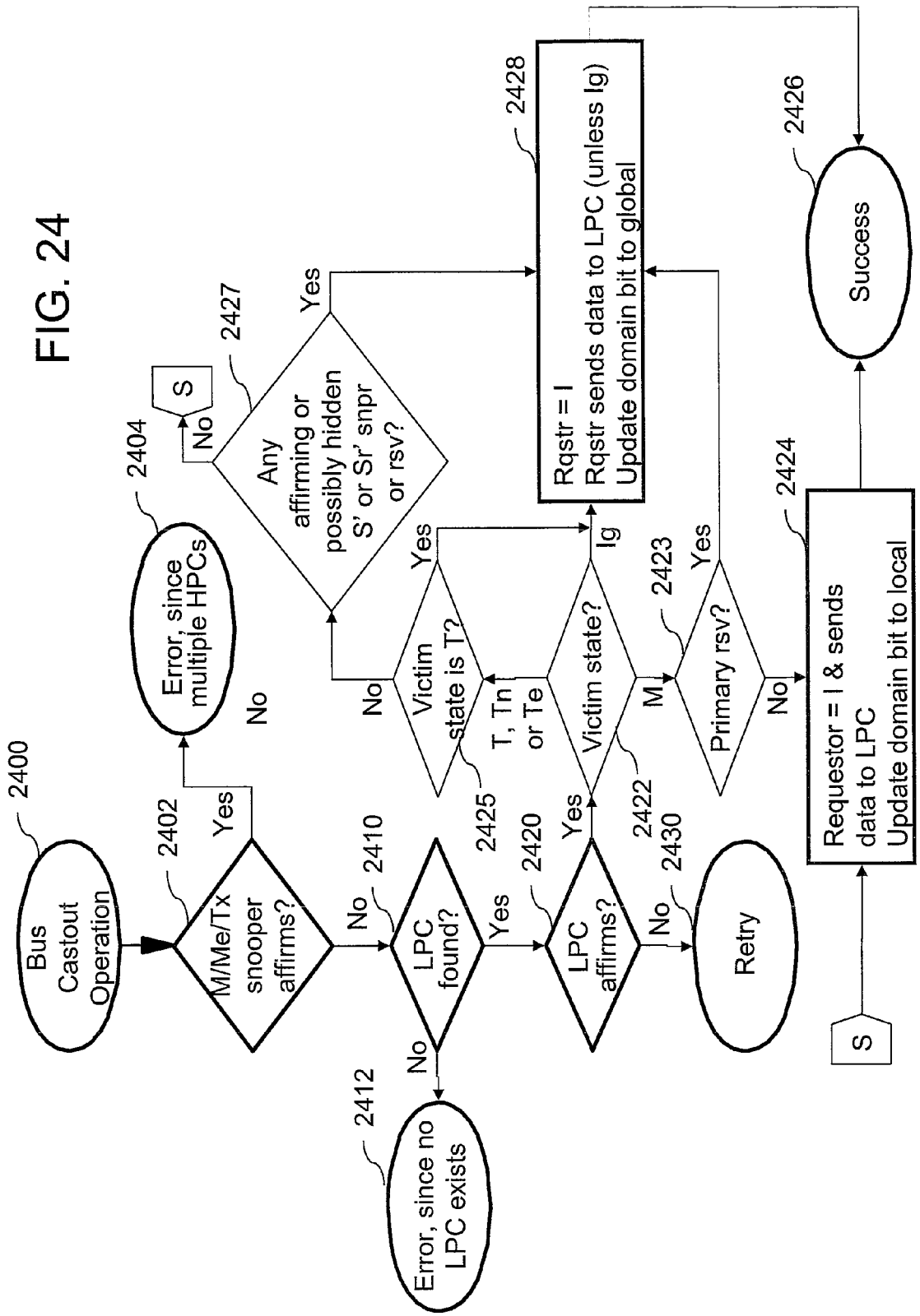
FIG. 24 is a high level logical flowchart of an exemplary method of performing a global bus castout operation in a data processing system in accordance with the present invention.

Referring now to FIG. 24, there is depicted a high level logical flowchart of an exemplary method of performing a global bus castout operation in a data processing system in accordance with the present invention. The process begins at block 2400, for example, with a master 232 of an L2 cache 230 issuing a global bus castout operation on system interconnect 110 at block 1220 of FIG. 12. The various partial responses that snoopers 222, 236 may provide to distributed response logic 210 are represented in FIG. 24 by the outcomes of decision blocks 2402, 2410, 2420, 2423 and 2427. These partial responses in turn determine the CR for the global bus castout operation.

If a snooper 236 affirms the global bus castout operation with a partial response indicating that the L2 cache 230 containing the snooper 236 holds the requested memory block in any of the M, Me, or Tx states as shown at block 2402, an error halting processing occurs, as indicated at block 2404, because the memory block being castout can have only one HPC (i.e., the requesting L2 cache 230).

As depicted at block 2402 and 2410, if no M, Me, or Tx snooper 236 affirms the global bus castout operation, and further, if no snooper 222 provides a partial response indicating that it is responsible (i.e., the LPC) for the requested memory block, an error occurs causing processing to halt, as depicted at block 2412. If, however, no M, Me, or Tx snooper 236 affirms the bus castout operation and a snooper 222 provides a partial response indicating that it is responsible (i.e., the LPC) for the requested memory block but does not affirm the global bus castout operation (block 2420), response logic 210 generates a CR indicating "retry", as depicted at block 2430, because the LPC must be available to receive the castout memory block.

If a memory controller snooper 222 affirms the bus castout operation (block 2420) and no M, Me, or Tx snooper 236 affirms the global bus castout operation (block 2402), the castout operation will be successful, as indicated by the CR generated by response logic 210 (block 2426), and the global bus castout operation will be handled in accordance with the coherency state of the victim memory block selected for replacement (block 2422). If the victim memory block is in the M state, as represented by the process passing to block 2423, the requesting L2 cache 230 performs a self-snoop of the global bus castout operation against its reservation registers 314 to determine if it holds a reservation for the address of the castout memory block and, if so, provides a partial response to response logic 210 indicating so. Regardless of whether the requesting L2 cache 230 holds a reservation for the victim memory block, the requesting L2 cache 230 invalidates the victim memory block within its cache directory 302 and transmits the victim memory block to the LPC memory controller 206 to update the appropriate system memory 108 (block 2424 or block 2428). In conjunction with the update to the memory block, the LPC memory controller 206 also updates the domain indicator 504 to indicate either "local" (block 2424) or "global" (block 2428) in accordance with an indication provided by response logic 210 in the CR of whether or not a shared copy of the victim memory block or a reservation for the victim memory block remains in the system. Thus, if the requesting L2 cache 230 holds a reservation for the victim memory block, the LPC memory controller 206 updates the domain indicator 504 for the memory block to "global" (block 2428) and otherwise updates the domain indicator 504 to "local" (block 2424).

Returning to block 2422, if the requesting L2 cache 230 is casting out an Ig memory block, the global bus castout operation is handled in accordance with block 2428. In particular, the requesting L2 cache 230 invalidates the victim memory block within its cache directory 302 without any data transfer, and the LPC memory controller 206 updates the domain indicator 504 for the corresponding to indicate "global" (block 2428).

As represented by the process passing from block 2422 through block 2425 to block 2427, if the victim memory block is in either of the Tn or Te coherency states, the global bus castout operation is handled is handled in accordance with block 2428 if the partial responses and CR indicate that a reservation exists for the victim memory block or that an S' or Sr' snooper 236 affirmed the castout operation or is possibly hidden. If the partial responses and CR indicate that no reservation exists for the victim memory block and that no S or Sr' snooper 236 affirmed the castout operation or is possibly hidden, the global bus castout operation is handled in accordance with block 2424.

Finally, as represented by the process passing from block 2422 to block 2425 and then to block 2428, the global bus castout operation is handled in accordance with block 2428 if the victim memory block is held by the requesting L2 cache 230 in the T state. As discussed further below with reference to FIG. 28, the LPC memory controller 206 preferably pessimistically updates the domain indicator 504 of the victim memory block to indicate "global" as shown at block 2428 regardless of the presence or absence of any actual shared copy of or reservation for the victim memory block because castouts of T memory blocks are preferably not snooped by L2 caches 230 due to the high likelihood of the existence of either or both of a shared cached copy of or reservation for the victim memory block.

Figure 25:
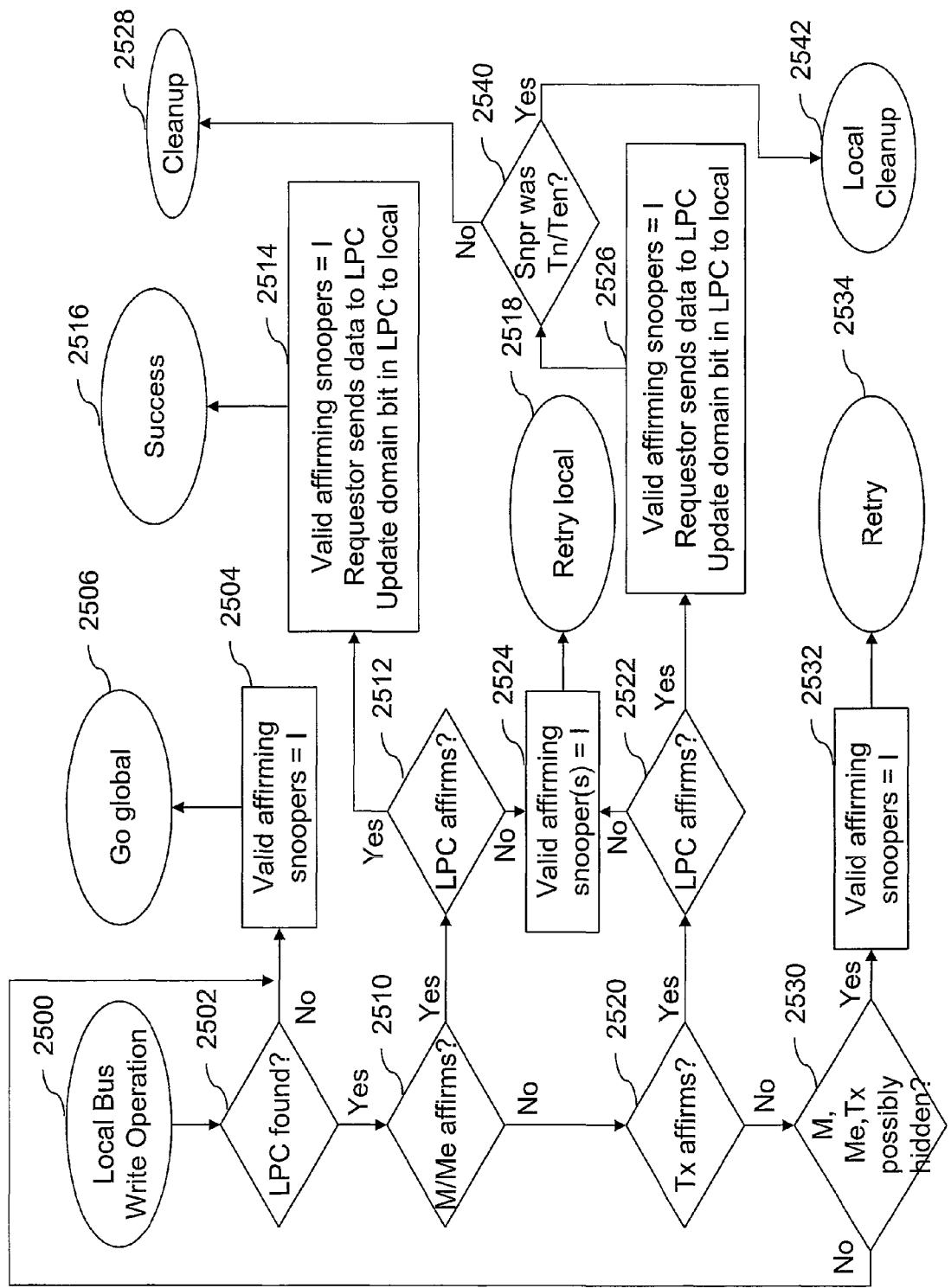
FIG. 25 is a high level logical flowchart of an exemplary method of performing a local bus write operation in a data processing system in accordance with the present invention.

With reference now to FIG. 25, there is illustrated a high level logical flowchart of an exemplary method of performing a local bus write operation in a data processing system in accordance with preferred embodiments of the present invention. The process begins at block 2500, for example, with the issuance by an I/O controller 214 of a local bus write operation on a local interconnect 114 at block 1004 of FIG. 10. The various partial responses that snoopers 222, 236 may provide to distributed response logic 210 are represented in FIG. 25 by the outcomes of decision blocks 2502, 2510, 2512, 2520, 2522 and 2530. These partial responses in turn determine the CR for the local bus write operation.

If no snooper 222 provides a partial response indicating that is responsible (i.e., the LPC) for the target memory block (block 2502), each valid affirming snooper 236 invalidates its respective copy of the target memory block, as shown at block 2504, and response logic 210 provides a "go global" CR, as illustrated at block 2506, because the LPC is a necessary participant in the bus write operation. As depicted at block 2510, if a snooper 222 provides a partial response indicating that it is responsible (i.e., the LPC) for the requested memory block but does not affirm the local bus write operation (block 2512) and a M or Me snooper 236 affirms the local bus write operation (block 2510), the M or Me snooper 236 invalidates its copy of the requested memory block (block 2254). In addition, response logic 210 generates a CR indicating "retry local", as depicted at block 2518, because the LPC must be available to receive the target memory block.

Response logic 210 similarly generates a "retry" CR at block 2534 and each valid affirming snooper 236 invalidates its respective copy of the requested memory block (block 2532) if a memory controller snooper 222 indicates that it is the LPC for the target memory block, no M, Me, or Tx snooper 236 affirms the local bus write operation, and a partial response indicates that a M, Me, or Tx snooper 236 may be hidden (block 2530). In this case, each affirming snooper 236 invalidates its copy, if any, of the target memory block, and response logic 210 generates a "retry" CR so that the local bus write operation only succeeds when no HPC copy of the requested memory block remains in the system.

Referring again to block 2512, assuming that a M or Me snooper 236 affirms the local bus write operation and a snooper 222 affirms the local bus write operation as the LPC, the requesting L2 cache 230 transmits the requested memory block to the LPC snooper 222 and valid affirming snoopers 236, if any, invalidate their respective copies of the requested memory block (block 2514). In addition, the LPC snooper 222 sets the domain indicator 504 associated with the target memory block to "local". The process ends at block 2516 with distributed response logic 210 generating a CR indicating "success".

As depicted at block 2520 and following blocks, if a snooper 222 provides a partial response indicating that it is the LPC for the target memory block (block 2502) but cannot affirm the local bus write operation (block 2522), no M or Me snooper 236 affirms the local bus write operation (block 2510), and a Tx snooper 236 affirms the local bus write operation, distributed response logic 210 generates a CR indicating "retry local" (block 2518) to force the operation to be reissued locally, and valid snoopers 236 affirming the local bus write operation invalidate their respective copies of the requested memory block (block 2524). Assuming the same partial responses except for the LPC snooper 222 affirming the local bus write operation (block 2522), the requesting L2 cache 230 transmits the requested memory block to the LPC snooper 222, and each valid snooper 236 affirming the local bus write operation invalidates its respective copy of the requested memory block (block 2526). In addition, the LPC snooper 222 sets the domain indicator 504 associated with the target memory block to "local".

In response to the local bus write operation and partial responses by the Tx snooper 236 and the LPC snooper 222 affirming the local bus write operation, distributed response logic 210 generates a CR indicating "local cleanup" if the Tx snooper 236, prior to invalidation, held the target memory block in one of the Tn and Ten states (blocks 2540 and 2542), and otherwise generates a CR indicating "cleanup" (block 2528). It should noted that the presence of a Tn or Ten coherency states enables the scope of bus kill operations during cleanup operations to be limited to the local coherency domain.

Figure 26:
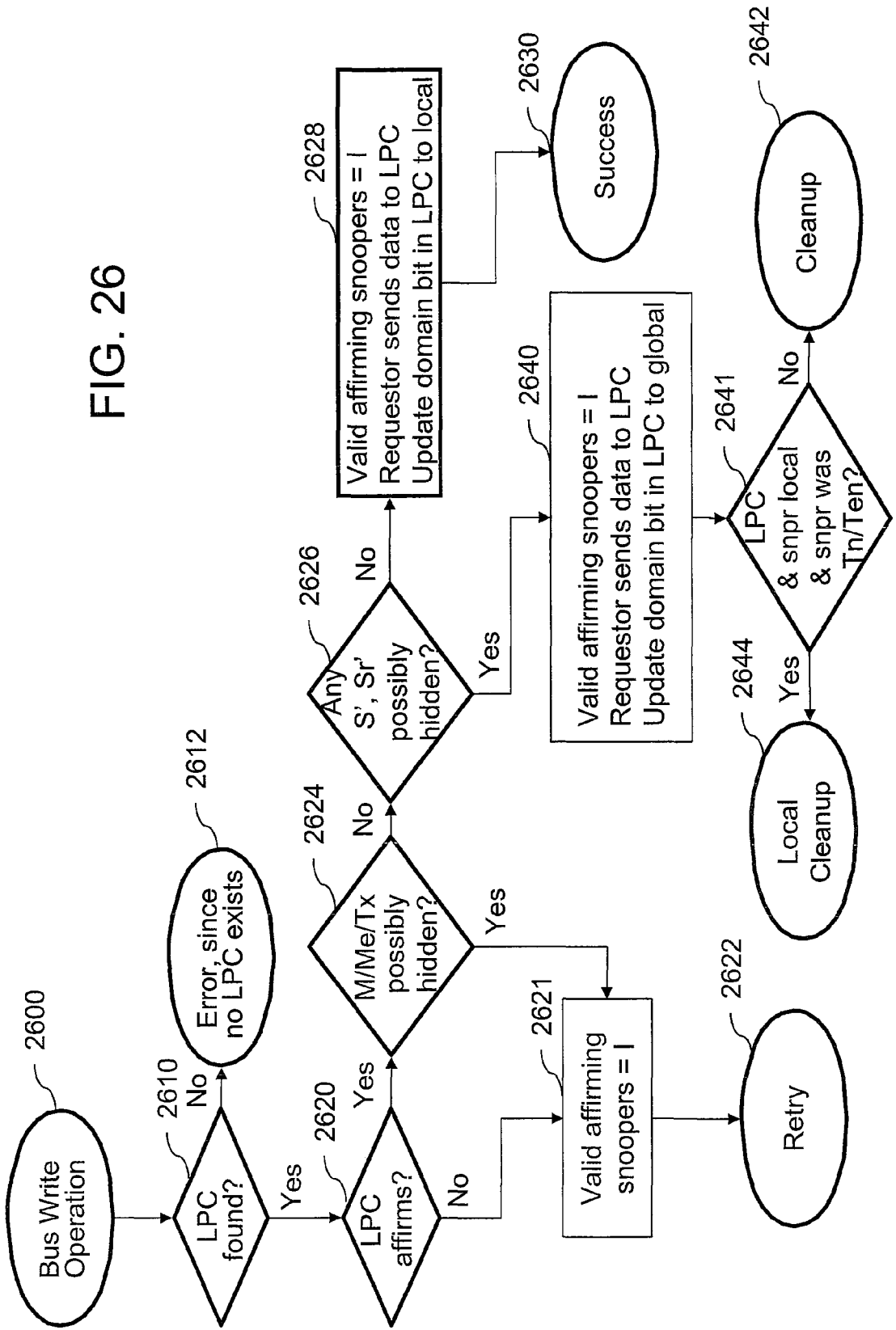
FIG. 26 is a high level logical flowchart of an exemplary method of performing a global bus write operation in a data processing system in accordance with the present invention.

Referring now to FIG. 26, there is depicted a high level logical flowchart of an exemplary method of performing a global bus write operation in a data processing system in accordance with the present invention. As shown, the process begins at block 2600, for example, with an I/O controller 214 issuing a global bus write operation on system interconnect 110 at block 1020 of FIG. 10. The various partial responses that snoopers 222, 236 may provide to distributed response logic 210 are represented in FIG. 26 by the outcomes of decision blocks 2610, 2620, 2624, 2626 and 2641. These partial responses in turn determine the CR for the global bus write operation.

As depicted at block 2610, if no snooper 222 provides a partial response indicating that it is responsible (i.e., the LPC) for the requested memory block, an error occurs causing processing to halt, as depicted at block 2612. If, however, a snooper 222 provides a partial response indicating that it is responsible (i.e., the LPC) for the requested memory block but does not affirm the global bus write operation (block 2620), each valid affirming snoopers 236 invalidates its respective copy of the requested memory block (block 2621), and response logic 210 generates a CR indicating "retry" (block 2622) because the LPC must be available to receive the requested memory block. Response logic 210 similarly generates a "retry" CR and each valid affirming snooper 236 invalidates its respective copy of the requested memory block if a memory controller snooper 222 affirms the global bus write operation but a partial response indicates that an M, Me, or Tx snooper 236 may be possibly hidden (blocks 2624, 2621 and 2622). In this case, a "retry" CR is generated so that the global bus write operation only succeeds when no HPC copy of the requested memory block remains in the system.

Referring again to block 2624, assuming that a snooper 222 affirms the global bus write operation as the LPC and no partial responses are generated that indicate that a M, Me, or Tx snooper 236 may be possibly hidden, the requesting L2 cache 230 transmits the requested memory block to the LPC snooper 222, and valid snoopers 236, if any, affirming the bus write operation invalidate their respective copies of the requested memory block (block 2628 or block 2640). As represented by blocks 2626 and 2630, if the partial responses indicate that no S' or Sr' snooper 236 is possibly hidden, the process ends with distributed response logic 210 generating a CR indicating "success". In addition, the LPC snooper 222 sets the domain indicator 504 associated with the requested memory block to indicate "local" (block 2628). If, on the other hand, at least one partial response indicating the presence of a possibly hidden S' or Sr' snooper 236 was given in response to the global bus write operation (block 2626), distributed response logic 210 generates a CR indicating the need for cleanup operations. In particular, distributed response logic 210 generates a CR indicating "local cleanup" (block 2644) if the Tx snooper 236, prior to invalidation, held the target memory block in one of the Tn and Ten states and the LPC snooper 222 and Tx snooper 236 are both within the local coherency domain of the requesting I/O controller 214 (block 2641). Otherwise, response logic 210 generates a CR indicating "cleanup" (block 2642).

Figure 27:
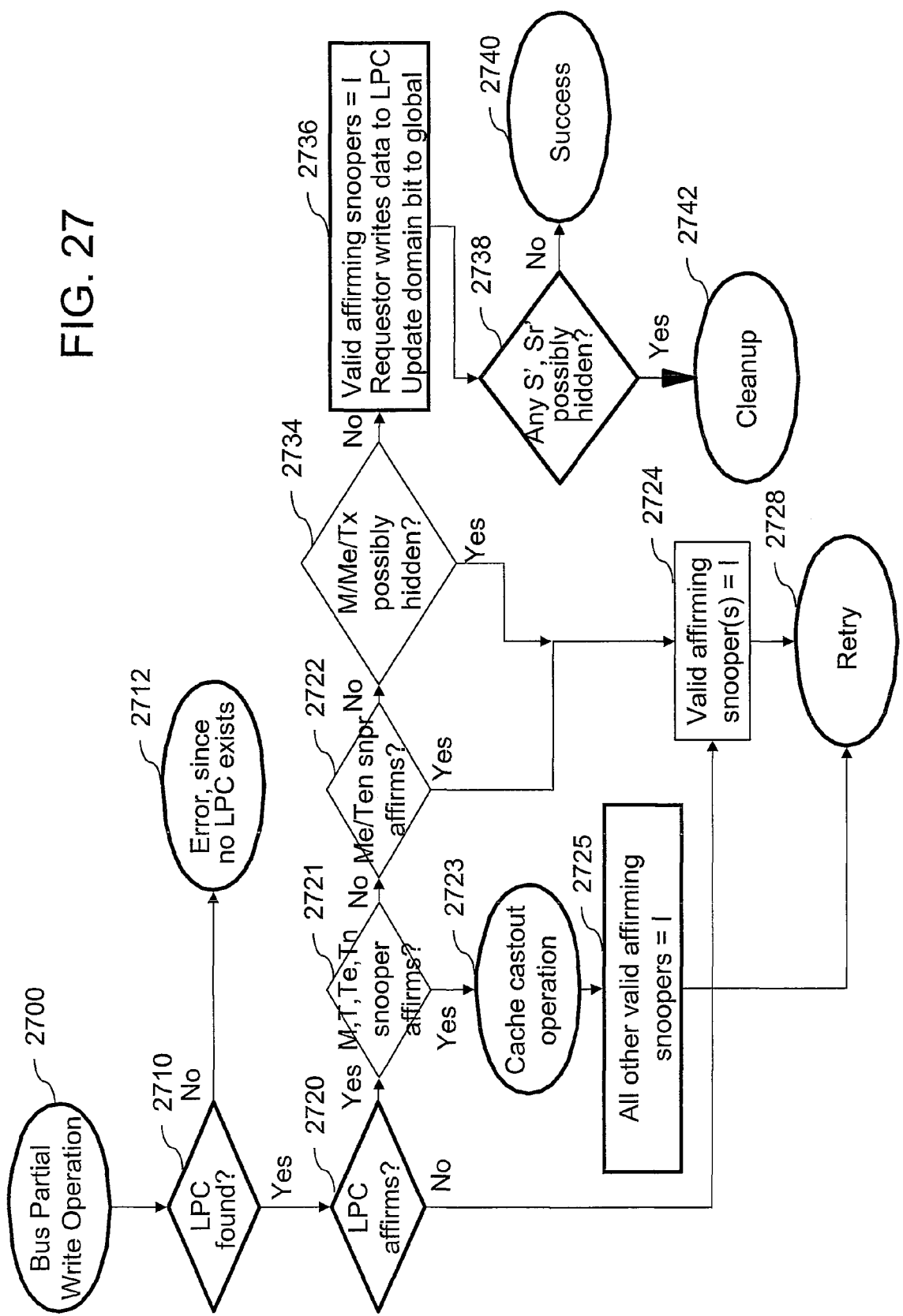
FIG. 27 is a high level logical flowchart of an exemplary method of performing a global bus partial write operation in a data processing system in accordance with the present invention.

With reference now to FIG. 27, there is depicted a high level logical flowchart of an exemplary method of performing a global bus partial write operation in a data processing system in accordance with the present invention. The process begins at block 2700, for example, with an I/O controller 214 issuing a global bus partial write operation on system interconnect 110 at block 1122 of FIG. 11. The various partial responses that snoopers 222, 236 may provide to distributed response logic 210 are represented in FIG. 27 by the outcomes of decision blocks 2710, 2720, 2721, 2722, 2734 and 2738. These partial responses in turn determine the CR for the global bus partial write operation.

As depicted at block 2710, if no snooper 222 provides a partial response indicating that it is responsible (i.e., the LPC) for the requested partial memory block, an error occurs causing processing to halt, as depicted at block 2712. An error condition arises because the specified target address has no LPC within data processing system 100.

Distributed response logic 210 generates a CR indicating "retry", as shown at block 2728, in response to four combinations of partial responses. First, response logic 210 generates a CR indicating "retry" and each valid affirming snooper 236 invalidates its respective copy of the requested memory block (block 2724) if a snooper 222 provides a partial response indicating that it is responsible (i.e., the LPC) for the requested partial memory block but does not affirm the global bus partial write operation (block 2720). A "retry" CR is generated because the LPC must be available to receive the partial memory block from the I/O controller 214.

Second, response logic 210 similarly generates a "retry" CR as shown at block 2728 and each valid affirming snooper 236 invalidates its respective copy of the requested memory block (block 2724) if a memory controller snooper 222 affirms the global bus partial write operation, no M, Me, or Tx snooper 236 affirms the global bus partial write operation (blocks 2721 and 2722), but a partial response indicates that a M, Me, or Tx snooper 236 may be possibly hidden (block 2734). A "retry" CR is generated to avoid stale copies of the target memory block remaining in data processing system 100 following an update to system memory 108.

In the third and fourth cases, response logic 210 generates a "retry" CR, as illustrated at block 2728, if a memory controller snooper 222 affirms the global bus partial write operation, and an M, Me, or Tx snooper 236 affirms the global bus partial write operation (block 2721 or block 2722). In either of the third and fourth cases, each valid affirming snooper 236 invalidates its respective copy of the target memory block, as shown at blocks 2724, 2725 (an affirming M, T, Te or Ten snooper 236 invalidates its copy of the target memory block during the cache castout operation at block 2723). In addition, as just noted, an M, T, Te or Tn snooper 236 initiates a cache castout operation of the cache line containing the partial memory block, as depicted at block 2723. Thus, a "retry" CR is generated, as depicted at block 2728, so that the global bus partial write operation only succeeds when no stale HPC copy of the requested partial memory block will remain in data processing system 100.

Referring again to block 2734, assuming that a snooper 222 affirms the global bus partial write operation as the LPC, no M, Me, or Tx snooper 236 affirms the global bus partial write operation or is possibly hidden, the requesting L2 cache 230 transmits the partial memory block to the LPC snooper 222, and valid snoopers 236, if any, affirming the global bus partial write operation invalidate their respective copies of the requested memory block (block 2736). In addition, the LPC snooper 222 updates the domain indicator 504 for the updated memory block to "global". As shown at blocks 2738 and 2740, if the partial responses indicate that no hidden S' or Sr' snooper 236 exists, the process ends with distributed response logic 210 generating a CR indicating "success". If, on the other hand, at least one partial response indicating the presence of a possibly hidden S' or Sr' snooper 236 was given in response to the global bus partial write operation, distributed response logic 210 generates a CR indicating "cleanup" (block 2742), meaning that the requesting L2 cache 230 must issue one or more bus kill operations to invalidate the requested memory block in any such hidden S' or Sr' snooper 236.

VIII. Snoop Filtering

As discussed briefly above, system performance in handling the interconnect operations discussed above is improved by reducing contention for L2 cache directories 302 through the operation of snoop filters 320 in L2 caches 230. In one exemplary embodiment of snoop filter 320, snoop filter 320 filters out selected local and global bus castout operations so that the number of processor core request and bus operations contending for access to L2 cache directories 302 is reduced. Generally speaking, the purpose for snooping bus castout operations is to determine if any shared copies of the castout memory block remain in the data processing system so that the domain indicator 504 for the castout memory block in system memory 108 is set appropriately.

Referring now to FIG. 28, there is illustrated a high level flowchart of an exemplary method of snoop filtering by snoop filter 320 in accordance with the present invention. As depicted, the process begins at block 2800 in response to receipt by a snoop filter 320 of a local or global bus operation. In response to receipt of the local or global bus operation, snoop filter 320 determines whether or not the bus operation is a bus castout operation of a memory block in any of the T, Tn, M or Me coherency states, as shown at blocks 2802, 2804 and 2820. If not, the bus operation is not filtered out and is handled normally, as shown at block 2830. Thereafter, the process ends at block 2840.

Referring again to block 2820, if the bus operation is a castout operation of a memory block in the Tn coherency state (the coherency state is preferably indicated in the transaction type of the operation), snoop filter 320 further determines at block 2822 whether the bus castout operation is a local bus castout operation or a global bus castout operation. In general, castouts of memory blocks in the Tn coherency state are initially issued with a local scope, as shown at blocks 1204 and 1206 of FIG. 12. As indicated by the process proceeding from block 2822 to block 2840 in response to an affirmative determination at block 2822, snoop filter 320 filters out local bus castout operations of Tn memory blocks. Such local bus castout operations are filtered out because the only shared copies of the Tn castout memory block, if any, reside in the same coherency domain. Thus, if the LPC memory controller 206 for the castout memory block is present in the local coherency domain, the LPC memory controller 206 should update the domain indicator 504 to indicate "local" whether or not any shared copies of the memory block exist. Accordingly, there is no reason to utilize snoop bandwidth to discover shared copies of the castout memory block.

Returning to block 2822, if the bus castout operation for a Tn memory block is a global bus castout operation, snoop filter 320 determines whether its L2 cache 230 is local to the L2 cache 230 that initiated the global bus castout operation. As described above, this determination can be made, for example, by reference to a domain indicator contained in the operation. In response to a determination by the snoop filter 320 that the snooping L2 cache 230 is not within the same coherency domain as the L2 cache 230 initiating the bus castout operation, snoop filter 320 again filters out the bus castout operation, as indicated by the process proceeding from block 2824 to block 2840. No snooping is required because the Tn coherency state requires that no shared copy of the memory block exists in the present L2 cache 230 or any other L2 cache 230 outside of the coherency domain of the initiating L2 cache 230.

In response to an affirmative determination at block 2824, the process proceeds to block 2826, which illustrates snoop filter 320 passing the bus castout operation to multiplexer 322 for eventual snooping against the L2 cache directory 302 and reservation address registers 314. In this case, a full snoop is performed to permit the discovery and reporting to the LPC memory controller 206 of any shared copies of the castout memory block in the originating coherency domain. If any such shared copies exist, the LPC memory controller 206 needs to reset the domain indicator 504 for the memory block to indicate "global", and if not, the LPC memory controller 206 can set the domain indicator 504 to indicate "local" since the originating coherency domain is guaranteed by the Tn coherency state to be the only coherency domain that may possibly contain a copy of the castout memory block. Following either of blocks 2824 and 2826, the process ends at block 2840.

Referring now to block 2804, if the castout memory block is in the M or Me coherency state, only the processing unit 200 that initiated the bus castout operation can possibly have a cached copy of or reservation for the castout memory block. Thus, as indicated at block 2806, if the snooping L2 cache 230 is not the initiating L2 cache 230, snoop filter 230 filters out the bus castout operation, as indicated by the process passing from block 2806 directly to block 2840. Even if the snooping L2 cache 230 is the initiating L2 cache 230, snoop filter 320 filters out the bus castout operation if the bus castout operation has a local scope (block 2808). This is because if the LPC memory controller 206 is found by a local bus castout operation, it is known by virtue of the M or Me state that no shared copy of the castout memory block exists and that the LPC memory controller 206 can update the domain indicator 504 to indicate "local." Advantageously, even if the bus castout operation is a global bus castout operation, snoop filter 320 can mark the global bus castout operation so that it is only snooped against reservation registers 314 and not against L2 cache directory 302 (block 2810). Thus, a reservation is considered as a "virtual-shared" memory block in the cache for purposes of snooping in this case so that any updates to a reserved address reset the reservation.

Referring finally to block 2802, snoop filter 320 preferably filters out all bus castout operations of memory blocks in the T coherency state, as indicated by the process passing directly from block 2802 to block 2840. These bus castout operations are filtered out under the assumption that a shared copy of the castout memory block is very likely to exist outside of the coherency domain containing the LPC memory controller 206. Accordingly, the LPC memory controller 206 can imprecisely reset the domain indicator 504 for the castout memory block to indicate "global". In general, the latency improvement resulting from precisely marking the memory block as "local" in the small percentage of cases where this is possible is outweighed by the performance benefits concomitant with reducing contention for access to L2 cache directories 302.

Moreover, if a precise update to the domain indicator 504 were implemented for castout memory blocks in the T coherency state, the bus castout operation would be required to always be a global broadcast in order to discover any remote copies of the castout memory block. Thus, by making the update to the domain indicator 504 imprecise, the bus castout operation for a memory block in the T coherency state can initially be selected to have a local scope. Assuming software affinity, meaning that software and its data remain within the same coherency domain, a local bus castout operation can generally be serviced without retry, saving significant bandwidth on interconnects 110, 114.

While the invention has been particularly shown as described with reference to a preferred embodiment, it will be understood by those skilled in the art that various changes in form and detail may be made therein without departing from the spirit and scope of the invention.

What is claimed is:

1. A cache coherent data processing system, comprising:
   at least a first cache memory supporting a first processing unit and a second cache memory supporting a second processing unit;
   an interconnect coupling said first and second cache memories;
   wherein:
      said first cache memory includes a cache array, a cache directory of contents of said cache array and filter logic;
      said filter logic, responsive to snooping on the interconnect a broadcast operation of said second cache memory, wherein said broadcast operation specifies a request address, determines from said operation both a type of said operation and a coherency state associated with said request address without accessing said cache directory and, responsive to said determination, filters out said broadcast operation of said second cache memory without accessing said cache directory.

2. The cache coherent data processing system of claim 1, wherein said broadcast operation is a castout operation.

3. The cache coherent data processing system of claim 1, wherein:
   said broadcast operation is a first broadcast operation;
   said first cache memory further includes a reservation register for holding an address for which said first processing unit holds a reservation; and
   said filter logic, responsive to said first cache memory detecting a second broadcast operation, marks said second broadcast operation such that said request address is snooped against said reservation register but not said cache directory.

4. The cache coherent data processing system of claim 3, wherein said first cache memory is a source of said second broadcast operation.

5. The cache coherent data processing system of claim 1, wherein:
   said cache coherent data processing system includes a first coherency domain including said first and second cache memories and said first and second processing units and a second coherency domain including a third cache memory supporting said second processing unit;
   said broadcast operation indicates a scope of said broadcast operation;
   said filter logic filters said broadcast operation if said broadcast operation has a scope of broadcast limited to said first coherency domain and excluding said second coherency domain.

6. The cache coherent data processing system of claim 1, wherein:
   said data processing system includes a system memory that is coupled for communication with said interconnect and that is assigned said request address; and
   said coherency state indicates that a memory block associated with said request address is possibly held in multiple cache memories and is modified with respect to a corresponding memory block in said system memory.

7. The cache coherent data processing system of claim 1, wherein:
   said data processing system includes a system memory that is coupled for communication with said interconnect and that is assigned said request address; and
   said coherency state indicates that a memory block associated with said request address is held by only a single cache memory and is modified with respect to a corresponding memory block in said system memory.

8. A cache memory for a cache coherent data processing system including a first processing unit supported by said cache memory, another cache memory supporting a second processing unit, and an interconnect coupling said first and second cache memories, said cache memory comprising:
   a cache array;
   a cache directory of contents of said cache array;
   filter logic that, responsive to snooping on the interconnect a broadcast operation of said second cache memory, wherein said broadcast operation specifies a request address, determines from said operation both a type of said operation and a coherency state associated with said request address without accessing said cache directory and, responsive to said determination, filters out said broadcast operation of said second cache memory without accessing said cache directory.

9. The cache memory of claim 8, wherein said broadcast operation is a castout operation.

10. The cache memory of claim 8, wherein:
    said broadcast operation is a first broadcast operation;
    said cache memory further includes a reservation register for holding an address for which said first processing unit holds a reservation; and
    said filter logic, responsive to said first cache memory detecting a second broadcast operation, marks said second broadcast operation such that said request address is snooped against said reservation register but not said cache directory.

11. The cache memory of claim 8, wherein:
    said data processing system includes a first and second coherency domains, wherein said first_coherency domain includes said cache memory and said first processing unit and said another cache memory and said second processing unit, and wherein said second coherency domain includes a third processing unit supported by an associated cache memory;
    said broadcast operation indicates a scope of said broadcast operation;
    said filter logic filters said broadcast operation if said broadcast operation has a scope of broadcast limited to said first coherency domain and excluding said second coherency domain.

12. The cache memory of claim 8, wherein:
    said data processing system includes a system memory that is coupled for communication with said interconnect and that is assigned said request address; and
    said coherency state indicates that a memory block associated with said request address is possibly held in multiple cache memories and is modified with respect to a corresponding memory block in said system memory.

13. The cache memory of claim 8, wherein:
    said data processing system includes a system memory that is coupled for communication with said interconnect and that is assigned said request address; and
    said coherency state indicates that a memory block associated with said request address is held by only a single cache memory and is modified with respect to a corresponding memory block in said system memory.

* * * * *